US012305122B1

(12) United States Patent
Wu et al.

(10) Patent No.: US 12,305,122 B1
(45) Date of Patent: May 20, 2025

(54) DEVICE TO RECYCLE MATERIAL AND RELATED SYSTEMS AND METHODS

(71) Applicant: Thermolysis Co., Ltd., Taichung (TW)

(72) Inventors: Chun-Lung Wu, Taichung (TW); Wei-Chih Hung, Kaohsiung (TW); Chih-Chang Chen, Pingtung (TW)

(73) Assignee: Thermolysis Co., Ltd., Taichung (TW)

( * ) Notice: Subject to any disclaimer, the term of this patent is extended or adjusted under 35 U.S.C. 154(b) by 0 days.

(21) Appl. No.: 18/408,469

(22) Filed: Jan. 9, 2024

(51) Int. Cl.
*C10B 53/07* (2006.01)
*B29B 17/04* (2006.01)
*B29K 307/04* (2006.01)
*B29L 31/00* (2006.01)
*C01B 32/05* (2017.01)
*C10B 57/06* (2006.01)
*H05B 6/80* (2006.01)

(52) U.S. Cl.
CPC ............ *C10B 53/07* (2013.01); *B29B 17/04* (2013.01); *C01B 32/05* (2017.08); *C10B 57/06* (2013.01); *H05B 6/80* (2013.01); *B29B 2017/0496* (2013.01); *B29K 2307/04* (2013.01); *B29L 2031/753* (2013.01); *H05B 2206/045* (2013.01)

(58) Field of Classification Search
CPC ......... C10B 53/07; C10B 57/06; B29B 17/04; B29B 2017/0496; C01B 32/05; H05B 6/80; H05B 2206/045; B29K 2307/04; B29L 2031/753

See application file for complete search history.

(56) References Cited

U.S. PATENT DOCUMENTS

| 2014/0194645 | A1* | 7/2014 | Anderson | D06M 10/003 442/175 |
| 2016/0153123 | A1* | 6/2016 | Da Cruz | B01D 53/323 423/447.8 |
| 2017/0165876 | A1* | 6/2017 | Goh | C08J 11/10 |
| 2017/0218164 | A1* | 8/2017 | Santacesaria | C08J 11/12 |

OTHER PUBLICATIONS

Limburg, et al., Thermal treatment of carbon fibre reinforced polymers (Part 1: Recycling), Waste Management & Research 2019; 37(1) Supplement: 73-82 (Year: 2019).*
Jiang, et al., Recycling carbon fiber composites using microwave irradiation: Reinforcement study of the recycled fiber in new composites, J. Appl. Polym. Sci. 2015; 42658: pp. 1 to 9 (Year: 2015).*
CEM MAS7000 Microwave Furnace Oven, accessed online at https://lissci.com/product/cem-mas7000-microwave-furnace-oven/ on Jun. 14, 2024 (Year: 2024).*

* cited by examiner

Primary Examiner — Daniel C. McCracken
(74) Attorney, Agent, or Firm — Procopio, Cory, Hargreaves & Savitch LLP

(57) ABSTRACT

The present disclosure is directed to a process, device, and system for recycling a composite material comprising a base material composited with a polymer material, which may can include a process comprising applying a non-ionizing radiation to the composite material and contacting the composite material with $H_2O$ until the polymer material is substantially removed from the base material to produce a recycled base material.

18 Claims, 24 Drawing Sheets

DEVICE TO RECYCLE MATERIAL AND RELATED SYSTEMS AND METHODS

BACKGROUND

Material recycling has gained increasing importance in recent years due to its role in addressing environmental concerns, resource conservation, and the reduction of waste. Applications in this field often focus on various aspects of recycling, including the collection, sorting, and processing of recyclable materials, as well as the development of new materials and products made from recycled content.

SUMMARY

This Summary is provided to introduce a selection of concepts in simplified form that can be further described below in the Detailed Description. This Summary is not intended to identify key aspects or essential aspects of the claimed subject matter.

All features of exemplary embodiments which can be described in this disclosure and can be not mutually exclusive can be combined with one another. Elements of one embodiment can be utilized in the other embodiments without further mention. Other aspects and features of the present invention will become apparent to those ordinarily skilled in the art upon review of the following description of specific embodiments in conjunction with any accompanying Figures.

The present disclosure may be related to a process of recycling a composite material comprising a base material composited with a polymer material, wherein the process may comprise applying a non-ionizing radiation to the composite material; and contacting the composite material with $H_2O$ and $N_2$ while maintaining the non-ionizing radiation until the polymer material may be substantially removed from the base material to produce a recycled base material.

The present disclosure can be related to a process of recycling a composite material comprising a base material composited with a polymer material, wherein the process can comprise applying a non-ionizing radiation to the composite material and contacting the composite material with $H_2O$ and $N_2$ while maintaining the non-ionizing radiation until the polymer material can be substantially removed from the base material to produce a recycled base material.

In some embodiments, the base material may comprise carbon fibers. In some embodiments, the base material may comprise glass fibers. In some embodiments, the base material may comprise carbon fibers and glass fibers. In some embodiments, the polymer material can be a thermoplastic material.

In some embodiments, at least about 80% of the polymer material can be removed from the base material. In some embodiments, at least about 81% of the polymer material can be removed from the base material. In some embodiments, at least about 82% of the polymer material can be removed from the base material. In some embodiments, at least about 83% of the polymer material can be removed from the base material. In some embodiments, at least about 84% of the polymer material can be removed from the base material. In some embodiments, at least about 85% of the polymer material can be removed from the base material. In some embodiments, at least about 86% of the polymer material can be removed from the base material. In some embodiments, at least about 87% of the polymer material can be removed from the base material. In some embodiments, at least about 88% of the polymer material can be removed from the base material. In some embodiments, at least about 89% of the polymer material can be removed from the base material. In some embodiments, at least about 90% of the polymer material can be removed from the base material. In some embodiments, at least about 91% of the polymer material can be removed from the base material. In some embodiments, at least about 92% of the polymer material can be removed from the base material. In some embodiments, at least about 93% of the polymer material can be removed from the base material. In some embodiments, at least about 94% of the polymer material can be removed from the base material. In some embodiments, at least about 95% of the polymer material can be removed from the base material. In some embodiments, at least about 96% of the polymer material can be removed from the base material. In some embodiments, at least about 97% of the polymer material can be removed from the base material. In some embodiments, at least about 98% of the polymer material can be removed from the base material. In some embodiments, at least about 99% of the polymer material can be removed from the base material. In some embodiments, at least about 99.5% of the polymer material can be removed from the base material.

In some embodiments, the base material can be at least substantially intact after the polymer material can be substantially removed from the base material. In some embodiments, the base material can be essentially intact after the polymer material can be substantially removed from the base material. In some embodiments, the base material can be intact after the polymer material can be substantially removed from the base material.

In some embodiments, the base material before applying the non-ionizing radiation can have tensile strength and wherein the recycled base material can have at least about 80% of the tensile strength of the base material. In some embodiments, the base material before applying the non-ionizing radiation can have tensile strength and wherein the recycled base material can have at least about 81% of the tensile strength of the base material. In some embodiments, the base material before applying the non-ionizing radiation can have tensile strength and wherein the recycled base material can have at least about 82% of the tensile strength of the base material. In some embodiments, the base material before applying the non-ionizing radiation can have tensile strength and wherein the recycled base material can have at least about 83% of the tensile strength of the base material. In some embodiments, the base material before applying the non-ionizing radiation can have tensile strength and wherein the recycled base material can have at least about 84% of the tensile strength of the base material. In some embodiments, the base material before applying the non-ionizing radiation can have tensile strength and wherein the recycled base material can have at least about 85% of the tensile strength of the base material. In some embodiments, the base material before applying the non-ionizing radiation can have tensile strength and wherein the recycled base material can have at least about 86% of the tensile strength of the base material. In some embodiments, the base material before applying the non-ionizing radiation can have tensile strength and wherein the recycled base material can have at least about 87% of the tensile strength of the base material. In some embodiments, the base material before applying the non-ionizing radiation can have tensile strength and wherein the recycled base material can have at least about 88% of the tensile strength of the base material. In some embodiments, the base material before applying the non-ionizing radiation can have tensile strength and wherein the recycled base material can have at least about 89% of the tensile strength of the base material.

In some embodiments, the base material before applying the non-ionizing radiation can have tensile strength and wherein the recycled base material can have at least about 90% of the tensile strength of the base material. In some embodiments, the base material before applying the non-ionizing radiation can have tensile strength and wherein the recycled base material can have at least about 91% of the tensile strength of the base material. In some embodiments, the base material before applying the non-ionizing radiation can have tensile strength and wherein the recycled base material can have at least about 92% of the tensile strength of the base material. In some embodiments, the base material before applying the non-ionizing radiation can have tensile strength and wherein the recycled base material can have at least about 93% of the tensile strength of the base material. In some embodiments, the base material before applying the non-ionizing radiation can have tensile strength and wherein the recycled base material can have at least about 94% of the tensile strength of the base material. In some embodiments, the base material before applying the non-ionizing radiation can have tensile strength and wherein the recycled base material can have at least about 95% of the tensile strength of the base material. In some embodiments, the base material before applying the non-ionizing radiation can have tensile strength and wherein the recycled base material can have at least about 96% of the tensile strength of the base material. In some embodiments, the base material before applying the non-ionizing radiation can have tensile strength and wherein the recycled base material can have at least about 97% of the tensile strength of the base material. In some embodiments, the base material before applying the non-ionizing radiation can have tensile strength and wherein the recycled base material can have at least about 98% of the tensile strength of the base material. In some embodiments, the base material before applying the non-ionizing radiation can have tensile strength and wherein the recycled base material can have at least about 99% of the tensile strength of the base material.

In some embodiments, the base material before applying the non-ionizing radiation can have tensile modulus and wherein the recycled base material can have at least about 80% of the tensile modulus of the base material. In some embodiments, the base material before applying the non-ionizing radiation can have tensile modulus and wherein the recycled base material can have at least about 81% of the tensile modulus of the base material. In some embodiments, the base material before applying the non-ionizing radiation can have tensile modulus and wherein the recycled base material can have at least about 82% of the tensile modulus of the base material. In some embodiments, the base material before applying the non-ionizing radiation can have tensile modulus and wherein the recycled base material can have at least about 83% of the tensile modulus of the base material. In some embodiments, the base material before applying the non-ionizing radiation can have tensile modulus and wherein the recycled base material can have at least about 84% of the tensile modulus of the base material. In some embodiments, the base material before applying the non-ionizing radiation can have tensile modulus and wherein the recycled base material can have at least about 85% of the tensile modulus of the base material. In some embodiments, the base material before applying the non-ionizing radiation can have tensile modulus and wherein the recycled base material can have at least about 86% of the tensile modulus of the base material. In some embodiments, the base material before applying the non-ionizing radiation can have tensile modulus and wherein the recycled base material can have at least about 87 of the tensile modulus of the base material. In some embodiments, the base material before applying the non-ionizing radiation can have tensile modulus and wherein the recycled base material can have at least about 88% of the tensile modulus of the base material. In some embodiments, the base material before applying the non-ionizing radiation can have tensile modulus and wherein the recycled base material can have at least about 89% of the tensile modulus of the base material.

In some embodiments, the base material before applying the non-ionizing radiation can have tensile modulus and wherein the recycled base material can have at least about 90% of the tensile modulus of the base material. In some embodiments, the base material before applying the non-ionizing radiation can have tensile modulus and wherein the recycled base material can have at least about 91% of the tensile modulus of the base material. In some embodiments, the base material before applying the non-ionizing radiation can have tensile modulus and wherein the recycled base material can have at least about 92% of the tensile modulus of the base material. In some embodiments, the base material before applying the non-ionizing radiation can have tensile modulus and wherein the recycled base material can have at least about 93% of the tensile modulus of the base material. In some embodiments, the base material before applying the non-ionizing radiation can have tensile modulus and wherein the recycled base material can have at least about 94% of the tensile modulus of the base material. In some embodiments, the base material before applying the non-ionizing radiation can have tensile modulus and wherein the recycled base material can have at least about 95% of the tensile modulus of the base material. In some embodiments, the base material before applying the non-ionizing radiation can have tensile modulus and wherein the recycled base material can have at least about 96% of the tensile modulus of the base material. In some embodiments, the base material before applying the non-ionizing radiation can have tensile modulus and wherein the recycled base material can have at least about 97% of the tensile modulus of the base material. In some embodiments, the base material before applying the non-ionizing radiation can have tensile modulus and wherein the recycled base material can have at least about 98% of the tensile modulus of the base material. In some embodiments, the base material before applying the non-ionizing radiation can have tensile modulus and wherein the recycled base material can have at least about 98% of the tensile modulus of the base material. In some embodiments, the base material before applying the non-ionizing radiation can have a tensile modulus and wherein the recycled base material can have at least about 99% of the tensile modulus of the base material.

In some embodiments, the base material before applying the non-ionizing radiation can have elongation at break and wherein the recycled base material can have at least about 80% of the elongation of the base material. In some embodiments, the base material before applying the non-ionizing radiation can have elongation and wherein the recycled base material can have at least about 81% of the elongation of the base material. In some embodiments, the base material before applying the non-ionizing radiation can have elongation and wherein the recycled base material can have at least about 82% of the elongation of the base material. In some embodiments, the base material before applying the non-ionizing radiation can have elongation and wherein the recycled base material can have at least about 83% of the elongation of the base material. In some embodiments, the base material before applying the non-ionizing radiation can have elongation and wherein the recycled base material can have at least about 84% of the elongation of the base material. In some embodiments, the base material before applying the non-ionizing radiation can have elongation and wherein the recycled base material can have at least about 85% of the elongation of the base material. In some embodiments, the base material before applying the non-ionizing radiation can have elongation and wherein the recycled base material can have at least about 86% of the elongation of the base material. In some embodiments, the base material before applying the non-ionizing radiation can have elongation and wherein the recycled base material can have at least about 87% of the elongation of the base material. In some embodiments, the base material before applying the non-ionizing radiation can have elongation and wherein the recycled base material can have at least about 88% of the elongation of the base material. In some embodiments, the base material before applying the non-ionizing radiation can have elongation and wherein the recycled base material can have at least about 89% of the elongation of the base material.

In some embodiments, the base material before applying the non-ionizing radiation can have elongation and wherein the recycled base material can have at least about 90% of the elongation of the base material. In some embodiments, the base material before applying the non-ionizing radiation can have elongation and wherein the recycled base material can have at least about 91% of the elongation of the base material. In some embodiments, the base material before applying the non-ionizing radiation can have elongation and wherein the recycled base material can have at least about 92% of the elongation of the base material. In some embodiments, the base material before applying the non-ionizing radiation can have elongation and wherein the recycled base material can have at least about 93% of the elongation of the base material. In some embodiments, the base material before applying the non-ionizing radiation can have elongation and wherein the recycled base material can have at least about 94% of the elongation of the base material. In some embodiments, the base material before applying the non-ionizing radiation can have elongation and wherein the recycled base material can have at least about 95% of the elongation of the base material. In some embodiments, the base material before applying the non-ionizing radiation can have elongation and wherein the recycled base material can have at least about 96% of the elongation of the base material. In some embodiments, the base material before applying the non-ionizing radiation can have elongation and wherein the recycled base material can have at least about 97% of the elongation of the base material. In some embodiments, the base material before applying the non-ionizing radiation can have elongation and wherein the recycled base material can have at least about 98% of the elongation of the base material. In some embodiments, the base material before applying the non-ionizing radiation can have elongation and wherein the recycled base material can have at least about 99% of the elongation of the base material.

In some embodiments, the base material before applying the non-ionizing radiation can have coefficients of thermal expansion and wherein the recycled base material can have at least about 80% of the coefficients of thermal expansion of the base material. In some embodiments, the base material before applying the non-ionizing radiation can have coefficients of thermal expansion and wherein the recycled base material can have at least about 81% of the coefficients of thermal expansion of the base material. In some embodiments, the base material before applying the non-ionizing radiation can have coefficients of thermal expansion and wherein the recycled base material can have at least about 82% of the coefficients of thermal expansion of the base material. In some embodiments, the base material before applying the non-ionizing radiation can have coefficients of thermal expansion and wherein the recycled base material can have at least about 83% of the coefficients of thermal expansion of the base material. In some embodiments, the base material before applying the non-ionizing radiation can have coefficients of thermal expansion and wherein the recycled base material can have at least about 84% of the coefficients of thermal expansion of the base material. In some embodiments, the base material before applying the non-ionizing radiation can have coefficients of thermal expansion and wherein the recycled base material can have at least about 85% of the coefficients of thermal expansion of the base material. In some embodiments, the base material before applying the non-ionizing radiation can have coefficients of thermal expansion and wherein the recycled base material can have at least about 86% of the coefficients of thermal expansion of the base material. In some embodiments, the base material before applying the non-ionizing radiation can have coefficients of thermal expansion and wherein the recycled base material can have at least about 87% of the coefficients of thermal expansion of the base material. In some embodiments, the base material before applying the non-ionizing radiation can have coefficients of thermal expansion and wherein the recycled base material can have at least about 88% of the coefficients of thermal expansion of the base material. In some embodiments, the base material before applying the non-ionizing radiation can have coefficients of thermal expansion and wherein the recycled base material can have at least about 89% of the coefficients of thermal expansion of the base material.

In some embodiments, the base material before applying the non-ionizing radiation can have coefficients of thermal expansion and wherein the recycled base material can have at least about 90% of the coefficients of thermal expansion of the base material. In some embodiments, the base material before applying the non-ionizing radiation can have coefficients of thermal expansion and wherein the recycled base material can have at least about 91% of the coefficients of thermal expansion of the base material. In some embodiments, the base material before applying the non-ionizing radiation can have coefficients of thermal expansion and wherein the recycled base material can have at least about 92% of the coefficients of thermal expansion of the base material. In some embodiments, the base material before applying the non-ionizing radiation can have coefficients of thermal expansion and wherein the recycled base material can have at least about 93% of the coefficients of thermal expansion of the base material. In some embodiments, the base material before applying the non-ionizing radiation can have coefficients of thermal expansion and wherein the recycled base material can have at least about 94% of the coefficients of thermal expansion of the base material. In some embodiments, the base material before applying the non-ionizing radiation can have coefficients of thermal expansion and wherein the recycled base material can have at least about 95% of the coefficients of thermal expansion of the base material. In some embodiments, the base material before applying the non-ionizing radiation can have coefficients of thermal expansion and wherein the recycled base material can have at least about 96% of the coefficients of thermal expansion of the base material. In some embodiments, the base material before applying the non-ionizing radiation can have coefficients of thermal expansion and wherein the recycled base material can have at least about 97% of the coefficients of thermal expansion of the base material. In some embodiments, the base material before applying the non-ionizing radiation can have coefficients of thermal expansion and wherein the recycled base material can have at least about 98% of the coefficients of thermal expansion of the base material. In some embodiments, the base material before applying the non-ionizing radiation can have coefficients of thermal expansion and wherein the recycled base material can have at least about 99% of the coefficients of thermal expansion of the base material.

In some embodiments, the base material before applying the non-ionizing radiation can have coefficients of thermal conductivity and wherein the recycled base material can have at least about 80% of the coefficients of thermal conductivity of the base material. In some embodiments, the base material before applying the non-ionizing radiation can have coefficients of thermal conductivity and wherein the recycled base material can have at least about 81% of the coefficients of thermal conductivity of the base material. In some embodiments, the base material before applying the non-ionizing radiation can have coefficients of thermal conductivity and wherein the recycled base material can have at least about 82% of the coefficients of thermal conductivity of the base material. In some embodiments, the base material before applying the non-ionizing radiation can have coefficients of thermal conductivity and wherein the recycled base material can have at least about 83% of the coefficients of thermal conductivity of the base material. In some embodiments, the base material before applying the non-ionizing radiation can have coefficients of thermal conductivity and wherein the recycled base material can have at least about 84% of the coefficients of thermal conductivity of the base material. In some embodiments, the base material before applying the non-ionizing radiation can have coefficients of thermal conductivity and wherein the recycled base material can have at least about 85% of the coefficients of thermal conductivity of the base material. In some embodiments, the base material before applying the non-ionizing radiation can have coefficients of thermal conductivity and wherein the recycled base material can have at least about 86% of the coefficients of thermal conductivity of the base material. In some embodiments, the base material before applying the non-ionizing radiation can have coefficients of thermal conductivity and wherein the recycled base material can have at least about 87% of the coefficients of thermal conductivity of the base material. In some embodiments, the base material before applying the non-ionizing radiation can have coefficients of thermal conductivity and wherein the recycled base material can have at least about 88% of the coefficients of thermal conductivity of the base material. In some embodiments, the base material before applying the non-ionizing radiation can have coefficients of thermal conductivity and wherein the recycled base material can have at least about 89% of the coefficients of thermal conductivity of the base material.

In some embodiments, the base material before applying the non-ionizing radiation can have coefficients of thermal conductivity and wherein the recycled base material can have at least about 90% of the coefficients of thermal conductivity of the base material. In some embodiments, the base material before applying the non-ionizing radiation can have coefficients of thermal conductivity and wherein the recycled base material can have at least about 91% of the coefficients of thermal conductivity of the base material. In some embodiments, the base material before applying the non-ionizing radiation can have coefficients of thermal conductivity and wherein the recycled base material can have at least about 92% of the coefficients of thermal conductivity of the base material. In some embodiments, the base material before applying the non-ionizing radiation can have coefficients of thermal conductivity and wherein the recycled base material can have at least about 93% of the coefficients of thermal conductivity of the base material. In some embodiments, the base material before applying the non-ionizing radiation can have coefficients of thermal conductivity and wherein the recycled base material can have at least about 94% of the coefficients of thermal conductivity of the base material. In some embodiments, the base material before applying the non-ionizing radiation can have coefficients of thermal conductivity and wherein the recycled base material can have at least about 95% of the coefficients of thermal conductivity of the base material. In some embodiments, the base material before applying the non-ionizing radiation can have coefficients of thermal conductivity and wherein the recycled base material can have at least about 96% of the coefficients of thermal conductivity of the base material. In some embodiments, the base material before applying the non-ionizing radiation can have coefficients of thermal conductivity and wherein the recycled base material can have at least about 97% of the coefficients of thermal conductivity of the base material. In some embodiments, the base material before applying the non-ionizing radiation can have coefficients of thermal conductivity and wherein the recycled base material can have at least about 98% of the coefficients of thermal conductivity of the base material. In some embodiments, the base material before applying the non-ionizing radiation can have coefficients of thermal conductivity and wherein the recycled base material can have at least about 99% of the coefficients of thermal conductivity of the base material.

In some embodiments, the base material before applying the non-ionizing radiation can have electrical conductivity and wherein the recycled base material can have at least about 80% of the electrical conductivity of the base material. In some embodiments, the base material before applying the non-ionizing radiation can have electrical conductivity and wherein the recycled base material can have at least about 81% of the electrical conductivity of the base material. In some embodiments, the base material before applying the non-ionizing radiation can have electrical conductivity and wherein the recycled base material can have at least about 82% of the electrical conductivity of the base material. In some embodiments, the base material before applying the non-ionizing radiation can have electrical conductivity and wherein the recycled base material can have at least about 83% of the electrical conductivity of the base material. In some embodiments, the base material before applying the non-ionizing radiation can have electrical conductivity and wherein the recycled base material can have at least about 84% of the electrical conductivity of the base material. In some embodiments, the base material before applying the non-ionizing radiation can have electrical conductivity and wherein the recycled base material can have at least about 85% of the electrical conductivity of the base material. In some embodiments, the base material before applying the non-ionizing radiation can have electrical conductivity and wherein the recycled base material can have at least about 86% of the electrical conductivity of the base material. In some embodiments, the base material before applying the non-ionizing radiation can have electrical conductivity and wherein the recycled base material can have at least about 87% of the electrical conductivity of the base material. In some embodiments, the base material before applying the non-ionizing radiation can have electrical conductivity and wherein the recycled base material can have at least about 88% of the electrical conductivity of the base material. In some embodiments, the base material before applying the non-ionizing radiation can have electrical conductivity and wherein the recycled base material can have at least about 89% of the electrical conductivity of the base material.

In some embodiments, the base material before applying the non-ionizing radiation can have electrical conductivity and wherein the recycled base material can have at least about 90% of the electrical conductivity of the base material. In some embodiments, the base material before applying the non-ionizing radiation can have electrical conductivity and wherein the recycled base material can have at least about 91% of the electrical conductivity of the base material. In some embodiments, the base material before applying the non-ionizing radiation can have electrical conductivity and wherein the recycled base material can have at least about 92% of the electrical conductivity of the base material. In some embodiments, the base material before applying the non-ionizing radiation can have electrical conductivity and wherein the recycled base material can have at least about 93% of the electrical conductivity of the base material. In some embodiments, the base material before applying the non-ionizing radiation can have electrical conductivity and wherein the recycled base material can have at least about 94% of the electrical conductivity of the base material. In some embodiments, the base material before applying the non-ionizing radiation can have electrical conductivity and wherein the recycled base material can have at least about 95% of the electrical conductivity of the base material. In some embodiments, the base material before applying the non-ionizing radiation can have electrical conductivity and wherein the recycled base material can have at least about 96% of the electrical conductivity of the base material. In some embodiments, the base material before applying the non-ionizing radiation can have electrical conductivity and wherein the recycled base material can have at least about 97% of the electrical conductivity of the base material. In some embodiments, the base material before applying the non-ionizing radiation can have electrical conductivity and wherein the recycled base material can have at least about 98% of the electrical conductivity of the base material. In some embodiments, the base material before applying the non-ionizing radiation can have electrical conductivity and wherein the recycled base material can have at least about 99% of the electrical conductivity of the base material.

In some embodiments, the base material before applying the non-ionizing radiation can have density and wherein the recycled base material can have at least about 80% of the density of the base material. In some embodiments, the base material before applying the non-ionizing radiation can have density and wherein the recycled base material can have at least about 81% of the density of the base material. In some embodiments, the base material before applying the non-ionizing radiation can have density and wherein the recycled base material can have at least about 82% of the density of the base material. In some embodiments, the base material before applying the non-ionizing radiation can have density and wherein the recycled base material can have at least about 83% of the density of the base material. In some embodiments, the base material before applying the non-ionizing radiation can have density and wherein the recycled base material can have at least about 84% of the density of the base material. In some embodiments, the base material before applying the non-ionizing radiation can have density and wherein the recycled base material can have at least about 85% of the density of the base material. In some embodiments, the base material before applying the non-ionizing radiation can have density and wherein the recycled base material can have at least about 86% of the density of the base material. In some embodiments, the base material before applying the non-ionizing radiation can have density and wherein the recycled base material can have at least about 87% of the density of the base material. In some embodiments, the base material before applying the non-ionizing radiation can have density and wherein the recycled base material can have at least about 88% of the density of the base material. In some embodiments, the base material before applying the non-ionizing radiation can have density and wherein the recycled base material can have at least about 89% of the density of the base material.

In some embodiments, the base material before applying the non-ionizing radiation can have density and wherein the recycled base material can have at least about 90% of the density of the base material. In some embodiments, the base material before applying the non-ionizing radiation can have density and wherein the recycled base material can have at least about 91% of the density of the base material. In some embodiments, the base material before applying the non-ionizing radiation can have density and wherein the recycled base material can have at least about 92% of the density of the base material. In some embodiments, the base material before applying the non-ionizing radiation can have density and wherein the recycled base material can have at least about 93% of the density of the base material. In some embodiments, the base material before applying the non-ionizing radiation can have density and wherein the recycled base material can have at least about 94% of the density of the base material. In some embodiments, the base material before applying the non-ionizing radiation can have density and wherein the recycled base material can have at least about 95% of the density of the base material. In some embodiments, the base material before applying the non-ionizing radiation can have density and wherein the recycled base material can have at least about 96% of the density of the base material. In some embodiments, the base material before applying the non-ionizing radiation can have density and wherein the recycled base material can have at least about 97% of the density of the base material. In some embodiments, the base material before applying the non-ionizing radiation can have density and wherein the recycled base material can have at least about 98% of the density of the base material. In some embodiments, the base material before applying the non-ionizing radiation can have density and wherein the recycled base material can have at least about 99% of the density of the base material.

In some embodiments, at least about 70% of the base material can be intact after the polymer material can be substantially removed from the base material. In some embodiments, at least about 71% of the base material can be intact after the polymer material can be substantially removed from the base material. In some embodiments, at least about 72% of the base material can be intact after the polymer material can be substantially removed from the base material. In some embodiments, at least about 73% of the base material can be intact after the polymer material can be substantially removed from the base material. In some embodiments, at least about 74% of the base material can be intact after the polymer material can be substantially removed from the base material. In some embodiments, at least about 75% of the base material can be intact after the polymer material can be substantially removed from the base material. In some embodiments, at least about 76% of the base material can be intact after the polymer material can be substantially removed from the base material. In some embodiments, at least about 77% of the base material can be intact after the polymer material can be substantially removed from the base material. In some embodiments, at least about 78% of the base material can be intact after the polymer material can be substantially removed from the base material. In some embodiments, at least about 79% of the base material can be intact after the polymer material can be substantially removed from the base material.

In some embodiments, at least about 80% of the base material can be intact after the polymer material can be substantially removed from the base material. In some embodiments, at least about 81% of the base material can be intact after the polymer material can be substantially removed from the base material. In some embodiments, at least about 82% of the base material can be intact after the polymer material can be substantially removed from the base material. In some embodiments, at least about 83% of the base material can be intact after the polymer material can be substantially removed from the base material. In some embodiments, at least about 84% of the base material can be intact after the polymer material can be substantially removed from the base material. In some embodiments, at least about 85% of the base material can be intact after the polymer material can be substantially removed from the base material. In some embodiments, at least about 86% of the base material can be intact after the polymer material can be substantially removed from the base material. In some embodiments, at least about 87% of the base material can be intact after the polymer material can be substantially removed from the base material. In some embodiments, at least about 88% of the base material can be intact after the polymer material can be substantially removed from the base material. In some embodiments, at least about 89% of the base material can be intact after the polymer material can be substantially removed from the base material.

In some embodiments, at least about 90% of the base material can be intact after the polymer material can be substantially removed from the base material. In some embodiments, at least about 91% of the base material can be intact after the polymer material can be substantially removed from the base material. In some embodiments, at least about 92% of the base material can be intact after the polymer material can be substantially removed from the base material. In some embodiments, at least about 93% of the base material can be intact after the polymer material can be substantially removed from the base material. In some embodiments, at least about 94% of the base material can be intact after the polymer material can be substantially removed from the base material. In some embodiments, at least about 95% of the base material can be intact after the polymer material can be substantially removed from the base material. In some embodiments, at least about 96% of the base material can be intact after the polymer material can be substantially removed from the base material. In some embodiments, at least about 97% of the base material can be intact after the polymer material can be substantially removed from the base material. In some embodiments, at least about 98% of the base material can be intact after the polymer material can be substantially removed from the base material. In some embodiments, at least about 99% of the base material can be intact after the polymer material can be substantially removed from the base material. In some embodiments, at least about 99.5% of the base material can be intact after the polymer material can be substantially removed from the base material. In some embodiments, at least about 99.7% of the base material can be intact after the polymer material can be substantially removed from the base material.

In some embodiments, the recycled base material can be not substantially oxidized or degraded after the polymer material can be substantially removed from the base material. In some embodiments, less than about 5 weight percent of the base material can be degraded after the polymer material can be substantially removed from the base material. In some embodiments, less than about 2 weight percent of the base material can be degraded after the polymer material can be substantially removed from the base material. In some embodiments, less than about 1 weight percent of the base material can be degraded after the polymer material can be substantially removed from the base material. In some embodiments, less than about 0.5 weight percent of the base material can be degraded after the polymer material can be substantially removed from the base material. In some embodiments, less than about 0.3 weight percent of the base material can be degraded after the polymer material can be substantially removed from the base material. In some embodiments, less than about 0.1 weight percent of the base material can be degraded after the polymer material can be substantially removed from the base material. In some embodiments, less than about 0.01 weight percent of the base material can be degraded after the polymer material can be substantially removed from the base material.

In some embodiments, less than about 0.005 weight percent of the base material can be degraded after the polymer material can be substantially removed from the base material. In some embodiments, the non-ionizing radiation can have a frequency of from about 500 MHz to about 3000 MHz. In some embodiments, the non-ionizing radiation can have a frequency of from about 600 MHz to about 2900 MHZ. In some embodiments, the non-ionizing radiation can have a frequency of from about 700 MHz to about 2800 MHZ. In some embodiments, the non-ionizing radiation can have a frequency of from about 800 MHz to about 2700 MHz. In some embodiments, the non-ionizing radiation can have a frequency of from about 900 MHz to about 2900 MHz. In some embodiments, the non-ionizing radiation can have a frequency of from about 900 MHz to about 2800 MHZ. In some embodiments, the non-ionizing radiation can have a frequency of from about 900 MHz to about 2700 MHz. In some embodiments, the non-ionizing radiation can have a frequency of from about 900 MHz to about 2600 MHz. In some embodiments, the non-ionizing radiation can have a frequency of from about 900 MHz to about 2500 MHz. In some embodiments, the non-ionizing radiation can have a frequency of from about 500 MHz to about 2900 MHz. In some embodiments, the non-ionizing radiation can have a frequency of from about 500 MHz to about 2700 MHz. In some embodiments, the non-ionizing radiation can have a frequency of from about 500 MHz to about 2600 MHz. In some embodiments, the non-ionizing radiation can have a frequency of from about 500 MHz to about 2500 MHz. In some embodiments, the non-ionizing radiation can have a frequency of from about 915 MHz to about 2450 MHz.

In some embodiments, before applying the non-ionizing radiation, the $N_2$ can be applied to contact the composite material. In some embodiments, after the $N_2$ can be applied to contact the composite material, the $H_2O$ can be applied to contact the composite material. In some embodiments, during applying the non-ionizing radiation, the $H_2O$ can be applied to contact the composite material. In some embodiments, at least a portion of the $N_2$ and at least a portion of the $H_2O$ can be applied simultaneously to contact the composite material. In some embodiments, at least a portion of the $N_2$ and at least a portion of the $H_2O$ can be applied simultaneously to contact the composite material before applying the non-ionizing radiation. In some embodiments, at least a portion of the $N_2$ and at least a portion of the $H_2O$ can be applied simultaneously to contact the composite material during applying the non-ionizing radiation.

In some embodiments, at least a portion of the $N_2$ and at least a portion of the $H_2O$ can be applied simultaneously to contact the composite material after applying the non-ionizing radiation. In some embodiments, the gas mixture may comprise from about 0.1% to about 20% by volume of $H_2O$. In some embodiments, the gas mixture may comprise from about 0.1% to about 15% by volume of $H_2O$. In some embodiments, the gas mixture may comprise from about 0.1% to about 10% by volume of $H_2O$. In some embodiments, the gas mixture may comprise from about 0.1% to about 8% by volume of $H_2O$. In some embodiments, the gas mixture may comprise from about 0.1% to about 5% by volume of $H_2O$. In some embodiments, the gas mixture may comprise from about 0.1% to about 3% by volume of $H_2O$. In some embodiments, the gas mixture may comprise from about 0.1% to about 1% by volume of $H_2O$. In some embodiments, the gas mixture can be essentially free of oxygen. In some embodiments, the gas mixture contains no more than about 1% by volume of oxygen. In some embodiments, the gas mixture contains no more than about 0.5% by volume of oxygen. In some embodiments, the gas mixture contains no more than about 0.1% by volume of oxygen. In some embodiments, the gas mixture contains no more than about 0.01% by volume of oxygen.

In some embodiments, the base material can have break rate of no more than about 25% after the polymer material can be removed from the base material. In some embodiments, the base material can have break rate of no more than about 20% after the polymer material can be removed from the base material. In some embodiments, the base material can have break rate of no more than about 15% after the polymer material can be removed from the base material. In some embodiments, the base material can have break rate of no more than about 10% after the polymer material can be removed from the base material. In some embodiments, the base material can have break rate of no more than about 5% after the polymer material can be removed from the base material. In some embodiments, the base material can have break rate of no more than about 3% after the polymer material can be removed from the base material. In some embodiments, the base material can have break rate of no more than about 2% after the polymer material can be removed from the base material. In some embodiments, the base material can have break rate of no more than about 1% after the polymer material can be removed from the base material. In some embodiments, the process can be a batch process. In some embodiments, the process can be a continuous process.

In some embodiments, the recycled base material after the process can have an increased electric conductivity compared to a base material recycle process without the $H_2O$ and $N_2$. In some embodiments, the recycled base material after the process can have a 10% increased electric conductivity compared to a base material recycle process without the $H_2O$ and $N_2$. In some embodiments, the recycled base material after the process can have a 20% increased electric conductivity compared to a base material recycle process without the $H_2O$ and $N_2$. In some embodiments, the recycled base material after the process can have a 30% increased electric conductivity compared to a base material recycle process without the $H_2O$ and $N_2$. In some embodiments, the recycled base material after the process can have a 50% increased electric conductivity compared to a base material recycle process without the $H_2O$ and $N_2$.

In some embodiments, the recycled base material after the process can have an increased thermal conductivity compared to a base material recycle process without the gas mixture of $H_2O$ and $N_2$. In some embodiments, the recycled base material after the process can have a 10% increased thermal conductivity compared to a base material recycle process without the $H_2O$ and $N_2$. In some embodiments, the recycled base material after the process can have a 20% increased thermal conductivity compared to a base material recycle process without the $H_2O$ and $N_2$. In some embodiments, the recycled base material after the process can have a 30% increased thermal conductivity compared to a base material recycle process without the $H_2O$ and $N_2$. In some embodiments, the recycled base material after the process can have a 50% increased thermal conductivity compared to a base material recycle process without the $H_2O$ and $N_2$.

The present disclosure can be related to an apparatus for recycling composite material comprising base material composited with polymer material. In some embodiments, the apparatus can comprise a reactor to contain the composite material, a non-ionizing radiation generator to apply a non-ionizing radiation to the composite material in the reactor, and at least one port in fluid communication with a $N_2$ source to supply $N_2$ to the reactor and in fluid communication with a $H_2O$ source to supply $H_2O$ to the reactor, to cause contacting the composite material with a gas mixture of the $H_2O$ and the $N_2$ while maintaining the non-ionizing radiation generator to generate the non-ionizing radiation, wherein the non-ionizing radiation generator can be to maintain generating the non-ionizing radiation until the polymer material can be substantially removed from the base material as recycled base material.

In some embodiments, the apparatus can further comprise a steam generator to supply the $H_2O$ to the reactor as a steam. In some embodiments, the at least one port can include a port in fluid communication with the $N_2$ source and the $H_2O$ source to supply the $N_2$ and the $H_2O$ to contact the composite material. In some embodiments, the at least one port can include a first port in fluid communication with the $N_2$ source to supply the $N_2$ to contact the composite material, and a second port in fluid communication with the $H_2O$ source to supply the $H_2O$ to contact the composite material. In some embodiments, the base material can include carbon fibers. In some embodiments, the base material can include glass fibers.

In some embodiments, the base material can include carbon fibers and glass fibers. In some embodiments, the polymer material can be thermoplastic material. In some embodiments, the apparatus can be to remove at least 80% of the polymer material. In some embodiments, the apparatus can be to remove at least 81% of the polymer material. In some embodiments, the apparatus can be to remove at least 82% of the polymer material. In some embodiments, the apparatus can be to remove at least 83% of the polymer material. In some embodiments, the apparatus can be to remove at least 84% of the polymer material. In some embodiments, the apparatus can be to remove at least 85% of the polymer material. In some embodiments, the apparatus can be to remove at least 86% of the polymer material. In some embodiments, the apparatus can be to remove at least 87% of the polymer material. In some embodiments, the apparatus can be to remove at least 88% of the polymer material. In some embodiments, the apparatus can be to remove at least 89% of the polymer material. In some embodiments, the apparatus can be to remove at least 90% of the polymer material. In some embodiments, the apparatus can be to remove at least 91% of the polymer material. In some embodiments, the apparatus can be to remove at least 92% of the polymer material. In some embodiments, the apparatus can be to remove at least 93% of the polymer material. In some embodiments, the apparatus can be to remove at least 94% of the polymer material. In some embodiments, the apparatus can be to remove at least 95% of the polymer material. In some embodiments, the apparatus can be to remove at least 97% of the polymer material. In some embodiments, the apparatus can be to remove at least 98% of the polymer material. In some embodiments, the apparatus can be to remove at least 99% of the polymer material. In some embodiments, the apparatus can be to remove at least 99.5% of the polymer material.

In some embodiments, the non-ionizing radiation can be sufficient to cause pyrolysis of the polymer material.

In some embodiments, the non-ionizing radiation can be sufficient to cause melting of the polymer material. In some embodiments, the non-ionizing radiation can have a frequency of from about 500 MHz to about 3000 MHz. In some embodiments, the non-ionizing radiation can have a frequency of from about 600 MHz to about 2900 MHz. In some embodiments, the non-ionizing radiation can have a frequency of from about 700 MHz to about 2800 MHz. In some embodiments, the non-ionizing radiation can have a frequency of from about 800 MHz to about 2700 MHz. In some embodiments, the non-ionizing radiation can have a frequency of from about 900 MHz to about 2900 MHz. In some embodiments, the non-ionizing radiation can have a frequency of from about 900 MHz to about 2800 MHz. In some embodiments, the non-ionizing radiation can have a frequency of from about 900 MHz to about 2700 MHz. In some embodiments, the non-ionizing radiation can have a frequency of from about 900 MHz to about 2600 MHz. In some embodiments, the non-ionizing radiation can have a frequency of from about 900 MHz to about 2500 MHz. In some embodiments, the non-ionizing radiation can have a frequency of from about 500 MHz to about 2900 MHz. In some embodiments, the non-ionizing radiation can have a frequency of from about 500 MHz to about 2700 MHz. In some embodiments, the non-ionizing radiation can have a frequency of from about 500 MHz to about 2600 MHz. In some embodiments, the non-ionizing radiation can have a frequency of from about 500 MHz to about 2500 MHz. In some embodiments, the non-ionizing radiation can have a frequency of from about 915 MHz to about 2450 MHz.

In some embodiments, before applying the non-ionizing radiation, the $N_2$ can be applied through the at least one port to contact the composite material. In some embodiments, after the $N_2$ can be applied to contact the composite material, the $H_2O$ can be applied through the at least one port to contact the composite material. In some embodiments, while the non-ionizing radiation generator can be applying the non-ionizing radiation, the $H_2O$ can be applied through the at least one port to contact the composite material.

In some embodiments, at least a portion of the $N_2$ and at least a portion of the $H_2O$ can be applied through the at least one port simultaneously to contact the composite material. In some embodiments, at least a portion of the $N_2$ and at least a portion of the $H_2O$ can be applied through the at least one port simultaneously to contact the composite material before applying the non-ionizing radiation. In some embodiments, at least a portion of the $N_2$ and at least a portion of the $H_2O$ can be applied simultaneously through the at least one port to contact the composite material during applying the non-ionizing radiation. In some embodiments, at least a portion of the $N_2$ and at least a portion of the $H_2O$ can be applied simultaneously through the at least one port to contact the composite material after applying the non-ionizing radiation.

In some embodiments, the gas mixture may comprise from about 0.1% to about 20% by volume of $H_2O$. In some embodiments, the gas mixture may comprise from about 0.1% to about 15% by volume of $H_2O$. In some embodiments, the gas mixture may comprise from about 0.1% to about 10% by volume of $H_2O$. In some embodiments, the gas mixture may comprise from about 0.1% to about 8% by volume of $H_2O$. In some embodiments, the gas mixture may comprise from about 0.1% to about 5% by volume of $H_2O$. In some embodiments, the gas mixture may comprise from about 0.1% to about 3% by volume of $H_2O$. In some embodiments, the gas mixture may comprise from about 0.1% to about 1% by volume of $H_2O$. In some embodiments, the gas mixture can be essentially free of oxygen. In some embodiments, the gas mixture contains no more than about 1% by volume of oxygen. In some embodiments, the gas mixture contains no more than about 0.5% by volume of oxygen. In some embodiments, the gas mixture contains no more than about 0.1% by volume of oxygen. In some embodiments, the gas mixture contains no more than about 0.01% by volume of oxygen. In some embodiments, the apparatus can be to perform a batch process. In some embodiments, the apparatus can be to perform a continuous process.

In some embodiments, the apparatus may be to perform a batch process. In some embodiments, the apparatus may be to perform a continuous process.

DETAILED DESCRIPTION

Figure 1:
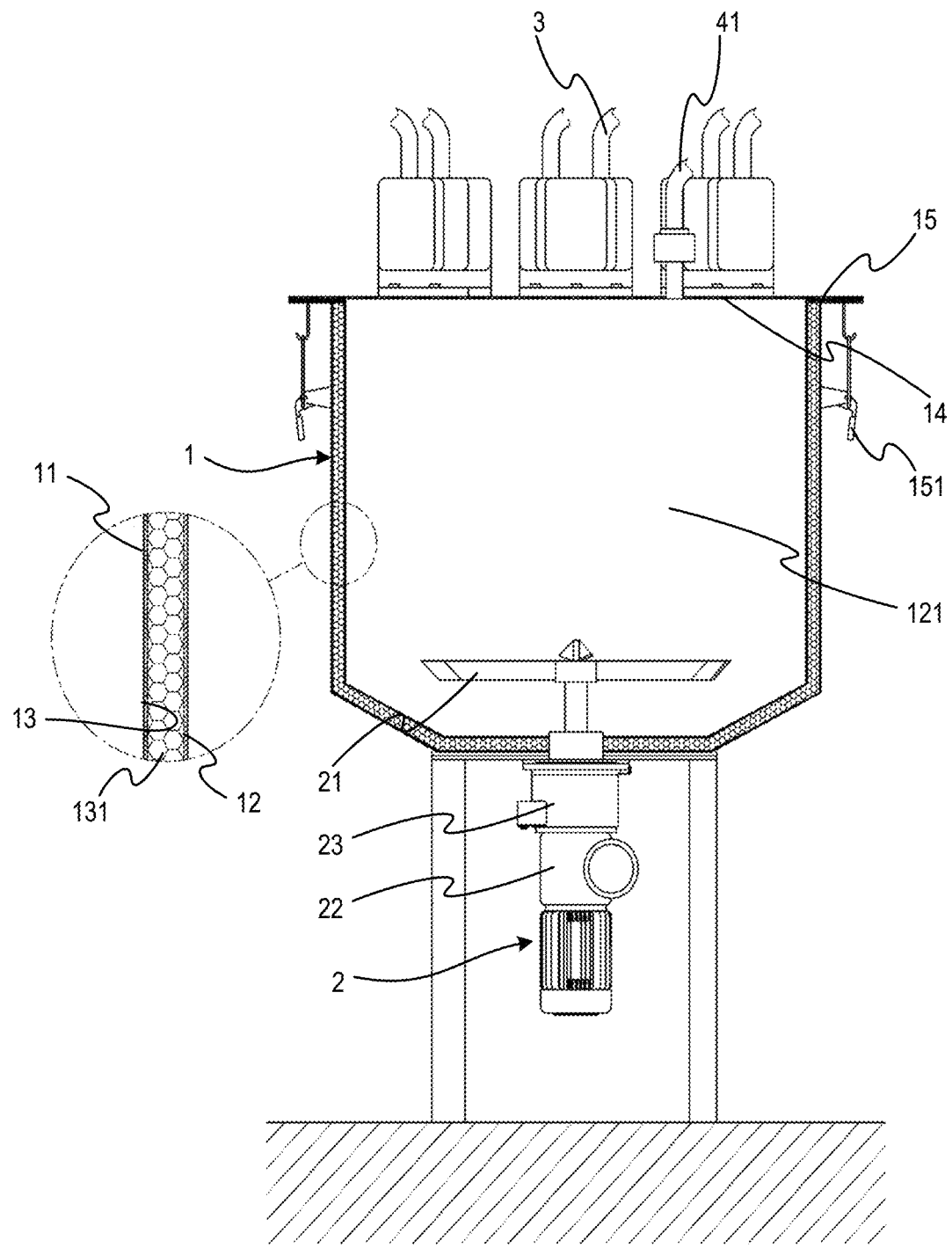
FIG. 1 illustrates a microwave device including a container, a stirring device, and a microwave generator in some embodiments.

As used herein, the articles "a," "an," and "any" refer to the grammar of one or more than one (e.g., at least one) item. For example, "an element" means one element or more than one element.

The term "bottom" used to describe the position of the structure disclosed in the content of the author's description and the scope of the patent application does not specifically refer to the bottommost surface or end of the structure, but refers to the bottommost surface or end of the structure, and Adjacent to various positions around the bottommost point, but not covering the area above the horizontal center of the structure; "top", not a single specific surface or end of the topmost structure, refers to the topmost surface or end of the structure. end, and various positions adjacent to the topmost point, but not below the horizontal center of the structure.

As used herein, the terms "inner" and "inner" describing the position of a structure refer to a position close to the center of the structure body, or use a position that is not exposed; the terms "outer" and "outer" refer to a position away from the structure body center position, or use an exposed position.

The term "on" used to describe the position of the structure disclosed in the content of this creation specification (eg: on a certain element, on the surface of a certain element) refers to any surface position of the structure, not commonly known as "above" or "above" with a directionality. "above".

The terms "fixed" and "arranged" used to describe the structure combination relationship disclosed in the content of this creation manual generally refer to the fact that multiple structures will not be easily separated or dropped after being combined. It can be a fixed connection or a Detachable connection, integrally formed connection, mechanical connection, electrical connection, or direct physical connection, or indirect connection through intermediate media, such as: using threads, tenons, fasteners, nails, adhesives or high Any combination of cycles.

The terms "pivot" or "pivot" used to describe the structure combination disclosed in the content of this creation manual refer to the combination of hinges, cylinders, spheres, holes and slots, or multiple structures. The bearings can be assembled with each other, so that the multiple structures can still rotate or slide within a limited range at will without being easily separated or dropped.

The term "formation" used to describe the structure combination disclosed in the content of this creation specification generally refers to one structure or multiple structures combined into the same body during manufacture, or the same body due to different positions, shapes and The corresponding structure produced by the function.

The present disclosure is related to recycling technology and products. The present disclosure is related to recycling a material, a matter, and/or a component included in a mixture such as a composite. The present disclosure is related to separating or recycling a type of material from a mixture or composite including one or more other types of materials. In some embodiments, examples of types of materials include carbon-based materials, glass-based materials, other materials, biomass, waste wood, rice husk, asphalt, medical waste, waste plastic, waste rubber, printed circuit boards, solar panels and other wastes. The present disclosure is related to separating or recycling of a type of material that is of a value in some respect, such as advanced materials, such as carbon fibers and glass fibers. For example, the present disclosure is related to recycling carbon-based materials, such as carbon fiber, graphene, active carbons, carbon nanotubes (CNTs), carbon nanofibers, pyrolytic carbon, carbon micro and nanodots, carbon nanohorns, micro and nanoscale carbon structures, diamond-Like Carbon (DLC), carbon nanoribbons, carbon micro and nanocomposites, carbon foam, etc.

In some embodiments, recycling or separating a material from a mixture or composite may involve integration of high temperature heat treatment systems. In some embodiments, materials containing carbon fibers may be recycled by separating carbon fibers from other materials.

The present disclosure is related to a used material article including a base material and a microwave regeneration device, which can separate and regenerate or recycle base material from the used material article including the base material using an energy form such as a wave, e.g., a microwave, so that a used material article including a base material body can be recycled.

In some embodiments, a device or system can be provided to apply a form of energy to initiate, facilitate, or drive a material separation process. In some embodiments, a device or system can be provided to apply a wave to initiate, facilitate, or drive a material separation process. For example, in some embodiments, a microwave device, which can be used to regenerate a used material article including base material such as carbon fibers. In some embodiments, the microwave device may comprise a container and a stirring device. In some embodiments, the container can be used for filling the used material article including carbon fibers. In some embodiments, the container can be provided with a material channel and a plurality of through holes. In some embodiments, the material channel and a hole of the through holes communicate with the processing space in the container. In some embodiments, a sealing element can be arranged on the material channel. In some embodiments, holes of the through holes can be used for various purposes, reasons, or uses. In some embodiments, holes of the through holes can be used to install a microwave generator, a gas control component, a thermometer and a pressure gauge, etc. In some embodiments, the stirring device can be installed to be positioned in various positions in the container, for example, to facilitate or optimize the mixing or a microwave transmission. In some embodiments, the microwave generator can emit microwaves in various directions. In some embodiments, the microwave generator can emit microwaves toward a wall of the container. In some embodiments, the stirring device can stir the used material article placed in the container. In some embodiments, carbon fibers in the used material article can be separated out from the used material article. In some embodiments, the separated carbon fibers can be recycled after microwave treatment.

In some embodiments, a used material article including a base material can be processed by a microwave regeneration device or system.

In some embodiments, microwave heating can effectively block thermal energy and allow a used material article including a base material to be activated. In some embodiments, the carbon can be regenerated after being heated evenly based on a microwave-based process, such that a used material article including a base material regeneration microwave device. In some embodiments, a device can be provided to replace steam by microwave heating to overcome the damage of steam to a used material article including a base material. In some embodiments, with microwave, there may not be a need to concentrate a small amount of on-site immediate treatment.

In some embodiments, a used material article including a base material regeneration microwave device can include a container, such as a container for containing an object such as a used material article, as an isolation container, and a stirrer such as a stirrer component or stirring device. In some embodiments, the container can be used for filling a used material article including a base material body to be regenerated. In some embodiments, the container can have an outer barrel and an inner barrel. In some embodiments, the inner barrel can be fastened on the inner side of the outer barrel. In some embodiments, the inner barrel can be concavely provided with a processing space. In some embodiments, the container can be provided with a material channel and a plurality of through holes, the material channel and a through hole of the through holes can be communicated with the processing space, a sealing element can be arranged on the material channel, and a hole of the through holes can be used to install a microwave generator, a gas control component, a thermometer and a pressure gauge. In some embodiments, a thermal insulation layer can be formed between the outer barrel and the inner barrel. In some embodiments, the stirrer or stirring device is installed on the isolating container for stirring a used material article including a base material body inside the isolating container.

In some embodiments, the feed channel is opened above or on the side of the insulating container. In some embodiments, the heat insulating layer can be vacuum or filled with a heat insulating material, and the heat insulating material can be any one or a combination of two or more of ceramic wool, ceramic plate, aerogel or heat insulating paint.

In some embodiments, the microwave generator can use. a microwave magnetron. In some embodiments, the non-ionizing radiation can be sufficient to cause pyrolysis of the polymer material. In some embodiments, the non-ionizing radiation can be sufficient to cause melting of the polymer material. In some embodiments, the non-ionizing radiation can have a frequency of from about 500 MHz to about 3000 MHz. In some embodiments, the non-ionizing radiation can have a frequency of from about 600 MHz to about 2900 MHz. In some embodiments, the non-ionizing radiation can have a frequency of from about 700 MHz to about 2800 MHz. In some embodiments, the non-ionizing radiation can have a frequency of from about 800 MHz to about 2700 MHz. In some embodiments, the non-ionizing radiation can have a frequency of from about 900 MHz to about 2900 MHz. In some embodiments, the non-ionizing radiation can have a frequency of from about 900 MHz to about 2800 MHZ. In some embodiments, the non-ionizing radiation can have a frequency of from about 900 MHz to about 2700 MHz. In some embodiments, the non-ionizing radiation can have a frequency of from about 900 MHz to about 2600 MHz. In some embodiments, the non-ionizing radiation can have a frequency of from about 900 MHz to about 2500 MHz. In some embodiments, the non-ionizing radiation can have a frequency of from about 500 MHz to about 2900 MHz. In some embodiments, the non-ionizing radiation can have a frequency of from about 500 MHz to about 2700 MHz. In some embodiments, the non-ionizing radiation can have a frequency of from about 500 MHz to about 2600 MHz. In some embodiments, the non-ionizing radiation can have a frequency of from about 500 MHz to about 2500 MHz. In some embodiments, the non-ionizing radiation can have a frequency of from about 915 MHz to about 2450 MHz.

In some embodiments, the microwave generator can use, for example a microwave magnetron for emitting a microwave frequency of from about 915 MHz to about 2450 MHz.

In some embodiments, a process to separate a base materialbase material from a used material article can invlove nitrogen gas ($N_2$) or can occur or can be executed in the presence of nitrogen gas ($N_2$). In some embodiments, a process to separate a base material from a used material article can invlove water ($H_2O$) or can occur or can be executed in the presence of water ($H_2O$). In some embodiments, a process to separate a base material from a used material article can invlove steam ($H_2O$) or can occur or can be executed in the presence of steam ($H_2O$). In some embodiments, a process to separate a base material from a used material article can involve nitrogen gas ($N_2$) and water ($H_2O$) or can occur or can be executed in the presence of nitrogen gas ($N_2$) and water ($H_2O$).

In some embodiments, a process to separate a base material from a used material article can occur with substantially reduced oxygen concentration in the container compared to an ambient air. In some embodiments, a process to separate a base material from a used material article can occur with reduced oxygen concentration by about 50% in the container compared to an ambient air. In some embodiments, a process to separate a base material from a used material article can occur with reduced oxygen concentration by about 70% in the container compared to an ambient air. In some embodiments, a process to separate a base material from a used material article can occur with reduced oxygen concentration by about 90% in the container compared to an ambient air. In some embodiments, a process to separate a base material from a used material article can occur with reduced oxygen concentration by about 95% in the container compared to an ambient air. In some embodiments, a process to separate a base material from a used material article can occur with reduced oxygen concentration by about 98% in the container compared to an ambient air. In some embodiments, a process to separate a base material from a used material article can occur with reduced oxygen concentration by about 99% in the container compared to an ambient air. In some embodiments, a process to separate a base material from a used material article can occur essentially in the absence of oxygen.

In some embodiments, the device can have an inlet or an inlet end for feeding nitrogen. In some embodiments, the device can have an inlet end for feeding steam. In some embodiments, the device can have an inlet or inlet end for feeding nitrogen and steam, for example, as a mixture or separately in batches or in sequences. In some embodiments, the device can have a plurality of inlet or inlet ends. In some embodiments, the device can have a plurality of inlet or inlet ends for feeding nitrogen and steam separately. In some embodiments, the device can have a plurality of inlet or inlet ends for feeding nitrogen and steam separately or as mixtures (same or different mixtures), for example, to inject them at different location or at different times. In some embodiments, the device an outlet or outlet end for discharging the gas inside the container. In some embodiments, the gas control assembly can have an inlet or an inlet end for feeding nitrogen and an outlet end for discharging the gas inside the container.

In some embodiments, the device can have a material channel for feeding nitrogen. In some embodiments, the device can have a material channel for feeding steam. In some embodiments, the device can have a material channel for feeding nitrogen and steam, for example, as a mixture or separately in batches or in sequences. In some embodiments, the device can have a plurality of material channels. In some embodiments, the device can have a plurality of material channels for feeding nitrogen and steam separately. In some embodiments, the device can have a plurality of material channels for feeding nitrogen and steam separately or as mixtures (same or different mixtures), for example, to supply or inject them at different location or at different times. In some embodiments, the gas control assembly can have a material channel for feeding nitrogen and an outlet end for discharging the gas inside the container.

In some embodiments, nitrogen ($N_2$) can be injected or supplied one or more times at or around various time points curing the carbon fiber separation process. In some embodiments, nitrogen ($N_2$) can be injected or supplied continously at least during part of the process or throught the process. In some embodiments, nitrogen ($N_2$) can be injected in one or more batches at various times. In some embodiments, nitrogen ($N_2$) can be injected before applying microwave. In some embodiments, nitrogen ($N_2$) can be injected or supplied while microwave is being applied. In some embodiments, nitrogen ($N_2$) can be injected or supplied when microwave is not applied. In some embodiments, nitrogen ($N_2$) can be injected or supplied after microwave is applied.

In some embodiments, water or steam ($H_2O$) can be injected or supplied one or more times at or around various time points curing the carbon fiber separation process. In some embodiments, water or steam ($H_2O$) can be injected or supplied continously at least during part of the process or throught the process. In some embodiments, water or steam ($H_2O$) can be injected in one or more batches at various times. In some embodiments, water or steam ($H_2O$) can be injected before applying microwave. In some embodiments water or steam ($H_2O$) can be injected or supplied while microwave is being applied. In some embodiments, water or steam ($H_2O$) can be injected or supplied when microwave is not applied. In some embodiments, water or steam ($H_2O$) can be injected or supplied after microwave is applied.

In some embodiments, a used material article including a base material regeneration microwave device also can include at least a container and a stirring device. In some embodiments, the container can be used for filling a used material article including a base material body to be recycled or separated. In some embodiments, the container can have an outer barrel and an inner barrel. In some embodiments, the inner barrel can be fastened on the inner side of the outer barrel. In some embodiments, the inner barrel can be concavely provided with a processing space. In some embodiments, the insulating container can be provided with a material channel. In some embodiments, the material channel can be communicated with the processing space. In some embodiments, the material channel can be arranged on the inner barrel. In some embodiments, a sealing element can be provided. In some embodiments, the sealing element can be provided with a plurality of through holes, a hole of which can be communicated with the processing space. In some embodiments, at least a hole or some of the through holes can be used to install a microwave generator, a gas control component, a thermometer and a pressure gauge, etc. In some embodiments, a heat insulating layer can be formed between the outer barrel and the inner barrel. In some embodiments, the stirring device can be installed on the insulating container, for example, for stirring a used material article including a base material body inside the insulating container.

In some embodiments, a microwave device for recycling a used material article including a base material can comprise a container for filling a used material article including a base material body to be recycled. In some embodiments, the container can have an outer barrel and an inner barrel. In some embodiments, the inner barrel can be fastened on the outer barrel inside the barrel. In some embodiments, the inner barrel can be a concave or have a concave portion with a processing space. In some embodiments, the container can be provided with a material channel and/or a plurality of through holes. In some embodiments, the material channel and one or more hole of the through holes can be communicated with the processing space. In some embodiments, a sealing element can be arranged on the material channel. In some embodiments, one or more hole of through holes can be respectively used to install various components, such as a microwave generator, a gas control component, a thermometer, a pressure gauge, etc. In some embodiments, a thermal insulation layer can be formed between the outer barrel and the inner barrel. In some embodiments, a stirring device can be provided, coupled to the microwave device, or installed. In some embodiments, a stirring device can stir a used material article including a base material body placed in the container.

For example, in some embodiments, the microwave device may comprise a container 1 as an isolation container, an outer barrel, an inner barrel, a processing space, a thermal insulation layer, thermal insulation material, a feedway, a sealing element, a fixing part, a through hole, a stirring device, a blade, a motor, a speed reducer, a microwave generator, an fluid or gas control components, a fluid or gas inlet a fluid or gas outlet, a thermometer, a pressure gauge, a used material article including a base material body, etc.

In some embodiments, the gas control assembly can have an inlet end for feeding nitrogen gas, steam, etc. In some embodiments, an outlet end can be provided for discharging internal gas, thereby filling nitrogen gas entering the container to drive away other gases including oxygen originally located in the container, and let nitrogen dilute the internal oxygen, so that the interior of the container can provides a substantially lower oxygen state such as an essentially oxygen-free state sufficient for conducting the microwave-based separation or recycling process.

In some embodiments, the heat insulating layer can be vacuum (not shown) or filled with a heat insulating material, and the heat insulating material can be ceramic wool, ceramic plate, gas Gel (Aerogel) or thermal insulation paint any one or a combination of two or more.

In some embodiments, the insulating container can effectively seal the microwaves emitted by the microwave generator 3 in the processing space through the heat insulating layer and the sealing element to improve the heating effect. In some embodiments, the stirring device can allow a used material article including a base material body to be stirred and heated evenly in the processing space, so that the effect can be more consistent, uniform or stable.

In some embodiments, the apparatus is to remove at least 80% of the polymer material. In some embodiments, the apparatus is to remove at least 81% of the polymer material. In some embodiments, the apparatus is to remove at least 82% of the polymer material. In some embodiments, the apparatus is to remove at least 83% of the polymer material. In some embodiments, the apparatus is to remove at least 84% of the polymer material. In some embodiments, the apparatus is to remove at least 85% of the polymer material. In some embodiments, the apparatus is to remove at least 86% of the polymer material. In some embodiments, the apparatus is to remove at least 87% of the polymer material. In some embodiments, the apparatus is to remove at least 88% of the polymer material. In some embodiments, the apparatus is to remove at least 89% of the polymer material. In some embodiments, the apparatus is to remove at least 90% of the polymer material. In some embodiments, the apparatus is to remove at least 91% of the polymer material. In some embodiments, the apparatus is to remove at least 92% of the polymer material. In some embodiments, the apparatus is to remove at least 93% of the polymer material. In some embodiments, the apparatus is to remove at least 94% of the polymer material. In some embodiments, the apparatus is to remove at least 95% of the polymer material. In some embodiments, the apparatus is to remove at least 97% of the polymer material. In some embodiments, the apparatus is to remove at least 98% of the polymer material. In some embodiments, the apparatus is to remove at least 99% of the polymer material. In some embodiments, the apparatus is to remove at least 99.5% of the polymer material.

For example, in some embodiments, at least about 80% of the polymer material is removed from the base material. In some embodiments, at least about 81% of the polymer material is removed from the base material. In some embodiments, at least about 82% of the polymer material is removed from the base material. In some embodiments, at least about 83% of the polymer material is removed from the base material. In some embodiments, at least about 84% of the polymer material is removed from the base material. In some embodiments, at least about 85% of the polymer material is removed from the base material. In some embodiments, at least about 86% of the polymer material is removed from the base material. In some embodiments, at least about 87% of the polymer material is removed from the base material. In some embodiments, at least about 88% of the polymer material is removed from the base material. In some embodiments, at least about 89% of the polymer material is removed from the base material. In some embodiments, at least about 90% of the polymer material is removed from the base material. In some embodiments, at least about 91% of the polymer material is removed from the base material. In some embodiments, at least about 92% of the polymer material is removed from the base material. In some embodiments, at least about 93% of the polymer material is removed from the base material. In some embodiments, at least about 94% of the polymer material is removed from the base material. In some embodiments, at least about 95% of the polymer material is removed from the base material. In some embodiments, at least about 96% of the polymer material is removed from the base material. In some embodiments, at least about 97% of the polymer material is removed from the base material. In some embodiments, at least about 98% of the polymer material is removed from the base material. In some embodiments, at least about 99% of the polymer material is removed from the base material. In some embodiments, at least about 99.5% of the polymer material is removed from the base material.

In some embodiments, at least about 70% of the base material is intact after the polymer material is substantially removed from the base material. In some embodiments, at least about 71% of the base material is intact after the polymer material is substantially removed from the base material. In some embodiments, at least about 72% of the base material is intact after the polymer material is substantially removed from the base material. In some embodiments, at least about 73% of the base material is intact after the polymer material is substantially removed from the base material. In some embodiments, at least about 74% of the base material is intact after the polymer material is substantially removed from the base material. In some embodiments, at least about 75% of the base material is intact after the polymer material is substantially removed from the base material. In some embodiments, at least about 76% of the base material is intact after the polymer material is substantially removed from the base material. In some embodiments, at least about 77% of the base material is intact after the polymer material is substantially removed from the base material. In some embodiments, at least about 78% of the base material is intact after the polymer material is substantially removed from the base material. In some embodiments, at least about 79% of the base material is intact after the polymer material is substantially removed from the base material. In some embodiments, at least about 80% of the base material is intact after the polymer material is substantially removed from the base material. In some embodiments, at least about 81% of the base material is intact after the polymer material is substantially removed from the base material. In some embodiments, at least about 82% of the base material is intact after the polymer material is substantially removed from the base material. In some embodiments, at least about 83% of the base material is intact after the polymer material is substantially removed from the base material. In some embodiments, at least about 84% of the base material is intact after the polymer material is substantially removed from the base material. In some embodiments, at least about 85% of the base material is intact after the polymer material is substantially removed from the base material. In some embodiments, at least about 86% of the base material is intact after the polymer material is substantially removed from the base material. In some embodiments, at least about 87% of the base material is intact after the polymer material is substantially removed from the base material. In some embodiments, at least about 88% of the base material is intact after the polymer material is substantially removed from the base material. In some embodiments, at least about 89% of the base material is intact after the polymer material is substantially removed from the base material.

In some embodiments, at least about 90% of the base material is intact after the polymer material is substantially removed from the base material. In some embodiments, at least about 91% of the base material is intact after the polymer material is substantially removed from the base material. In some embodiments, at least about 92% of the base material is intact after the polymer material is substantially removed from the base material. In some embodiments, at least about 93% of the base material is intact after the polymer material is substantially removed from the base material. In some embodiments, at least about 94% of the base material is intact after the polymer material is substantially removed from the base material. In some embodiments, at least about 95% of the base material is intact after the polymer material is substantially removed from the base material. In some embodiments, at least about 96% of the base material is intact after the polymer material is substantially removed from the base material. In some embodiments, at least about 97% of the base material is intact after the polymer material is substantially removed from the base material. In some embodiments, at least about 98% of the base material is intact after the polymer material is substantially removed from the base material. In some embodiments, at least about 99% of the base material is intact after the polymer material is substantially removed from the base material. In some embodiments, at least about 99.5% of the base material is intact after the polymer material is substantially removed from the base material. In some embodiments, at least about 99.7% of the base material is intact after the polymer material is substantially removed from the base material.

Properties of the Recycled Base Material According to Embodiments

In some embodiments, the material properties for recycled base material separated from the used material article, which can be carbon fibers for example, can substantially maintain or essentially maintain the original properties of the base material. In some embodiments, the base material is at least substantially intact after the polymer material is substantially removed from the base material. In some embodiments, the base material is essentially intact after the polymer material is substantially removed from the base material. In some embodiments, the base material is intact after the polymer material is substantially removed from the base material.

For example, in some embodiments, the material properties for recycled base material separated from the used material article, which can be carbon fibers, can be substantially maintained or essentially maintained. In some embodiments, recycled base material separated from the used material article, which can be carbon fibers, can be substantially maintain or essentially maintain the mechanical strength of the base material. In some embodiments, recycled base material separated from the material body, which can be carbon fibers, can substantially maintain or essentially maintain the interfacial adhesion of the base material. In some embodiments, recycled base material separated from the material body, which can be carbon fibers, can substantially maintain or essentially maintain the electrical conductivity of the base material. In some embodiments, recycled base material separated from the material body, which can be carbon fibers, can substantially maintain or essentially maintain the EMI shielding effectiveness of the base material. In some embodiments, recycled base material separated from the material body, which can be carbon fibers, can substantially maintain or essentially maintain the thermal conductivity of the base material. In some embodiments, recycled base material separated from the material body, which can be carbon fibers, can substantially maintain or essentially maintain the thermal stability of the base material.

Purity

For example, in some embodiments, the recycled base material can have about 70% or more, about 71% or more, about 72% or more, about 73% or more, about 74% or more, about 75% or more, about 76% or more, about 77% or more, about 78% or more, about 79% or more, about 80% or more, about 81% or more, about 82% or more, about 83% or more, about 84% or more, about 85% or more, about 86% or more, about 87% or more, about 88% or more, about 89% or more, about 90% or more, about 91% or more, about 92% or more, about 93% or more, about 94% or more, about 95% or more, about 96% or more, about 97% or more, about 98% or more, about 98.5% or more, about 99% or more, or about 99.5% or more of the purity of the original base material. For example, in some embodiments, the recycled base material can maintain about 70% or more, about 71% or more, about 72% or more, about 73% or more, about 74% or more, about 75% or more, about 76% or more, about 77% or more, about 78% or more, about 79% or more, about 80% or more, about 81% or more, about 82% or more, about 83% or more, about 84% or more, about 85% or more, about 86% or more, about 87% or more, about 88% or more, about 89% or more, about 90% or more, about 91% or more, about 92% or more, about 93% or more, about 94% or more, about 95% or more, about 96% or more, about 97% or more, about 98% or more, about 98.5% or more, about 99% or more, or about 99.5% or more of the original physical property of the original base material.

Tensile Strength

For example, in some embodiments, the base material before applying the non-ionizing radiation can have tensile strength, and the tensile strength can be maintained to a substantial degree after the recycling process or the separation process of the base material from the composite material related to the present disclosure. For example, in some embodiments, a carbon fiber before applying the non-ionizing radiation can have tensile strength, and the tensile strength of the carbon fiber can be maintained to a substantial degree after the recycling process or the separation process of the carbon fiber from the composite material related to the present disclosure. In some embodiments, tensile strength of the base material such as a carbon fiber can be measured based on a variety of measurement techniques, processes, or standards. For example, in some embodiments, in a method for testing the tensile properties of single-filament carbon fibre specimens, The single fiber specimens can be tested to failure, at a constant crosshead speed, such as between 1 mm/min and 5 mm/min. For example, in some embodiments in the case of a carbon fiber, any one among various US and international standards, such as ISO 11566, can be based to measure the tensile strength of a carbon fiber. Publications of ISO 11566, including ISO11566:1996 (e.g., Carbon fibre—Determination of the tensile properties of single-filament specimens), are incorporated herein by reference in their entireties.

For example, in some embodiments, the base material before applying the non-ionizing radiation can have tensile strength and wherein the recycled base material can have at least about 80% of the tensile strength of the base material. In some embodiments, the base material before applying the non-ionizing radiation can have tensile strength and wherein the recycled base material can have at least about 81% of the tensile strength of the base material. In some embodiments, the base material before applying the non-ionizing radiation can have tensile strength and wherein the recycled base material can have at least about 82% of the tensile strength of the base material. In some embodiments, the base material before applying the non-ionizing radiation can have tensile strength and wherein the recycled base material can have at least about 83% of the tensile strength of the base material. In some embodiments, the base material before applying the non-ionizing radiation can have tensile strength and wherein the recycled base material can have at least about 84% of the tensile strength of the base material. In some embodiments, the base material before applying the non-ionizing radiation can have tensile strength and wherein the recycled base material can have at least about 85% of the tensile strength of the base material. In some embodiments, the base material before applying the non-ionizing radiation can have tensile strength and wherein the recycled base material can have at least about 86% of the tensile strength of the base material. In some embodiments, the base material before applying the non-ionizing radiation can have tensile strength and wherein the recycled base material can have at least about 87% of the tensile strength of the base material. In some embodiments, the base material before applying the non-ionizing radiation can have tensile strength and wherein the recycled base material can have at least about 88% of the tensile strength of the base material. In some embodiments, the base material before applying the non-ionizing radiation can have tensile strength and wherein the recycled base material can have at least about 89% of the tensile strength of the base material. In some embodiments, the base material before applying the non-ionizing radiation can have tensile strength and wherein the recycled base material can have at least about 90% of the tensile strength of the base material. In some embodiments, the base material before applying the non-ionizing radiation can have tensile strength and wherein the recycled base material can have at least about 91% of the tensile strength of the base material. In some embodiments, the base material before applying the non-ionizing radiation can have tensile strength and wherein the recycled base material can have at least about 92% of the tensile strength of the base material. In some embodiments, the base material before applying the non-ionizing radiation can have tensile strength and wherein the recycled base material can have at least about 93% of the tensile strength of the base material. In some embodiments, the base material before applying the non-ionizing radiation can have tensile strength and wherein the recycled base material can have at least about 94% of the tensile strength of the base material. In some embodiments, the base material before applying the non-ionizing radiation can have tensile strength and wherein the recycled base material can have at least about 95% of the tensile strength of the base material. In some embodiments, the base material before applying the non-ionizing radiation can have tensile strength and wherein the recycled base material can have at least about 96% of the tensile strength of the base material. In some embodiments, the base material before applying the non-ionizing radiation can have tensile strength and wherein the recycled base material can have at least about 97% of the tensile strength of the base material. In some embodiments, the base material before applying the non-ionizing radiation can have tensile strength and wherein the recycled base material can have at least about 98% of the tensile strength of the base material. In some embodiments, the base material before applying the non-ionizing radiation can have tensile strength and wherein the recycled base material can have at least about 99% of the tensile strength of the base material.

Tensile Modulus

For example, in some embodiments, the base material before applying the non-ionizing radiation can have tensile modulus, which can be maintained to a substantial degree after the recycling process or the separation process of the base material from the composite material related to the present disclosure. For example, in some embodiments, a carbon fiber before applying the non-ionizing radiation can have tensile modulus, and the tensile modulus can be maintained to a substantial degree after the recycling process or the separation process of the carbon fiber from the composite material related to the present disclosure. In some embodiments, tensile modulus of the base material such as a carbon fiber can be measured based on a variety of measurement techniques, processes, or standards. For example, in some embodiments, in a method for testing the tensile properties of single-filament carbon fibre specimens, The single fiber specimens can be tested to failure, at a constant crosshead speed, such as between 1 mm/min and 5 mm/min. For example, in some embodiments in the case of a carbon fiber, any one among various US and international standards, such as ISO 11566, can be based to measure the tensile modulus of a carbon fiber. Publications of ISO 11566, including ISO11566:1996 (e.g., Carbon fibre—Determination of the tensile properties of single-filament specimens), are incorporated herein by reference in their entireties.

In some embodiments, the base material before applying the non-ionizing radiation can have tensile modulus and wherein the recycled base material can have at least about 80% of the tensile modulus of the base material. In some embodiments, the base material before applying the non-ionizing radiation can have tensile modulus and wherein the recycled base material can have at least about 81% of the tensile modulus of the base material. In some embodiments, the base material before applying the non-ionizing radiation can have tensile modulus and wherein the recycled base material can have at least about 82% of the tensile modulus of the base material. In some embodiments, the base material before applying the non-ionizing radiation can have tensile modulus and wherein the recycled base material can have at least about 83% of the tensile modulus of the base material. In some embodiments, the base material before applying the non-ionizing radiation can have tensile modulus and wherein the recycled base material can have at least about 84% of the tensile modulus of the base material. In some embodiments, the base material before applying the non-ionizing radiation can have tensile modulus and wherein the recycled base material can have at least about 85% of the tensile modulus of the base material. In some embodiments, the base material before applying the non-ionizing radiation can have tensile modulus and wherein the recycled base material can have at least about 86% of the tensile modulus of the base material. In some embodiments, the base material before applying the non-ionizing radiation can have tensile modulus and wherein the recycled base material can have at least about 87 of the tensile modulus of the base material. In some embodiments, the base material before applying the non-ionizing radiation can have tensile modulus and wherein the recycled base material can have at least about 88% of the tensile modulus of the base material. In some embodiments, the base material before applying the non-ionizing radiation can have tensile modulus and wherein the recycled base material can have at least about 89% of the tensile modulus of the base material. In some embodiments, the base material before applying the non-ionizing radiation can have tensile modulus and wherein the recycled base material can have at least about 90% of the tensile modulus of the base material. In some embodiments, the base material before applying the non-ionizing radiation can have tensile modulus and wherein the recycled base material can have at least about 91% of the tensile modulus of the base material. In some embodiments, the base material before applying the non-ionizing radiation can have tensile modulus and wherein the recycled base material can have at least about 92% of the tensile modulus of the base material. In some embodiments, the base material before applying the non-ionizing radiation can have tensile modulus and wherein the recycled base material can have at least about 93% of the tensile modulus of the base material. In some embodiments, the base material before applying the non-ionizing radiation can have tensile modulus and wherein the recycled base material can have at least about 94% of the tensile modulus of the base material. In some embodiments, the base material before applying the non-ionizing radiation can have tensile modulus and wherein the recycled base material can have at least about 95% of the tensile modulus of the base material. In some embodiments, the base material before applying the non-ionizing radiation can have tensile modulus and wherein the recycled base material can have at least about 96% of the tensile modulus of the base material. In some embodiments, the base material before applying the non-ionizing radiation can have tensile modulus and wherein the recycled base material can have at least about 97% of the tensile modulus of the base material. In some embodiments, the base material before applying the non-ionizing radiation can have tensile modulus and wherein the recycled base material can have at least about 98% of the tensile modulus of the base material. In some embodiments, the base material before applying the non-ionizing radiation can have tensile modulus and wherein the recycled base material can have at least about 98% of the tensile modulus of the base material. In some embodiments, the base material before applying the non-ionizing radiation can have a tensile modulus and wherein the recycled base material can have at least about 99% of the tensile modulus of the base material.

Elogation at Breaking

For example, in some embodiments, the base material before applying the non-ionizing radiation can have elongation at breaking, which can be maintained to a substantial degree after the recycling process or the separation process of the base material from the composite material related to the present disclosure. For example, in some embodiments, a carbon fiber before applying the non-ionizing radiation can have elongation, and the elongation can be maintained to a substantial degree after the recycling process or the separation process of the carbon fiber from the composite material related to the present disclosure. In some embodiments, elongation of the base material such as a carbon fiber can be measured based on a variety of measurement techniques, processes, or standards. For example, in some embodiments, in a method for testing the tensile properties of single-filament carbon fibre specimens, the single fiber specimens can be tested to failure, at a constant crosshead speed, such as between 1 mm/min and 5 mm/min. For example, in some embodiments in the case of a carbon fiber, any one among various US and international standards, such as ISO 11566, can be based to measure the elongation of a carbon fiber. Publications of ISO 11566, including ISO11566:1996 (e.g., Carbon fibre—Determination of the tensile properties of single-filament specimens), are incorporated herein by reference in their entireties.

In some embodiments, the base material before applying the non-ionizing radiation has elongation and wherein the recycled base material has at least about 80% of the elongation of the base material. In some embodiments, the base material before applying the non-ionizing radiation has elongation and wherein the recycled base material has at least about 81% of the elongation of the base material. In some embodiments, the base material before applying the non-ionizing radiation has elongation and wherein the recycled base material has at least about 82% of the elongation of the base material. In some embodiments, the base material before applying the non-ionizing radiation has elongation and wherein the recycled base material has at least about 83% of the elongation of the base material. In some embodiments, the base material before applying the non-ionizing radiation has elongation and wherein the recycled base material has at least about 84% of the elongation of the base material. In some embodiments, the base material before applying the non-ionizing radiation has elongation and wherein the recycled base material has at least about 85% of the elongation of the base material. In some embodiments, the base material before applying the non-ionizing radiation has elongation and wherein the recycled base material has at least about 86% of the elongation of the base material. In some embodiments, the base material before applying the non-ionizing radiation has elongation and wherein the recycled base material has at least about 87% of the elongation of the base material. In some embodiments, the base material before applying the non-ionizing radiation has elongation and wherein the recycled base material has at least about 88% of the elongation of the base material. In some embodiments, the base material before applying the non-ionizing radiation has elongation and wherein the recycled base material has at least about 89% of the elongation of the base material. In some embodiments, the base material before applying the non-ionizing radiation has elongation and wherein the recycled base material has at least about 90% of the elongation of the base material. In some embodiments, the base material before applying the non-ionizing radiation has elongation and wherein the recycled base material has at least about 91% of the elongation of the base material. In some embodiments, the base material before applying the non-ionizing radiation has elongation and wherein the recycled base material has at least about 92% of the elongation of the base material. In some embodiments, the base material before applying the non-ionizing radiation has elongation and wherein the recycled base material has at least about 93% of the elongation of the base material. In some embodiments, the base material before applying the non-ionizing radiation has elongation and wherein the recycled base material has at least about 94% of the elongation of the base material. In some embodiments, the base material before applying the non-ionizing radiation has elongation and wherein the recycled base material has at least about 95% of the elongation of the base material. In some embodiments, the base material before applying the non-ionizing radiation has elongation and wherein the recycled base material has at least about 96% of the elongation of the base material. In some embodiments, the base material before applying the non-ionizing radiation has elongation and wherein the recycled base material has at least about 97% of the elongation of the base material. In some embodiments, the base material before applying the non-ionizing radiation has elongation and wherein the recycled base material has at least about 98% of the elongation of the base material. In some embodiments, the base material before applying the non-ionizing radiation has elongation and wherein the recycled base material has at least about 99% of the elongation of the base material.

Thermal Expansion

For example, in some embodiments, the base material before applying the non-ionizing radiation can have coefficients of thermal expansion, and the coefficients of thermal expansion can be maintained to a substantial degree after the recycling process or the separation process of the base material from the composite material related to the present disclosure. For example, in some embodiments, a carbon fiber before applying the non-ionizing radiation can have coefficients of thermal expansion, and the coefficients of thermal expansion can be maintained to a substantial degree after undergoing the recycling process or the separation process of the carbon fiber from the composite material related to the present disclosure. In some embodiments, coefficients of thermal expansion of the base material such as a carbon fiber can be measured based on a variety of measurement techniques, processes, or standards. For example, in some embodiments, the coefficients of thermal expansion can measure how an object's size changes when exposed to a change in temperature or can predict how an object will respond to different temperatures. In some embodiments, coefficients of carbon fiber can vary greatly depending on the direction of the carbon fibers in the composite matrix. In some embodiments, coefficient of thermal expansion can be measured based on the expansion or contraction rate of a material as a function of temperature changes using Thermomechanical Analysis (TMA) test or dilatometer. For example, in some embodiments in the case of a carbon fiber, any one among various US and international standards, such as ASTM E831, ASTM D696, and ISO 11359, can be based to measure the coefficients of thermal expansion of a carbon fiber. Publications of ASTM E831, ASTM D696, and ISO 11359 are incorporated herein by reference in their entireties.

In some embodiments, the base material before applying the non-ionizing radiation has coefficients of thermal expansion and wherein the recycled base material has at least about 80% of the coefficients of thermal expansion of the base material. In some embodiments, the base material before applying the non-ionizing radiation has coefficients of thermal expansion and wherein the recycled base material has at least about 81% of the coefficients of thermal expansion of the base material. In some embodiments, the base material before applying the non-ionizing radiation has coefficients of thermal expansion and wherein the recycled base material has at least about 82% of the coefficients of thermal expansion of the base material. In some embodiments, the base material before applying the non-ionizing radiation has coefficients of thermal expansion and wherein the recycled base material has at least about 83% of the coefficients of thermal expansion of the base material. In some embodiments, the base material before applying the non-ionizing radiation has coefficients of thermal expansion and wherein the recycled base material has at least about 84% of the coefficients of thermal expansion of the base material. In some embodiments, the base material before applying the non-ionizing radiation has coefficients of thermal expansion and wherein the recycled base material has at least about 85% of the coefficients of thermal expansion of the base material. In some embodiments, the base material before applying the non-ionizing radiation has coefficients of thermal expansion and wherein the recycled base material has at least about 86% of the coefficients of thermal expansion of the base material. In some embodiments, the base material before applying the non-ionizing radiation has coefficients of thermal expansion and wherein the recycled base material has at least about 87% of the coefficients of thermal expansion of the base material. In some embodiments, the base material before applying the non-ionizing radiation has coefficients of thermal expansion and wherein the recycled base material has at least about 88% of the coefficients of thermal expansion of the base material. In some embodiments, the base material before applying the non-ionizing radiation has coefficients of thermal expansion and wherein the recycled base material has at least about 89% of the coefficients of thermal expansion of the base material.

In some embodiments, the base material before applying the non-ionizing radiation has coefficients of thermal expansion and wherein the recycled base material has at least about 90% of the coefficients of thermal expansion of the base material. In some embodiments, the base material before applying the non-ionizing radiation has coefficients of thermal expansion and wherein the recycled base material has at least about 91% of the coefficients of thermal expansion of the base material. In some embodiments, the base material before applying the non-ionizing radiation has coefficients of thermal expansion and wherein the recycled base material has at least about 92% of the coefficients of thermal expansion of the base material. In some embodiments, the base material before applying the non-ionizing radiation has coefficients of thermal expansion and wherein the recycled base material has at least about 93% of the coefficients of thermal expansion of the base material. In some embodiments, the base material before applying the non-ionizing radiation has coefficients of thermal expansion and wherein the recycled base material has at least about 94% of the coefficients of thermal expansion of the base material. In some embodiments, the base material before applying the non-ionizing radiation has coefficients of thermal expansion and wherein the recycled base material has at least about 95% of the coefficients of thermal expansion of the base material. In some embodiments, the base material before applying the non-ionizing radiation has coefficients of thermal expansion and wherein the recycled base material has at least about 96% of the coefficients of thermal expansion of the base material. In some embodiments, the base material before applying the non-ionizing radiation has coefficients of thermal expansion and wherein the recycled base material has at least about 97% of the coefficients of thermal expansion of the base material. In some embodiments, the base material before applying the non-ionizing radiation has coefficients of thermal expansion and wherein the recycled base material has at least about 98% of the coefficients of thermal expansion of the base material. In some embodiments, the base material before applying the non-ionizing radiation has coefficients of thermal expansion and wherein the recycled base material has at least about 99% of the coefficients of thermal expansion of the base material.

Coefficients of Thermal Conductivity

For example, in some embodiments, the base material before applying the non-ionizing radiation can have coefficients of thermal conductivity, and the coefficients of thermal conductivity can be maintained to a substantial degree after the recycling process or the separation process of the base material from the composite material related to the present disclosure. For example, in some embodiments, a carbon fiber before applying the non-ionizing radiation can have coefficients of thermal conductivity, and the coefficients of thermal conductivity can be maintained to a substantial degree after undergoing the recycling process or the separation process of the carbon fiber from the composite material related to the present disclosure. In some embodiments, coefficients of thermal conductivity of the base material such as a carbon fiber can be measured based on a variety of measurement techniques, processes, or standards. For example, in some embodiments, coefficients of thermal conductivity can be measured based on how efficiently heat flows through a given material such as a carbon fiber. For example, in some embodiments in the case of a carbon fiber, any one among various US and international standards, such as ISO 22007-2 and ASTM D7896-19, can be based to measure the coefficients of thermal conductivity of a carbon fiber. Publications of ISO 22007-2 and ASTM D7896-19 are incorporated herein by reference in their entireties.

In some embodiments, the base material before applying the non-ionizing radiation has coefficients of thermal conductivity and wherein the recycled base material has at least about 80% of the coefficients of thermal conductivity of the base material. In some embodiments, the base material before applying the non-ionizing radiation has coefficients of thermal conductivity and wherein the recycled base material has at least about 81% of the coefficients of thermal conductivity of the base material. In some embodiments, the base material before applying the non-ionizing radiation has coefficients of thermal conductivity and wherein the recycled base material has at least about 82% of the coefficients of thermal conductivity of the base material. In some embodiments, the base material before applying the non-ionizing radiation has coefficients of thermal conductivity and wherein the recycled base material has at least about 83% of the coefficients of thermal conductivity of the base material. In some embodiments, the base material before applying the non-ionizing radiation has coefficients of thermal conductivity and wherein the recycled base material has at least about 84% of the coefficients of thermal conductivity of the base material. In some embodiments, the base material before applying the non-ionizing radiation has coefficients of thermal conductivity and wherein the recycled base material has at least about 85% of the coefficients of thermal conductivity of the base material. In some embodiments, the base material before applying the non-ionizing radiation has coefficients of thermal conductivity and wherein the recycled base material has at least about 86% of the coefficients of thermal conductivity of the base material. In some embodiments, the base material before applying the non-ionizing radiation has coefficients of thermal conductivity and wherein the recycled base material has at least about 87% of the coefficients of thermal conductivity of the base material. In some embodiments, the base material before applying the non-ionizing radiation has coefficients of thermal conductivity and wherein the recycled base material has at least about 88% of the coefficients of thermal conductivity of the base material. In some embodiments, the base material before applying the non-ionizing radiation has coefficients of thermal conductivity and wherein the recycled base material has at least about 89% of the coefficients of thermal conductivity of the base material.

In some embodiments, the base material before applying the non-ionizing radiation has coefficients of thermal conductivity and wherein the recycled base material has at least about 90% of the coefficients of thermal conductivity of the base material. In some embodiments, the base material before applying the non-ionizing radiation has coefficients of thermal conductivity and wherein the recycled base material has at least about 91% of the coefficients of thermal conductivity of the base material. In some embodiments, the base material before applying the non-ionizing radiation has coefficients of thermal conductivity and wherein the recycled base material has at least about 92% of the coefficients of thermal conductivity of the base material. In some embodiments, the base material before applying the non-ionizing radiation has coefficients of thermal conductivity and wherein the recycled base material has at least about 93% of the coefficients of thermal conductivity of the base material. In some embodiments, the base material before applying the non-ionizing radiation has coefficients of thermal conductivity and wherein the recycled base material has at least about 94% of the coefficients of thermal conductivity of the base material. In some embodiments, the base material before applying the non-ionizing radiation has coefficients of thermal conductivity and wherein the recycled base material has at least about 95% of the coefficients of thermal conductivity of the base material. In some embodiments, the base material before applying the non-ionizing radiation has coefficients of thermal conductivity and wherein the recycled base material has at least about 96% of the coefficients of thermal conductivity of the base material. In some embodiments, the base material before applying the non-ionizing radiation has coefficients of thermal conductivity and wherein the recycled base material has at least about 97% of the coefficients of thermal conductivity of the base material. In some embodiments, the base material before applying the non-ionizing radiation has coefficients of thermal conductivity and wherein the recycled base material has at least about 98% of the coefficients of thermal conductivity of the base material. In some embodiments, the base material before applying the non-ionizing radiation has coefficients of thermal conductivity and wherein the recycled base material has at least about 99% of the coefficients of thermal conductivity of the base material.

Electrical Conductivity

For example, in some embodiments, the base material before applying the non-ionizing radiation can have electrical conductivity, and the electrical conductivity can be maintained to a substantial degree after the recycling process or the separation process of the base material from the composite material related to the present disclosure. For example, in some embodiments, a carbon fiber before applying the non-ionizing radiation can have electrical conductivity, and the electrical conductivity can be maintained to a substantial degree after undergoing the recycling process or the separation process of the carbon fiber from the composite material related to the present disclosure. In some embodiments, electrical conductivity of the base material such as a carbon fiber can be measured based on a variety of measurement techniques, processes, or standards. For example, in some embodiments, electrical conductivity can be measured based on how efficiently electric current flows through a given material such as a carbon fiber. For example, in some embodiments in the case of a carbon fiber, any one among various US and international standards, such as ISO 13931, can be based to measure the electrical conductivity of a carbon fiber. Publications of ISO 13931 are incorporated herein by reference in their entireties.

In some embodiments, the base material before applying the non-ionizing radiation has electrical conductivity and wherein the recycled base material has at least about 80% of the electrical conductivity of the base material. In some embodiments, the base material before applying the non-ionizing radiation has electrical conductivity and wherein the recycled base material has at least about 81% of the electrical conductivity of the base material. In some embodiments, the base material before applying the non-ionizing radiation has electrical conductivity and wherein the recycled base material has at least about 82% of the electrical conductivity of the base material. In some embodiments, the base material before applying the non-ionizing radiation has electrical conductivity and wherein the recycled base material has at least about 83% of the electrical conductivity of the base material. In some embodiments, the base material before applying the non-ionizing radiation has electrical conductivity and wherein the recycled base material has at least about 84% of the electrical conductivity of the base material. In some embodiments, the base material before applying the non-ionizing radiation has electrical conductivity and wherein the recycled base material has at least about 85% of the electrical conductivity of the base material. In some embodiments, the base material before applying the non-ionizing radiation has electrical conductivity and wherein the recycled base material has at least about 86% of the electrical conductivity of the base material. In some embodiments, the base material before applying the non-ionizing radiation has electrical conductivity and wherein the recycled base material has at least about 87% of the electrical conductivity of the base material. In some embodiments, the base material before applying the non-ionizing radiation has electrical conductivity and wherein the recycled base material has at least about 88% of the electrical conductivity of the base material. In some embodiments, the base material before applying the non-ionizing radiation has electrical conductivity and wherein the recycled base material has at least about 89% of the electrical conductivity of the base material. In some embodiments, the base material before applying the non-ionizing radiation has electrical conductivity and wherein the recycled base material has at least about 90% of the electrical conductivity of the base material. In some embodiments, the base material before applying the non-ionizing radiation has electrical conductivity and wherein the recycled base material has at least about 91% of the electrical conductivity of the base material. In some embodiments, the base material before applying the non-ionizing radiation has electrical conductivity and wherein the recycled base material has at least about 92% of the electrical conductivity of the base material. In some embodiments, the base material before applying the non-ionizing radiation has electrical conductivity and wherein the recycled base material has at least about 93% of the electrical conductivity of the base material. In some embodiments, the base material before applying the non-ionizing radiation has electrical conductivity and wherein the recycled base material has at least about 94% of the electrical conductivity of the base material. In some embodiments, the base material before applying the non-ionizing radiation has electrical conductivity and wherein the recycled base material has at least about 95% of the electrical conductivity of the base material. In some embodiments, the base material before applying the non-ionizing radiation has electrical conductivity and wherein the recycled base material has at least about 96% of the electrical conductivity of the base material. In some embodiments, the base material before applying the non-ionizing radiation has electrical conductivity and wherein the recycled base material has at least about 97% of the electrical conductivity of the base material. In some embodiments, the base material before applying the non-ionizing radiation has electrical conductivity and wherein the recycled base material has at least about 98% of the electrical conductivity of the base material. In some embodiments, the base material before applying the non-ionizing radiation has electrical conductivity and wherein the recycled base material has at least about 99% of the electrical conductivity of the base material.

Density

For example, in some embodiments, the base material before applying the non-ionizing radiation can have density, and the density can be maintained to a substantial degree after the recycling process or the separation process of the base material from the composite material related to the present disclosure. For example, in some embodiments, a carbon fiber before applying the non-ionizing radiation can have density, and the electrical conductivity can be maintained to a substantial degree after undergoing the recycling process or the separation process of the carbon fiber from the composite material related to the present disclosure. In some embodiments, density of the base material such as a carbon fiber can be measured based on a variety of measurement techniques, processes, or standards. For example, in some embodiments, density can be measured based on immersing a sample of carbon fibre into a liquid column containing a known and calibrated density gradient and allowed to descend through the column. The position at which the sample floats due to its neutral buoyancy can indicates the density of the sample. For example, in some embodiments in the case of a carbon fiber, any one among various US and international standards, such as ISO 10119:2020, can be based to measure the density of a carbon fiber. Publications of ISO 10119:2020 are incorporated herein by reference in their entireties.

In some embodiments, the base material before applying the non-ionizing radiation has density and wherein the recycled base material has at least about 80% of the density of the base material. In some embodiments, the base material before applying the non-ionizing radiation has density and wherein the recycled base material has at least about 81% of the density of the base material. In some embodiments, the base material before applying the non-ionizing radiation has density and wherein the recycled base material has at least about 82% of the density of the base material. In some embodiments, the base material before applying the non-ionizing radiation has density and wherein the recycled base material has at least about 83% of the density of the base material. In some embodiments, the base material before applying the non-ionizing radiation has density and wherein the recycled base material has at least about 84% of the density of the base material. In some embodiments, the base material before applying the non-ionizing radiation has density and wherein the recycled base material has at least about 85% of the density of the base material. In some embodiments, the base material before applying the non-ionizing radiation has density and wherein the recycled base material has at least about 86% of the density of the base material. In some embodiments, the base material before applying the non-ionizing radiation has density and wherein the recycled base material has at least about 87% of the density of the base material. In some embodiments, the base material before applying the non-ionizing radiation has density and wherein the recycled base material has at least about 88% of the density of the base material. In some embodiments, the base material before applying the non-ionizing radiation has density and wherein the recycled base material has at least about 89% of the density of the base material.

Material Degradation

In some embodiments, less than about 5 weight percent of the base material is degraded after the polymer material is substantially removed from the base material. In some embodiments, less than about 2 weight percent of the base material is degraded after the polymer material is substantially removed from the base material. In some embodiments, less than about 1 weight percent of the base material is degraded after the polymer material is substantially removed from the base material. In some embodiments, less than about 0.5 weight percent of the base material is degraded after the polymer material is substantially removed from the base material. In some embodiments, less than about 0.3 weight percent of the base material is degraded after the polymer material is substantially removed from the base material. In some embodiments, less than about 0.1 weight percent of the base material is degraded after the polymer material is substantially removed from the base material. In some embodiments, less than about 0.01 weight percent of the base material is degraded after the polymer material is substantially removed from the base material. In some embodiments, less than about 0.005 weight percent of the base material is degraded after the polymer material is substantially removed from the base material.

Fiber Break Rate

In some embodiments, the base material can have break rate of no more than about 25% after the polymer material is removed from the base material. In some embodiments, the base material can have break rate of no more than about 20% after the polymer material is removed from the base material. In some embodiments, the base material can have break rate of no more than about 15% after the polymer material is removed from the base material. In some embodiments, the base material can have break rate of no more than about 10% after the polymer material is removed from the base material. In some embodiments, the base material can have break rate of no more than about 5% after the polymer material is removed from the base material. In some embodiments, the base material can have break rate of no more than about 3% after the polymer material is removed from the base material. In some embodiments, the base material can have break rate of no more than about 2% after the polymer material is removed from the base material. In some embodiments, the base material can have break rate of no more than about 1% after the polymer material is removed from the base material.

For example, in some embodiments, because of the purity and maintained properties of the recycled base material, which can be carbon fibers, the recycled base material can be easily reproduced into products whose quality is comparable or substantially same as the corresponding products with the original base material. Accordingly, in some embodiments, for example, recycled carbon fiber paper or sheet made of 85% recycled carbon fiber and 15% chemical fiber can be remanufactured and still can maintain the following qualities shown in Table 1.

TABLE 1

| Test item | Unit | Result | |
|---|---|---|---|
| Base Weight | g/m$^2$ | 30 | 70 |
| Thickness | mm | 0.18 | 0.37 |
| Tensile Strength (MD) | N/15 mm | 3.3 | 20 |

TABLE 1-continued

| Test item | Unit | Result | |
|---|---|---|---|
| Tensile Strength (TD) | N/15 mm | 1.0 | 4.0 |
| Density | g/cm$^3$ | 0.179 | 0.189 |

In some embodiments, the microwave device and the corresponding process can quickly (<3~5 seconds instant cleavage) and evenly heat the inside of the material to cleave the object to be processed. In some embodiments, with the microwave device and the corresponding process the heat transfer is fast and can handle larger volumes of materials. In some embodiments, the microwave device and the corresponding process can handle materials with uneven composition, such as tires and aluminum foil packages, without pre-treatment and sorting. In some embodiments, with the microwave device and the corresponding process cleaner renewable energy output (Syngas can be directly used as fuel for power generation), better energy efficiency, and better overall cost-effectiveness. In some embodiments, with the microwave device and the corresponding process, of the inside and outside of the material avoids secondary cracking effects, and the output products have better quality; new materials can also be produced by adjusting operating parameters. In some embodiments, the microwave device and the corresponding process can have a unique design and can use different modules to process a variety of different wastes at the same time as needed.

In some embodiments, with the microwave device and the corresponding process, microwave heating uses electronic control to control microwave energy, making process control easier. In some embodiments, with the microwave device and the corresponding process, the modular core equipment can be relatively smaller in size, can be easy to scale-up, and is suitable for both small and large quantities of processing. In some embodiments, with the microwave device and the corresponding process, since the microwave pyrolysis process is an anaerobic reaction, there is no combustion, so there are no waste gas emissions such as $CO_2$, $NO_x$, $SO_x$, Dioxin, smoke, etc. There are also no secondary environmental problems such as fly ash and bottom residue. In some embodiments, with the microwave device and the corresponding process, high temperature (~500 degrees Celsius) treatment of medical and industrial wastes, such as animal carcasses and human tissues, as long as they are properly processed, such as minced into pieces, can not only solve environmental problems but also produce high-value activated carbon products. In some embodiments, with the microwave device and the corresponding process, the system can have a simple composition and no waste heat problem in the furnace. The main body can be started and stopped at any time, making operation and maintenance easy.

For example, FIG. 1 illustrates a microwave device including a container 1, a stirring device 2, and a microwave generator 3 in some embodiments.

Referring to FIG. 1, the insulating container 1 can have an outer barrel 11 and an inner barrel 12 in some embodiments. In some embodiments, the inner barrel 12 can be fastened to the inner side of the outer barrel 11, and the inner barrel 12 can be recessed inwardly. In some embodiments, a processing space 121 can be provided, for example, above the insulating container 1 as shown in FIG. 1. In some embodiments, there can be a material channel 14. In some embodiments, a sealing element 15 can be arranged on the material channel 14, and a thermal insulation layer 13 can be formed between the outer barrel 11 and the inner barrel 12. The thermal layer 13 can be used for blocking thermal energy, and the thermal insulating layer 13 can be filled with a thermal insulating material 131.

Referring to FIG. 1, the stirring device 2 can be installed at the bottom of the container 1 in some embodiments. In some embodiments, the stirring device 2 can have a blade 21 at the bottom of the processing space 121. In some embodiments, the blade 21 can pass through the inner part in sequence. In some embodiments, the barrel 12, the heat insulating layer 13, the outer barrel 11 can be pivotally connected to a motor 22 to the outside. In some embodiments, a speed reducer 23 can be pivoted between the blade 21 and the motor 22. In some embodiments, the speed reducer 23 can be connected to the motor 22. In some embodiments, the speed reducer 23 be fixed at the bottom of the outer tub 11 together.

Figure 2:
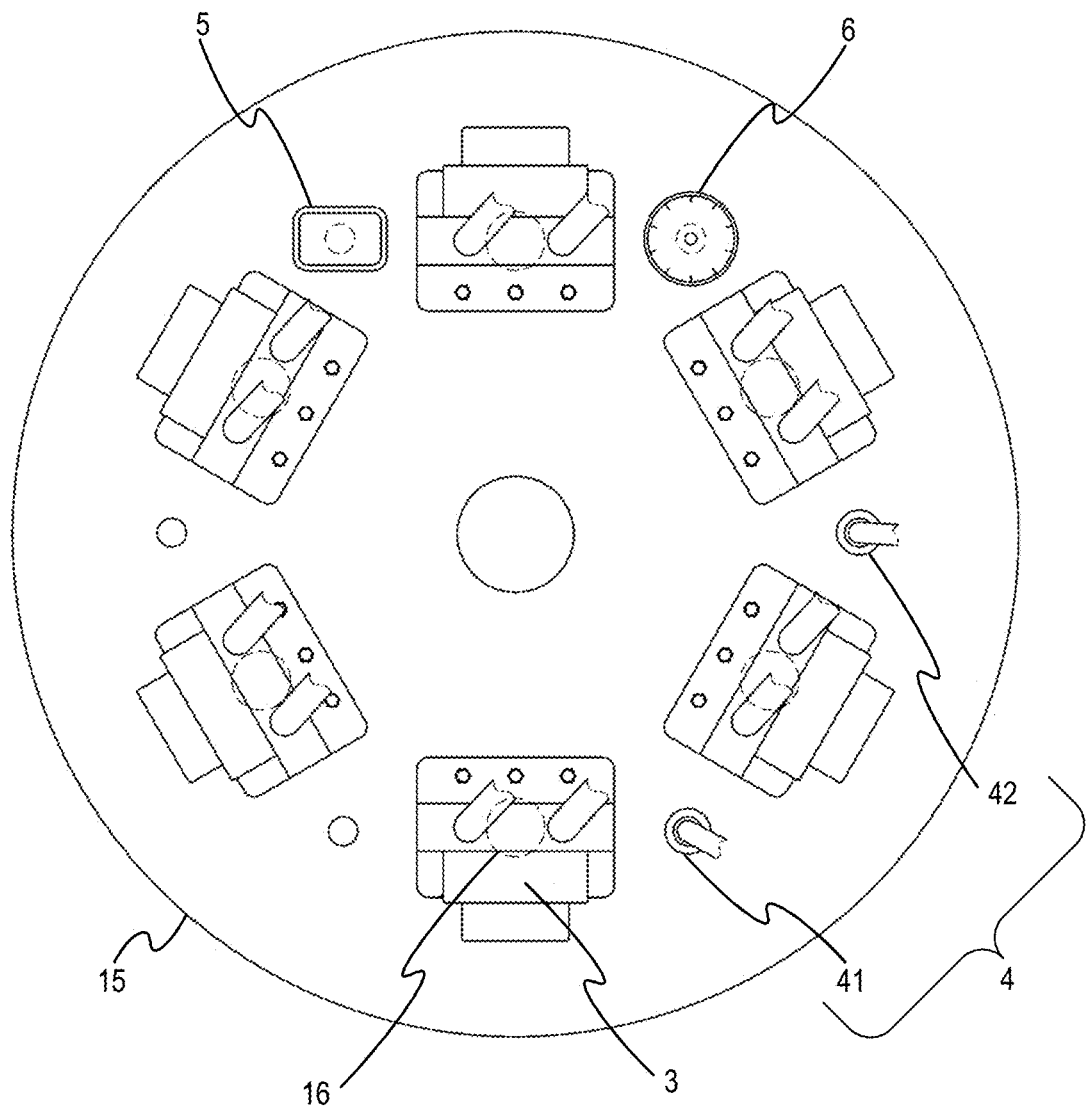
FIG. 2 illustrates a top view of the microwave device in some embodiments.

FIG. 2 illustrates a top view of the microwave device in some embodiments.

Referring to FIGS. 1 and 2, in some embodiments, the sealing element 15 can be used for closing or opening the material channel 14. In some embodiments, the sealing element 15 can be evenly provided with a plurality of fixing pieces 151 around it. In some embodiments, at least one of fixing piece 151 can use a buckle. In some embodiments, one or more of the fixing member 151 can tightly combine the sealing element 15 with the outer barrel 11, so that the sealing element 15 can effectively close the material channel 14. In some embodiments, the sealing element 15 can be evenly opened with a plurality of through holes 16, a hole of the through holes 16 can be communicated with the processing space 121, and a hole of the through holes 16 can be respectively used to install a microwave generator 3, a gas control component 4, a thermometer 5 and a pressure gauge 6. In some embodiments, the thermometer 5 and the pressure gauge 6 can be used to monitor the temperature and pressure in the processing space 121.

Figure 3:
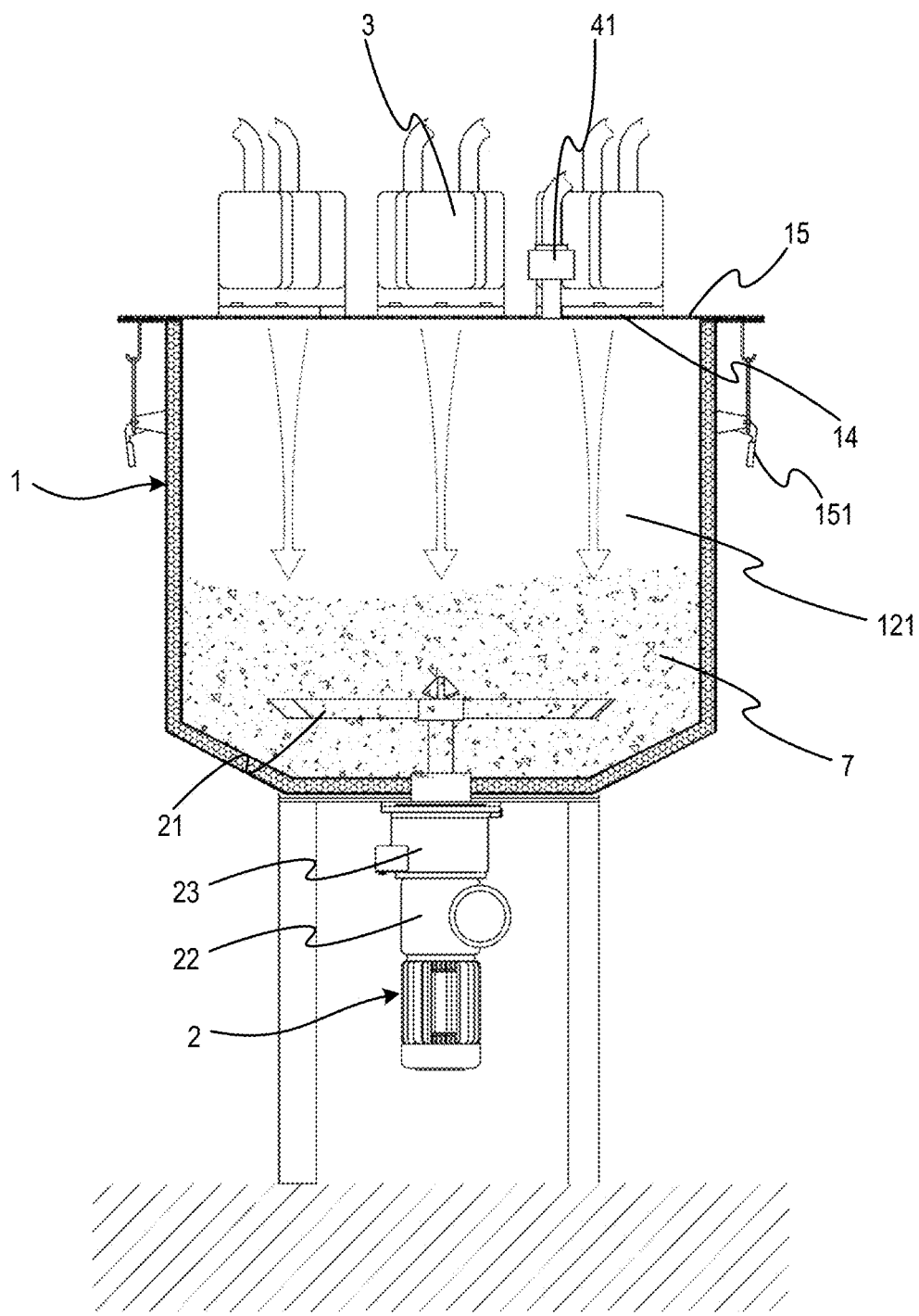
FIG. 3 illustrates an aspect of a microwave device in some embodiments.

FIG. 3 illustrates a microwave device including a container 1, a stirring device 2, and a microwave generator 3 in some embodiments.

Referring to FIG. 3, a used material article including a carbon-based material body 7 to be regenerated can be filled into the container 1 through the material channel 14. In some embodiments, the air or oxygen inside the container 1 can be reduced. In some embodiments, the amount of oxygen can be reduced to less than 2%, so that the inside of the container 1 presents at least substantially reduced oxygen state or a near oxygen-free state. In some embodiments, one or more of the microwave generators 3 can emit microwaves. In some embodiments, one or more of the microwave generators 3 can emit microwaves with a power of from about 6 to about 12 kw (kw) and a frequency of about 2450 MHz inside the container 1. In some embodiments, the stirring device 2 can stir a used material article including a carbon-based material body 7 inside the container 1 a rotation speed (rpm) and continues to receive microwave heating. In some embodiments, the stirring device 2 can stir a used material article including a carbon-based material body 7 inside the container 1 at from about 10 rotation speed (rpm) to about 2000 rpm, from about 20 rotation speed (rpm) to about 1000 rpm, from about 25 rotation speed (rpm) to about 500 rpm, or from about 30 rotation speed (rpm) to about 200 rpm and continues to receive microwave. In some embodiments, the stirring device 2 can stir a used material article including a carbon-based material body 7 inside the container 1 at a rotation speed and continues to receive microwave heating from 1 hour to about 150 hours, from 2 hour to about 100 hours, from 3 hour to about 50 hours, from 4 hour to about 20 hours, or from 5 hour to about 15 hours, such as about 2 hours, about 4 hours, about 6 hours, about 8 hours, about 10 hours, about 12 hours, about 15 hours, about 30 hours, or about 60 hours, (hr). In some embodiments, the carbon-based material then can discharge and cools down.

In some embodiments, a recycling microwave device may have different structural arrangements and other variations. In some embodiments, the components of a recycling microwave device according to some embodiments can be designed in different positions according to the requirements.

Figure 4:
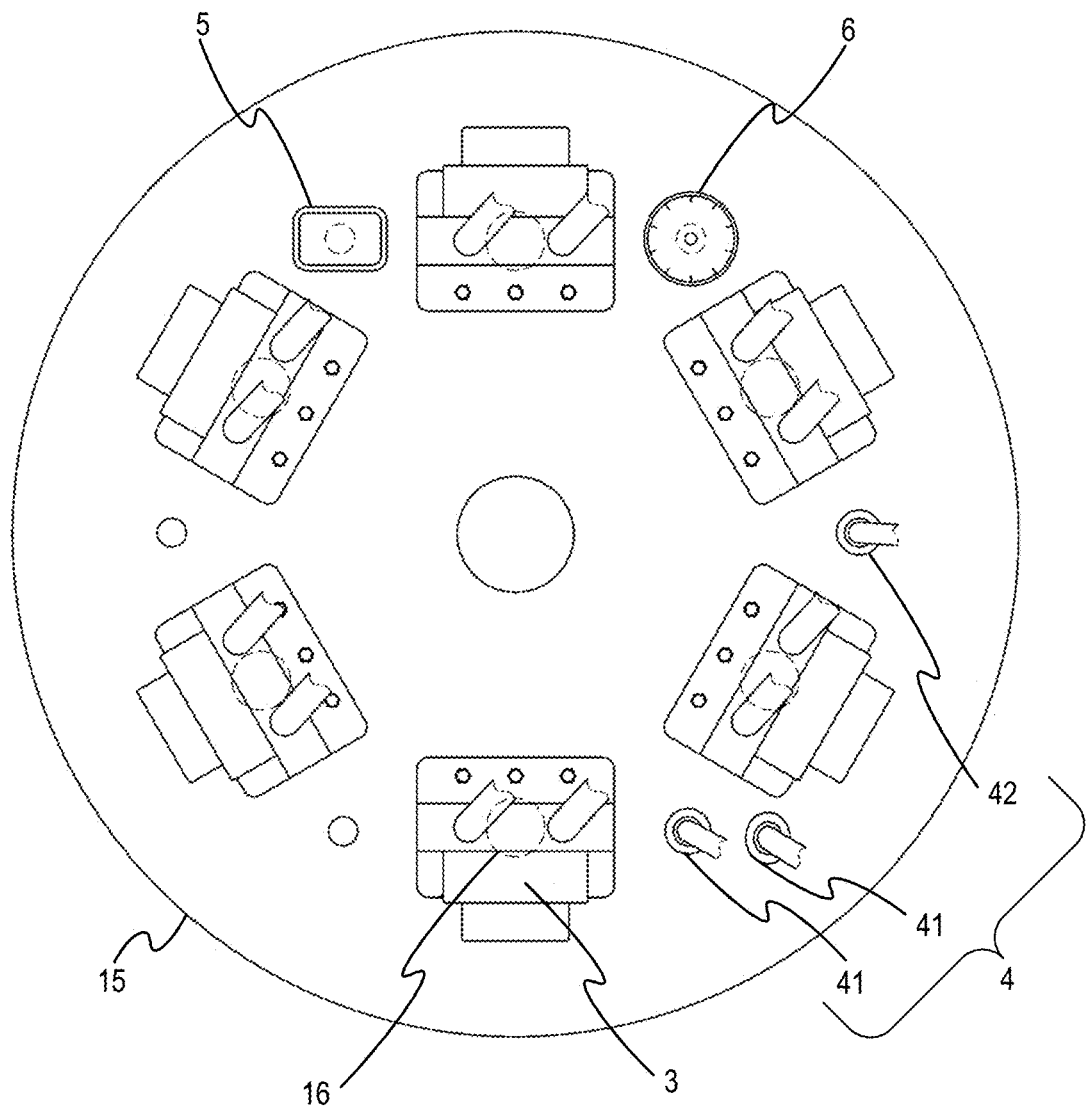
FIG. 4 illustrates a top view of the microwave device with a plurality of inlets in some embodiments.
Figure 5:
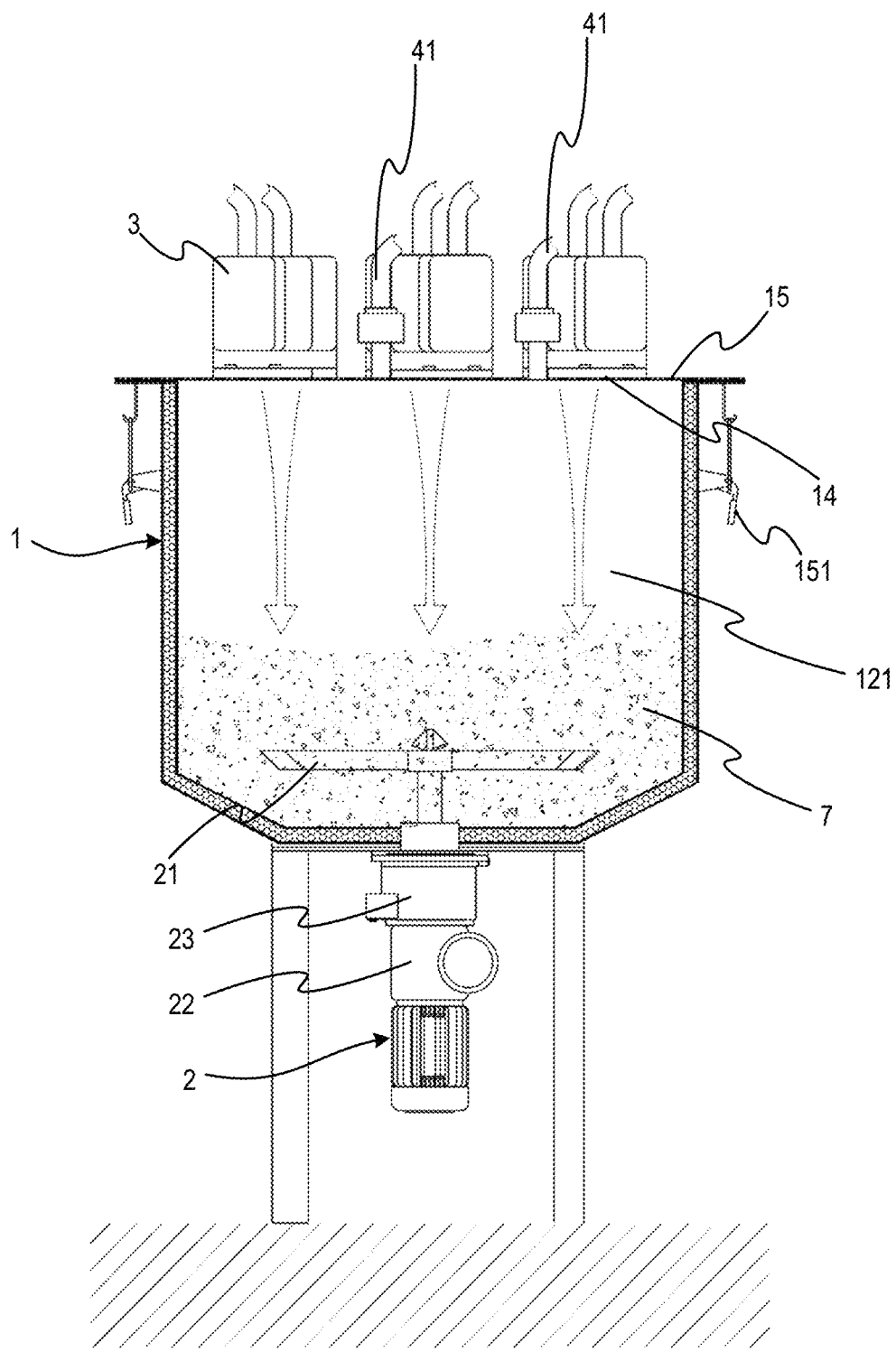
FIG. 5 illustrates an aspect of a microwave device with a plurality of inlets in some embodiments.

For example, FIG. 4 illustrates a top view of the microwave device with a plurality of inlets in some embodiments. FIG. 5 illustrates an aspect of a microwave device with a plurality of inlets in some embodiments.

Referring to FIGS. 4 and 5, in some embodiments, a microwave device can include a container 1, a stirring device 2, and a microwave generator 3. In some embodiments, the microwave device can have a plurality of inlet or inlet ends 41. In some embodiments, the device can have a plurality of inlet or inlet ends 41 for feeding nitrogen and steam separately. In some embodiments, the device can have a plurality of inlet or inlet ends 41 for feeding nitrogen and steam separately or as mixtures (same or different mixtures).

Figure 6:
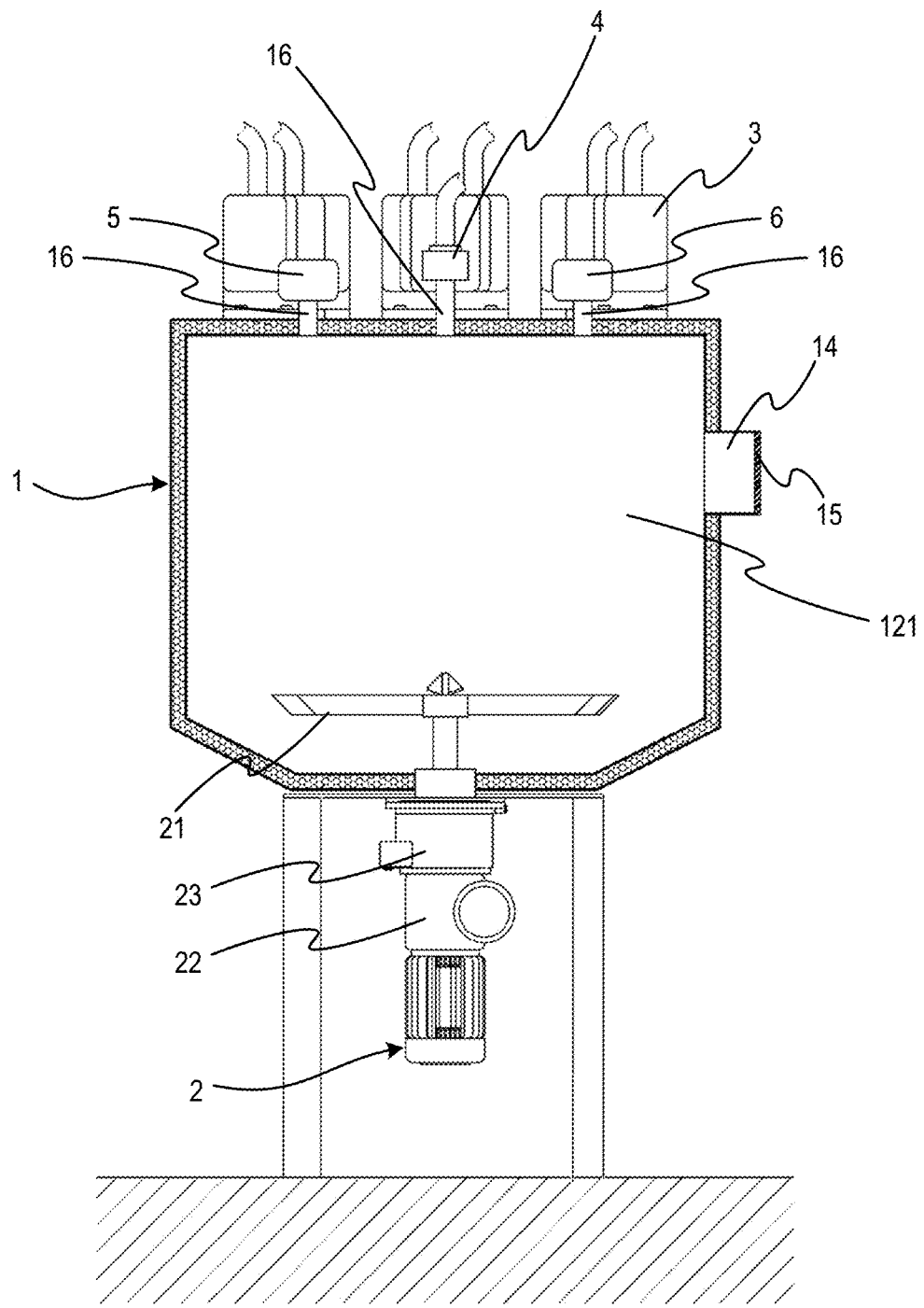
FIG. 6 illustrates an aspect of a microwave device with a material channel disposed on a side of the container in some embodiments.

For example, FIG. 6 illustrates an aspect of a microwave device with a material channel disposed on a side of the container in some embodiments.

Referring to FIG. 6, the microwave device can comprise a container 1, a stirring device 2, and a microwave generator 3. In some embodiments, the material channel 14 can be disposed on the side of the container 1. In some embodiments, the material channel 14 can be provided with a sealing element 15. In some embodiments, the stirring device 2 can be installed in the container 1 at various locations, such as at the bottom. In some embodiments, a plurality of through holes 16 can be provided as openings to the container 1, and the through holes 16 can communicate with the processing space 121. In some embodiments, one or more holes of the through holes 16 can be used to install various components, which may be a microwave generator 3, a gas control assembly 4, a thermometer 5 and a pressure gauge 6, other sensors or detectors that can be used for monitoring the temperature and pressure state in the processing space 121, etc.

Figure 7:
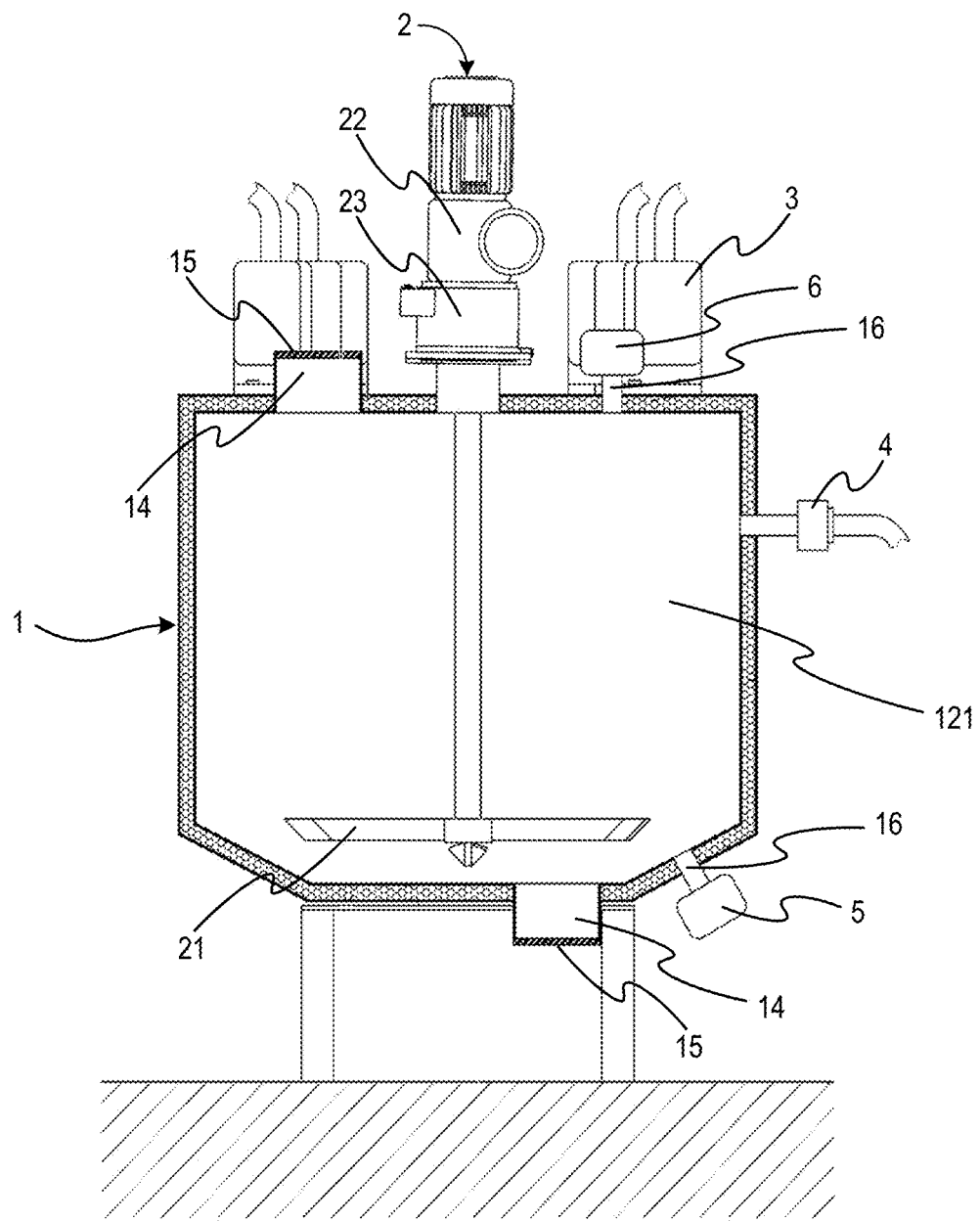
FIG. 7 illustrates an aspect of a microwave device with a stirring device disposed on the upper side in some embodiments.

For example, FIG. 7 illustrates an aspect of a microwave device with a stirring device installed on the upper side in some embodiments.

Referring to FIG. 7, in some embodiments, the microwave device at least can include a container 1, a stirring device 2, and a microwave generator 3. In some embodiments, the feed channel 14 can be opened in the container 1 one above the other. In some embodiments, a sealing element 15 can be provided on the feed channel 14. In some embodiments, the top and side of the container 1 can be spaced with respect to at least one other (e.g., evenly spaced from each other). In some embodiments, a plurality of through holes 16 can provide openings. In some embodiments, one or more holes of the through holes 16 can respectively communicate with the processing space 121. In some embodiments, one more hole of the through holes 16 located at the top can be used to install various components, such as a microwave generator 3. In some embodiments, one or more holes of the through holes can be locate at or around various locations, such as on the side or the bottom. In some embodiments, one more hole of the through holes 16 can be respectively used to install a gas control assembly 4, a thermometer 5, a pressure gauge 6, etc. In some embodiments, the stirring device 2 can be installed at various locations, such as on the top of the container 1. In some embodiments, the stirring device 2 can have a blade 21 extending to the bottom of the processing space 121. In some embodiments, the blade 21 can lead from the inside to the top of the container 1. In some embodiments, a motor 22 can be pivotally connected. In some embodiments, speed reducer 23 can be pivoted between the blade 21 and the motor 22.

In some embodiments, the microwave generator 3 uses a microwave magnetron, which can be used for emitting microwave frequencies of from about 915 MHz or to about 2450 MHz.

The present disclosure is related to a batch type stirring equipment for batch manufacturing, which can include various parts, such as a gearing tank, a stirring tank as a container 1, and a microwave device. In some embodiments, the stirring tank can be disposed in the gearing tank and can incline at a predetermined angle, and the gearing tank can be able to drive the stirring tank to rotate. In some embodiments, the stirring tank as the container can be used to accommodate a material to be processed. In some embodiments, when the stirring tank can be rotating, the microwave device irradiates microwaves from the top surface of the stirring tank to the material to microwave and stir the material at the same time.

The present disclosure is related to a batch type batch type stirring equipment, which provides equipment for stirring a material and implementing microwave treatment. In some embodiments, it can include a transmission tank, a stirring tank and a microwave device. In some embodiments, the stirring tank can be installed in the transmission tank drum with an inclination at a predetermined angle, and the transmission tank drum can drive the stirring tank to rotate. In some embodiments, the stirring tank can be used to accommodate a material to be processed. In some embodiments, when the stirring tank rotates, the microwave device can irradiate microwaves from the top surface of the stirring tank to the material to be processed, so as to achieve applying the microwave with stirring.

In some embodiments, heating can be a common processing method. In some embodiments, traditional heating methods (such as flame, hot air, electric heat, steam) use the principle of heat conduction, and need to transfer heat from the outside to the inside of a heated object through a medium. In some embodiments, the temperature of the center of the heated object can be gradually increased, so it can be quite time-consuming to reach the required high temperature in the inner center.

In some embodiments, microwave heating makes the object to be heated itself as a heating element itself, a process that reduces or does not require heat conduction through external surfaces to heat an object and can heat both the inside and outside at the same time. In some embodiments, therefore, the heating effect can be achieved in a short time and takes less time. In some embodiments, it can have other advantages, including more consistent uniform heating throughout, more energy saving and higher efficiency, easier control, lower temperature sterilization, less pollution, more safety and less harm, etc. In some embodiments, the microwave-based heating may allow wider uses. In some embodiments, in addition to food processing, sterilization, heating, drying or accelerating food, microwaves can be also can used in industry and agriculture for heating, drying, or in the chemical industry to promote chemical reactions.

In some embodiments, when powdery or granular materials can be subjected to microwave treatment, a large amount of material can be usually poured into a drum. In some embodiments, if too much can be poured in at one time, the bottom material may not be effectively absorbed. In some embodiments, stirring will result in poor microwave performance of the material. In some embodiments, on the contrary, if the amount poured at one time can be too small, the amount of energy required for batch processing will be too small, which will relatively increase the time and energy costs.

In some embodiments, a batch type stirring equipment can be provided.

In some embodiments, a batch type stirring equipment can include various components, such as a transmission tank, a stirring tank and a microwave device or microwave generator. In some embodiments, a batch type stirring equipment can be a part of the microwave device. In some embodiments, stirrer for the tank and stirring tank can be tilted to a certain degree in the transmission tank and the transmission tank can drive the stirring tank.

In some embodiments, the stirring tank can be configured to move. In some embodiments, the stirring tank can be configured to contain the desired material. In some embodiments, when the stirring tank moves, the stirring tank can move relatively slightly.

In some embodiments, the stirring tank that is moving can move, agitate, stir, or shoot the material slightly to facilitate or more effectively achieve the result effect.

In some embodiments, a batch type stirring equipment, for example, as a microwave stirring equipment for batch process or manufacturing can be provided. In some embodiments, a microwave stirring equipment for batch process or manufacturing may comprise a gearing tank, a stirring tank, a microwave device, etc. In some embodiments, the stirring tank can be disposed in the gearing tank. In some embodiments, the stirring tank can incline at an angle. In some embodiments, the gearing tank can drive the stirring tank to rotate. In some embodiments, the stirring tank can be used to accommodate a material to be processed. In some embodiments, when the stirring tank is rotating, the microwave generator can irradiate microwaves from the top surface of the stirring tank to the material to microwave and stir the material at the same time.

In some embodiments, a batch type stirring equipment, for example, as a microwave stirring equipment related to the present disclosure can provide a technical feature such as modes of mixing that can be more thorough, e.g., through the center, microwave can be applied more thoroughly. Accordingly, it can be more uniform, effective, easy to control, more environmentally safe with lowered safety hazards.

For example, in some embodiments, in the case of powdered material, it can be more effectively treated, agitated, or mixed in a stirring tank based on the device and methods related to the present disclosure. For example, if too much of medium or material to be mixed or agitated is added to be recycled at once, the recycling of the material may be ineffective. For example, if too little of medium or material to be mixed or agitated is added, the mixing or agitation can deviate.

In some embodiments, the present disclosure is related to a moving stirring tank mixing or agitating, such as an inclined stirring tank mixing or agitating, which can facilitate relatively more effective diffusion within and can effectively increase micro-receptivity.

In some embodiments, the batch type stirring equipment of the present invention can include a transmission tank drum, a stirring tank, etc. In some embodiments, the transmission tank drum can have a bearing groove and a pivot on one side of the bearing groove. In some embodiments, a pivot system can be provided to be horizontally inclined upward to a certain degree, optionally with a groove on one side of the bearing groove.

In some embodiments, the stirring tank can be a meshing stirring tank, which can include a chamber and a mouth in the chamber. In some embodiments, a plurality of stirring tanks or barrels can be provided. In some embodiments, the tank or barrel can be inclined at an angle of from about 0° to about 90°, from about 5° to about 70°, from about 10° to about 50°, from about 10° to about 45°, or from about 10° to about 36.5°. In some embodiments, the tank or barrel can be inclined at an angle of about 0°, about 5°, about 10°, about 15°, about 20°, about 25°, about 30°, about 45°, about 60°, about 75°, or about 80°. In some embodiments, the tank or barrel can be inclined at an angle of no less than about 35°, 36.5°, 38°, 40°, 42°, or 45°.

In some embodiments, a batch type stirring equipment can include a transmission tank drum, a stirring tank and a microwave device. In some embodiments, the stirring tank can be installed in the transmission tank drum with an inclination at a predetermined angle, and the transmission tank drum can drive the stirring tank to rotate. In some embodiments, the stirring tank can be used to accommodate a material to be processed. In some embodiments, when the stirring tank rotates, the microwave device can irradiate microwaves from the top surface of the stirring tank to the material to be processed, so as to achieve the microwave-stirring effect.

In some embodiments, a batch type batch type stirring equipment can include a transmission tank drum having a supporting portion. In some embodiments, an axle can be provided on one side of the supporting portion. In some embodiments, the axle can be inclined upward at a predetermined angle from the horizontal plane. In some embodiments, a first tooth can be installed on one side of the supporting portion. In some embodiments, the first tooth portion can be fixed with a transmission host, and the transmission host can be used to drive the first tooth portion to run. In some embodiments, a stirring tank can be used to accommodate a material to be processed. In some embodiments, the stirring tank can be installed in the transmission tank drum. In some embodiments, the axle can be rotated on the bottom surface of the stirring tank. In some embodiments, the peripheral ring of the stirring tank can be a second tooth portion can be provided, and the second tooth portion can couple with the first tooth portion. In some embodiments, the stirring tank can have a chamber inside, the chamber can have an opening, and a plurality of paddles can be evenly arranged around the chamber. In some embodiments, the stirring tank can be also provided with an opening cover or stopper for opening or closing the opening. In some embodiments, as well as a microwave device can be coupled to the top surface of the stirring tank through a bearing. In some embodiments, the bearing can be coupled to the periphery of the microwave device, and the bearing can be coupled to the top surface of the stirring tank.

In some embodiments, the opening cover or stopper can be provided with a material pouring port.

In some embodiments, the microwave device can be fixed at the center of the top surface of the stirring tank.

In some embodiments, the microwave device can be coupled to the opening cover or stopper.

In some embodiments, a driver device can be installed on the outside of the transmission tank. In some embodiments, the driver device can be driven by an external power and a control end to set the rotation angle. In some embodiments, the transmission tank drum and the stirring tank can be driven to turn over at an appropriate angle.

In some embodiments, material to be processed is powder or granular form.

In some embodiments, the predetermined angle can be set to 0° to 80°.

In some embodiments, a tilted drum can be used to effectively diffuse, disperse, or distribute the material inside, which can effectively increase the microwave receiving area and make it easier to stir.

The present disclosure can be a batch type batch type stirring equipment, which can include a transmission tank drum, a stirring tank and a microwave device. In some embodiments, the transmission tank drum can have a supporting portion, and an axle can be provided on one side of the internal part of the supporting portion, and the axle can be inclined upward at a predetermined angle from the horizontal plane, and a first tooth part can be installed on one side of the internal part of the supporting portion. In some embodiments, the first tooth portion can be fixed with a transmission, and the transmission can be used to drive the first tooth portion to operate. In some embodiments, the stirring tank can be used to accommodate a material to be processed. In some embodiments, the stirring tank can be installed in the transmission tank drum. In some embodiments, the axle shaft can be rotated on the bottom surface of the stirring tank, and can be located on the periphery of the stirring tank. In some embodiments, a second tooth portion can be provided such as in a ring form around the stirring tank. In some embodiments, the second tooth portion can be coupled with the first tooth portion. In some embodiments, the stirring tank can have a chamber such as a tank inside. In some embodiments, the chamber can have an opening. In some embodiments, a plurality of paddles can be arranged around the chamber. In some embodiments, a plurality of paddles can be substantially evenly arranged around the chamber. In some embodiments, the stirring tank can be also provided with an opening cover or stopper to open or close the opening. In some embodiments, the microwave device can be coupled to the top surface of the stirring tank through a bearing.

In some embodiments, the bearing can be coupled to the periphery of the microwave device, and the bearing can be coupled to the top surface of the stirring tank.

In some embodiments, the opening cover or stopper can be provided with a closable material pouring port.

In some embodiments, the microwave device can be fixed at the center of the top surface of the stirring tank.

In some embodiments, the microwave device can be coupled to the opening cover or stopper.

In some embodiments, a rotation device can be installed on the outside of the transmission tank drum. In some embodiments, the rotation device can be driven by an external power and a control end to operate at or set the rotation angle to drive the transmission tank drum or the stirring tank, or the transmission tank drum and the stirring tank together. In some embodiments, the rotation device can flip the transmission tank drum or the stirring tank to an appropriate angle.

In some embodiments, the material to be processed can be in powder or granular form.

In some embodiments, the predetermined angle can be set to 0°, 5°, 10°, 15°, 20°, 25°, 30°, 35°, 40°, 45°, 50°, 55°, 60°, 65°, 70°, 75°, 80°. In some embodiments, or the predetermined angle can be any angle from 0° to 80°. In some embodiments, the predetermined angle can be not limited to an integer angle, for example, 36.5°, 41.23°, etc.

Figure 8:
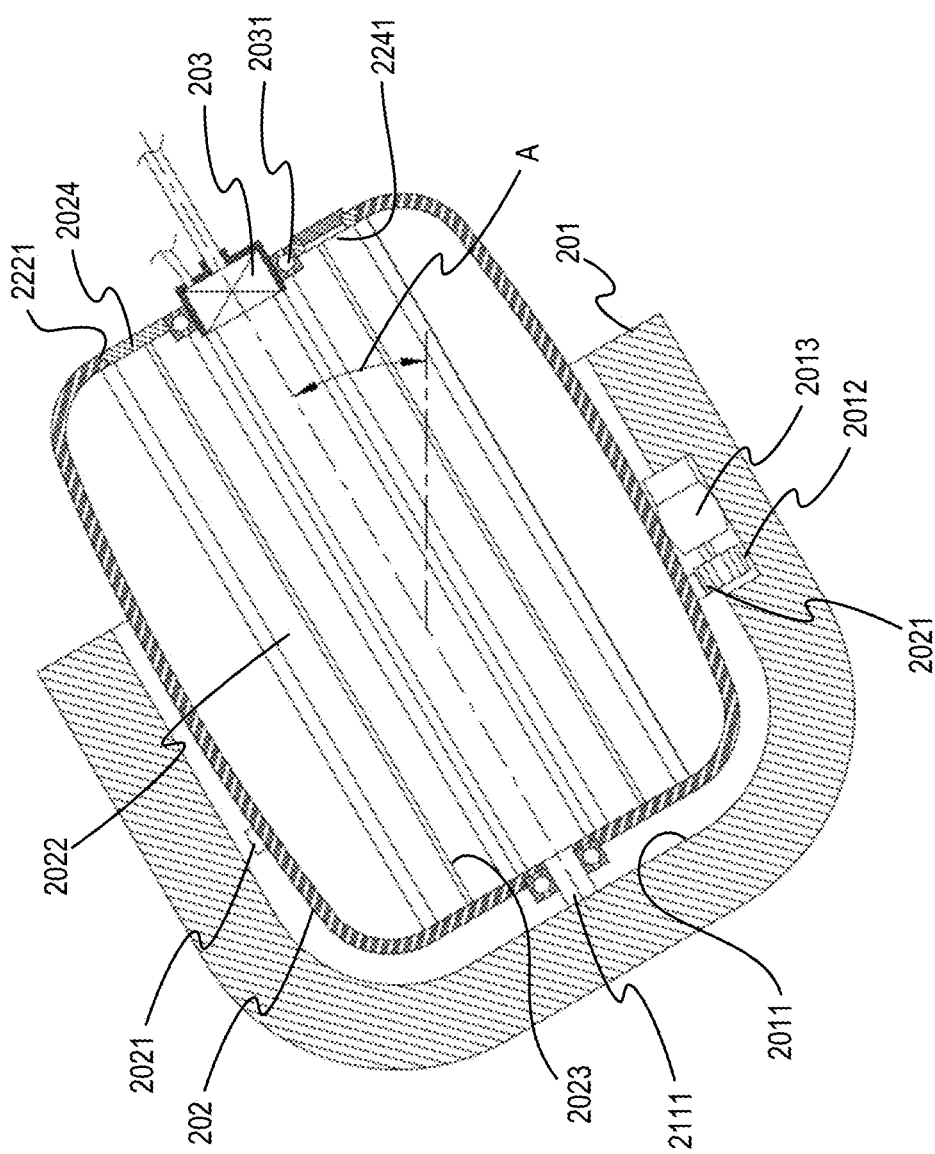
FIG. 8 illustrates a cross-sectional view of the overall structure of the batch-type stirring equipment of this invention in some embodiments.

For example, FIG. 8 illustrates a cross-sectional view of the overall structure of the batch-type stirring equipment in some embodiments.

Referring to FIG. 8, in some embodiments, the batch type stirring equipment can include a transmission tank drum 201, a stirring tank 202 and a microwave device 203.

In some embodiments, the transmission tank drum 201 can have a receiving portion 2011, and an axle 2111 can be provided on one side of the interior of the receiving portion 2011. In some embodiments, the axle 2111 can be tilted upward from the horizontal surface at a predetermined angle A. In some embodiments, the predetermined angle A can be the angle between the axis of the axle 2111 and the horizontal plane. In some embodiments, a first tooth portion 2012 can be installed on one side of the inside of the receiving portion 2011. In some embodiments, a transmission 2013 can be coupled to the first tooth portion 2012. In some embodiments, the transmission 2013 can be used to drive the first tooth portion 2012 to operate. In some embodiments, the first tooth portion 2012 and the axle 2111 can be disposed on different sides of the receiving portion 2011. In some embodiments, the first tooth portion 2012 and the axle 2111 can also be disposed on different sides. In some embodiments, the first tooth portion 2012 and the axle 2111 can also be disposed on the same side inside the receiving portion 2011.

In some embodiments, there can be a second tooth portion 2021 that can be coupled with the first tooth portion 2012 on the periphery of the stirring tank 2. In some embodiments, when the stirring tank 202 can be installed in the receiving portion 2011, it can make the first tooth portion 2012 and the second tooth portion 2021 coupled with each other, and the axle shaft 2111 can be rotated on the bottom surface of the stirring tank 2 so that the stirring tank 2 matches or corresponds to the predetermined angle A of inclination of the axle shaft 2111. In some embodiments, the predetermined angle A can be set to the 30°. In some embodiments, by starting the transmission 2013, the first tooth portion 2012 can drive the second tooth portion 2021 and the stirring tank 2 to rotate, e.g., obliquely on the transmission tank drum 201. In some embodiments, the first tooth portion 2012 can be a gear in some embodiments, the second tooth portion 2021 can be a rack or a rack ring. In some embodiments, the rack ring can be disposed on the periphery of the stirring tank 2. In some embodiments, when the stirring tank rotates, the first tooth portion 2012, the second tooth portion 2021 and the stirring tank 2 can be driven together.

Figure 9:
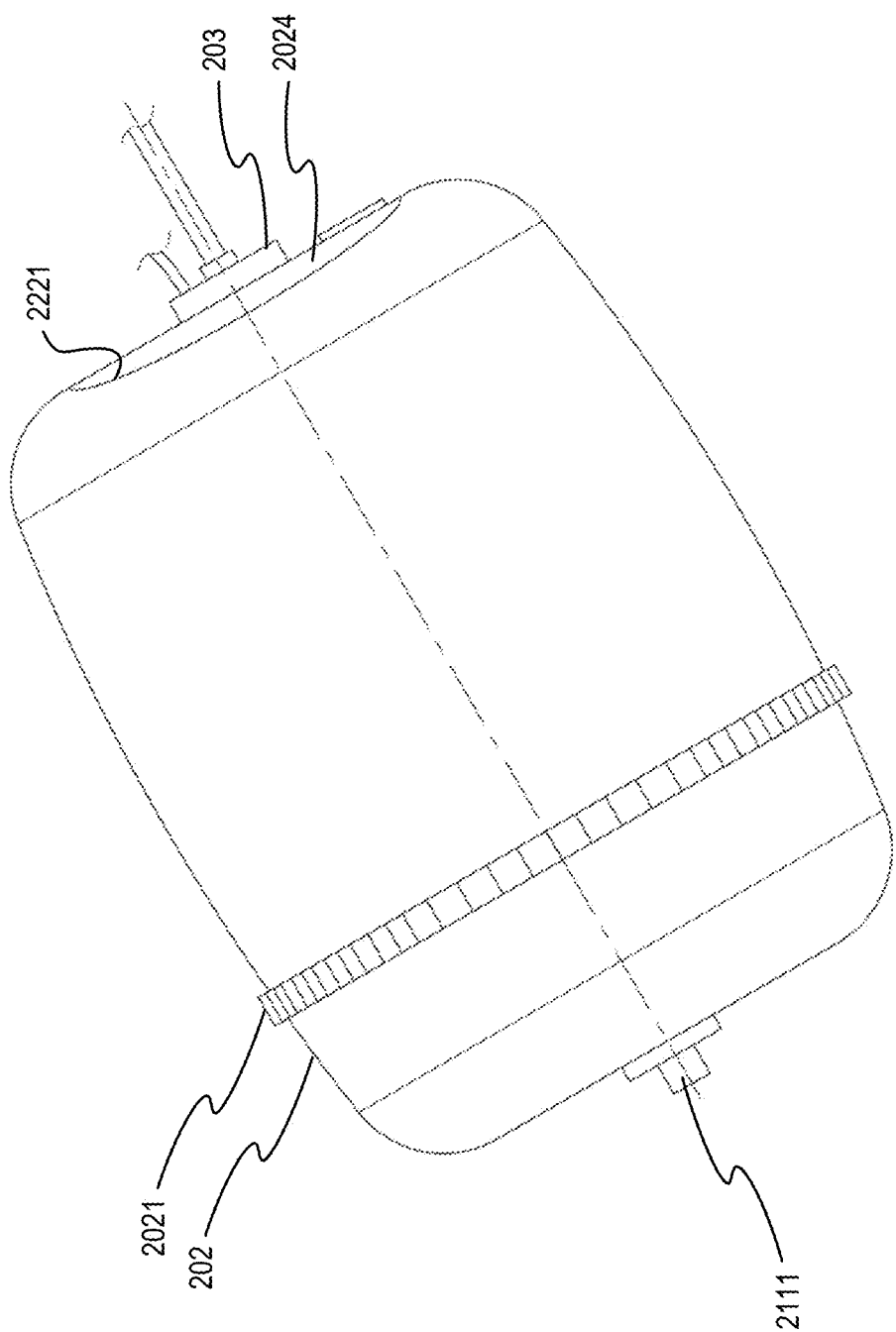
FIG. 9 illustrates an aspect of the stirring tank of the batch type stirring equipment in some embodiments.

FIG. 9 illustrates an aspect of the stirring tank of the batch type stirring equipment in some embodiments.

Figure 10:
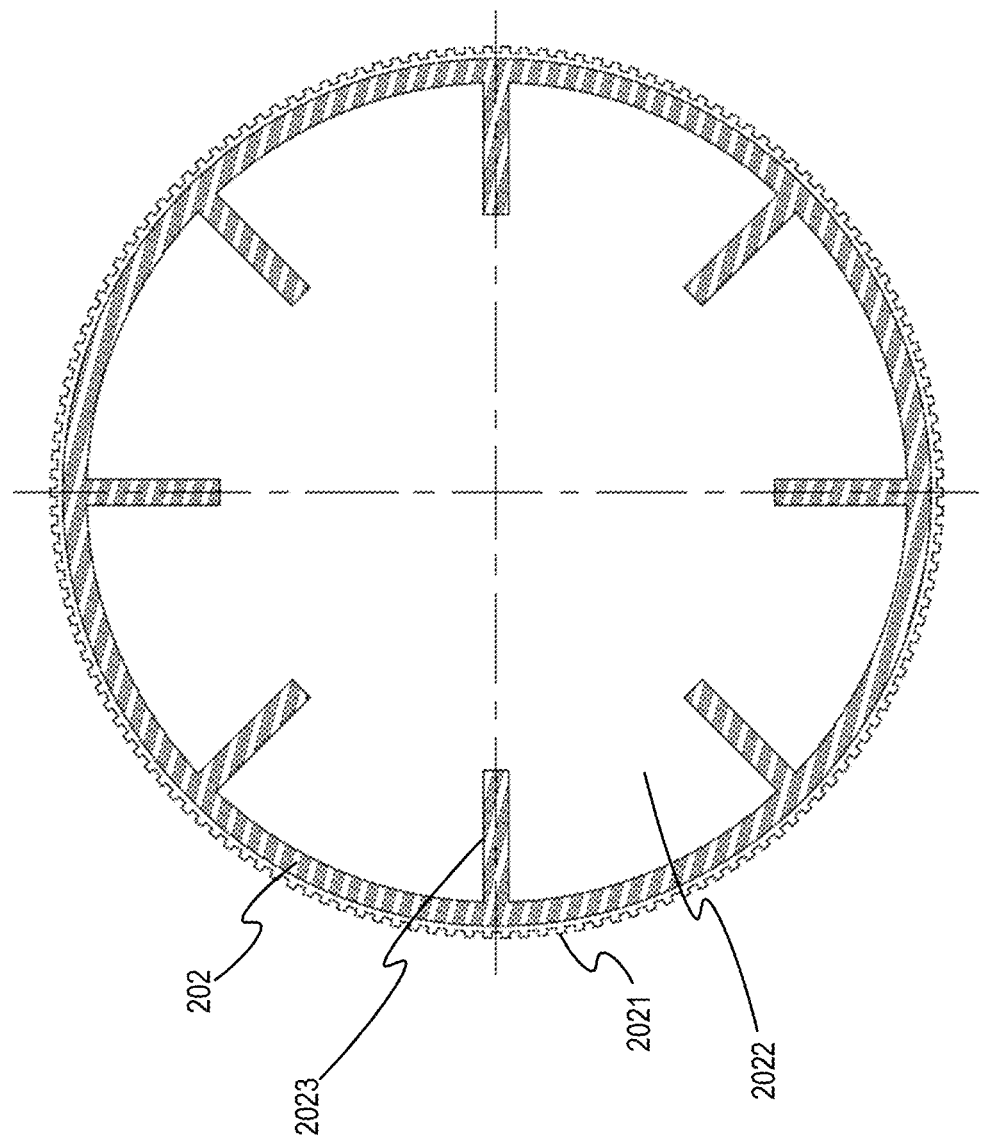
FIG. 10 illustrates a cross-sectional view of the stirring tank structure of the batch-type stirring equipment in some embodiments.

FIG. 10 illustrates a cross-sectional view of the stirring tank structure of the batch-type stirring equipment in some embodiments.

Figure 11:
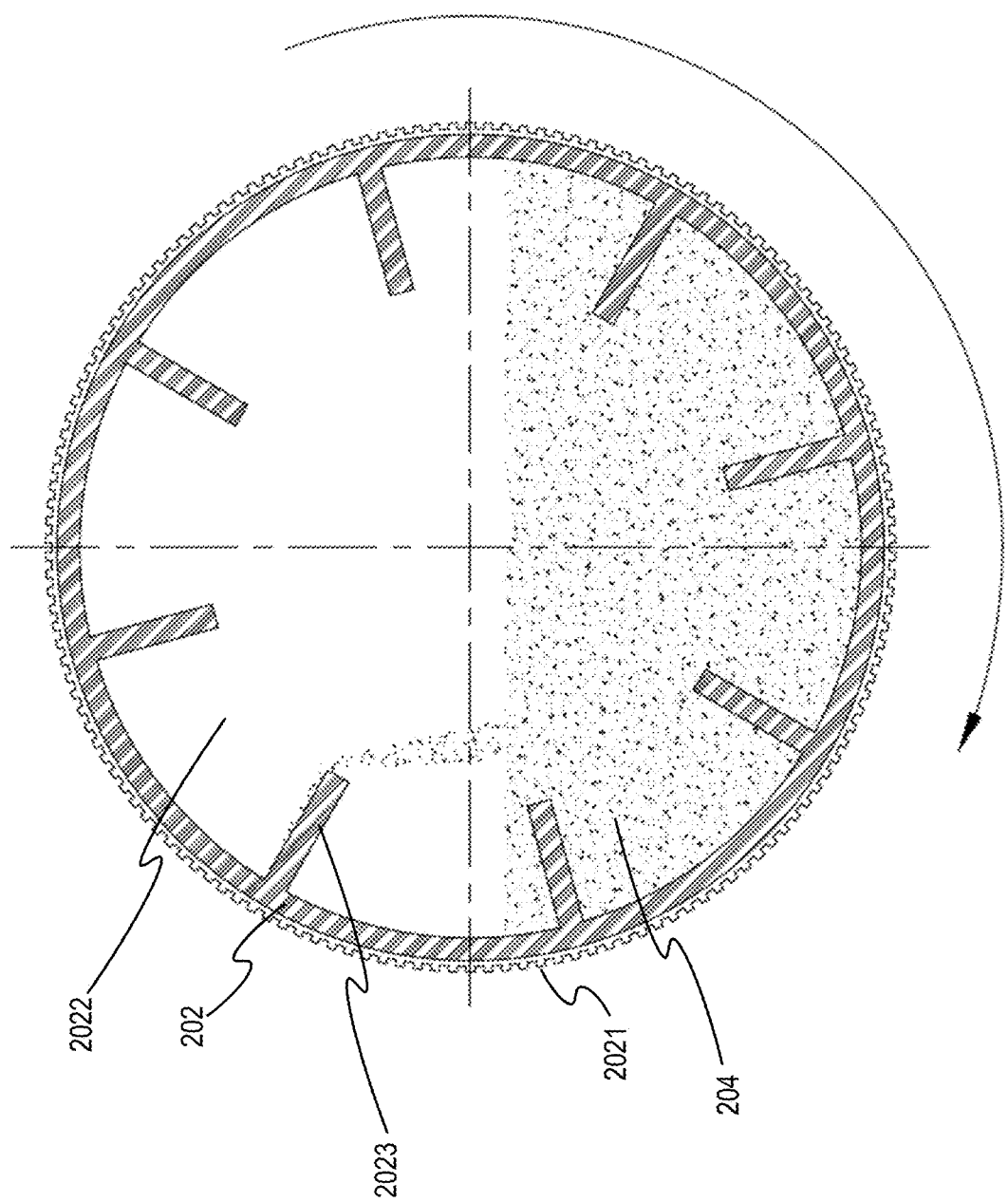
FIG. 11 illustrates a cross-sectional view of the batch-type stirring equipment during a process of mixing in some embodiments.

Referring to FIGS. 8-10. the inside of the stirring tank 2 can have a chamber 2022. the chamber 2022 can have an opening 2221. can be provided with a plurality of paddles 2023 evenly around the chamber 2022. In some embodiments, the top surface of the stirring tank 2 can be also provided with an opening cover or stopper 2024 for opening or closing the opening 2221. In some embodiments, a closable pouring opening 2241 can be provided. In some embodiments, after opening the opening cover or stopper 2024, the material 204 to be processed can be poured into the chamber 2022 through the opening 2221. Referring to FIG. 11, the stirring tank 2 can be rotated. In some embodiments, at this time, each paddle 2023 can turn over the material 204 to be processed as it rotates to evenly stir it.

Referring to FIG. 8, in some embodiments, the microwave device 203 can be a device used to emit microwaves, such as but not limited to a microwave transmitter or a microwave generator. In some embodiments, a bearing 2031 can be coupled to the periphery of the microwave device 203, and the bearing 2031 can be coupled to the center of the top surface of the stirring tank 2. In some embodiments, it can be directly coupled to the opening cover or stopper 2024, so that the microwave device 203 can be without a blockage. In some embodiments, the bearing 2031 can be fixed at the center of the top surface of the stirring tank 2. In some embodiments, the bearing 2031 can be a ball bearing, and its balls can release rotational friction to keep the microwave device 203 located in the stirring tank 2 while the stirring tank 2 is rotating along the axis and allow the stirring tank 2 to rotate relative to the outside.

FIG. 11 illustrates a cross-sectional view of the batch-type stirring equipment during a process of mixing in some embodiments.

Figure 12:
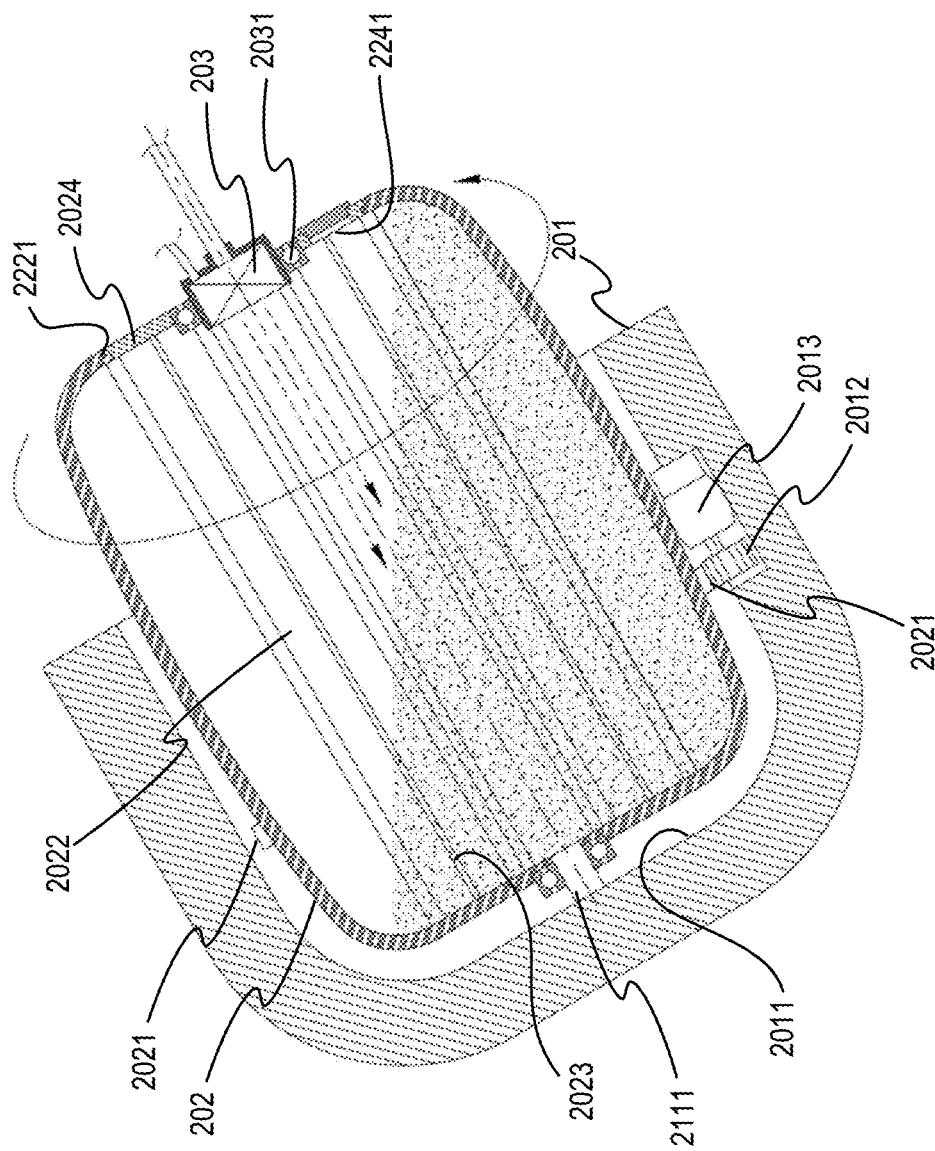
FIG. 12 illustrates a cross-sectional view of the batch-type stirring equipment in some embodiments.

FIG. 12 illustrates a cross-sectional view of the batch-type stirring equipment in some embodiments.

Referring to FIGS. 11 and 12, in some embodiments, no matter any operation can be performed through the microwave device 203 (such as but not limited to sterilization, heating, drying, accelerating, and accelerating chemical reactions, or for stimulating plasma, etc.), the material 204 to be processed can be in powder or granular form. In some embodiments, when the material 204 to be processed can be placed in the tilted stirring tank 202, it can be spread from the bottom along the pouring direction, and the microwave device 203 can irradiate from the top to expand the irradiated area of the material 204 to be processed, and each paddle 2023 in addition to turning over the materials 4 to be processed and mixing them evenly, the turning can be accelerated and the irradiated area can be increased. In some embodiments, therefore, the use of the present disclosure can effectively increase the efficiency of microwave operations.

Figure 13:
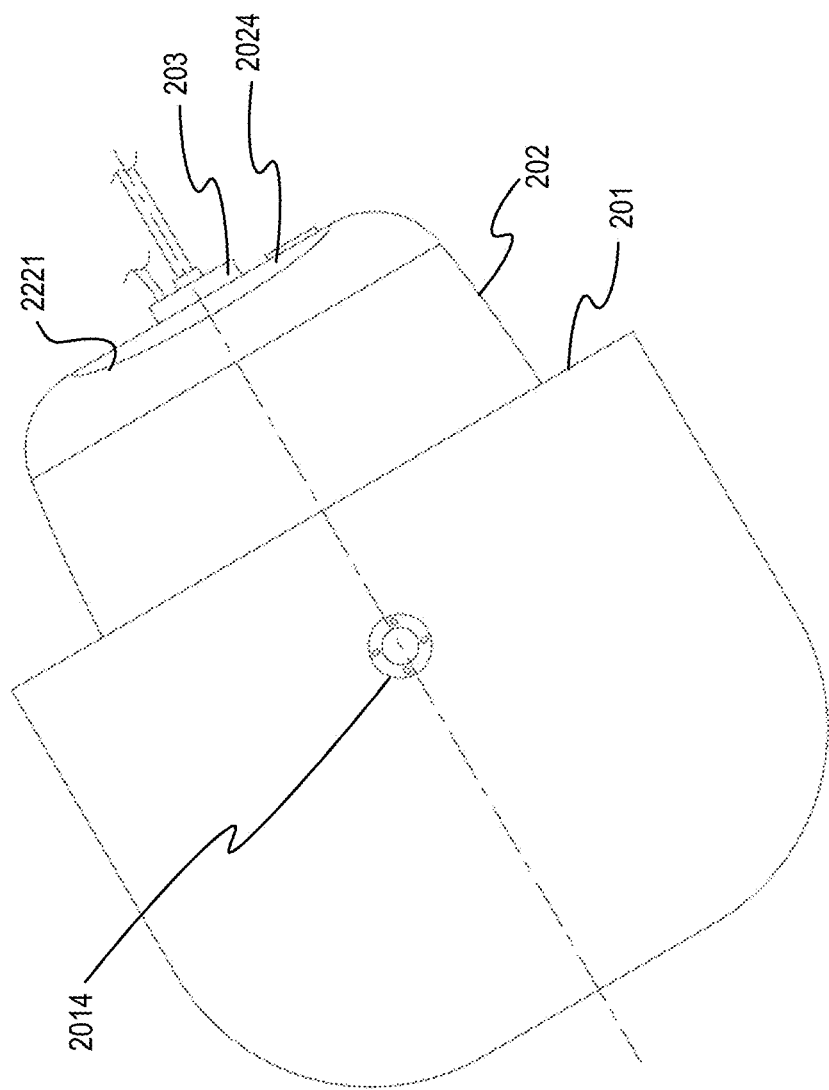
FIG. 13 illustrates a layout diagram of the batch type stirring equipment in some embodiments.
Figure 14:
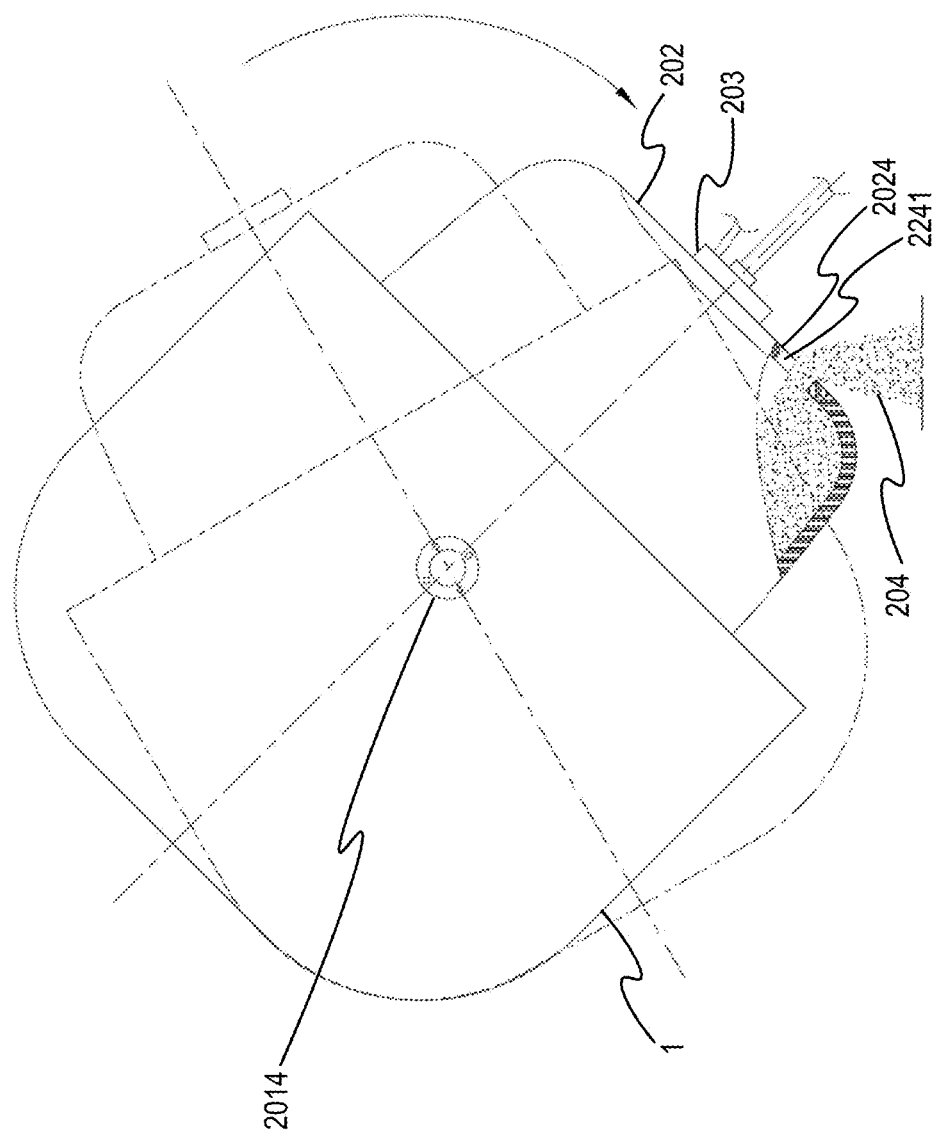
FIG. 14 illustrates a movement of the batch type stirring equipment in some embodiments.

FIGS. 13-14 illustrates the batch type mixing preparation in some embodiments.

Referring FIGS. 13 and 14. In some embodiments, a driver device 14 can be installed on the outside of the transmission tank 1. In some embodiments, the driver device 14 can be driven by an external power and a control end device. (the external power and control end can be not shown in the figure). In some embodiments, the external power can be a motor, and the driver device 14 can be further controlled. In some embodiments, when applying the microwave is completed, after the material 204 is cooled, the pouring port 2241 can be opened, and the driver device 14 drives the transmission tank drum 201 and the stirring tank 2 to turn over at an appropriate angle, so that the material 204 can pass through the pouring port 2241 for pouring. In some embodiments, the appropriate angle refers to turning over the transmission tank drum 201 and the stirring tank 2 together until the material pouring port 2241 faces downward, which can be an angle sufficient to allow the material 204 to fall out of the material pouring port 2241. In some embodiments, the stirring tank 2 can also be taken out from the receiving portion 2011, the opening cover or stopper 2024 can be opened, and the material 204 can be taken out from the opening 2221.

In some embodiments, a stirring equipment such as a microwave stirring equipment can be based on a continuous process.

In some embodiments, a stirring equipment for a continuous process, which can also be referred as a continuous production stirring equipment, such as a continuous production microwave stirring equipment can be provided.

In some embodiments, a stirring equipment for a continuous manufacturing can be provided.

In some embodiments, a stirring equipment for continuous manufacturing can be provided, which can include a tunnel furnace, a conveying device, and a microwave device. In some embodiments, the conveying device can have a rotating shaft pivotally disposed in the tunnel furnace and a plurality of spiral stirring pieces disposed on the rotating shaft in a discontinuous and staggered way. In some embodiments, when a material to be processed enters the tunnel furnace, the rotating shaft drives each spiral stirring piece to continuously mix the material evenly, and the microwave device can be disposed above the tunnel furnace to irradiate the material.

In some embodiments, a continuous production stirring equipment such a continuous production microwave stirring equipment, can include a tunnel furnace, a conveying device and a microwave device. In some embodiments, the conveying device can have a rotating shaft rotatable in the tunnel furnace and a plurality of non-continuous. In some embodiments, the rotating shaft can have staggered spiral stirring blades. In some embodiments, when a material to be processed can be added to the tunnel furnace, the rotating shaft can drive each spiral stirring blade to continuously turn and stir the material. In some embodiments, the microwave device can be arranged around the tunnel furnace to apply or irradiate microwaves to the materials that can be constantly or continuously being stirred.

In some embodiments, a continuous production stirring equipment can be provided, which can be an equipment that provides continuous stirring and microwave treatment of a material. In some embodiments, it can include a tunnel furnace, a conveying device and a microwave device. In some embodiments, the conveying device can have a rotating shaft pivoted in the tunnel furnace and a plurality of discontinuous and staggered spiral stirring blades. In some embodiments, when the material to be stirred by microwave can be added into the tunnel furnace, the rotating shaft will drive each spiral stirring blade to continuously turn and stir the material. In some embodiments, the microwave device can be arranged above the tunnel furnace for irradiating microwaves to the materials that can be constantly being stirred.

In some embodiments, when microwave processing can be carried out on especially powdery or granular materials, some batch equipment can pour a large amount of materials into a barrel, stirs and microwaves them in the barrel, but each pass after a period of time, the microwaved materials must be poured out and new ones poured in again. In some embodiments, during the process, there will be a time difference in replacement operations. In some embodiments, over a long period of time, the production volume may become lower.

In some embodiments, a continuous production stirring equipment such as a continuous production microwave stirring equipment can include a tunnel furnace can have a microwave container inside. In some embodiments, the microwave container can have a microwave inlet and a microwave outlet at both ends. In some embodiments, a material to be stirred by microwave can be added to the inside of the microwave container through the microwave inlet.

In some embodiments, a conveying device can have a rotating shaft pivoted in the microwave container. In some embodiments, the rotating shaft can have a plurality of non-continuous and staggered spiral stirring blades. In some embodiments, the rotating shaft can be also connected with a drive for driving the rotating shaft to rotate. In some embodiments, when the material can be added to the inside of the microwave container, the driving device can drive the rotating shaft to move spiral stirring blades to continuously stir the material until it reaches the microwave outlet. In some embodiments, a microwave device can be disposed at or around various locations, such above the microwave container, for irradiating microwaves to the material in the microwave container.

In some embodiments, the spiral stirring blade can include a plurality of clockwise stirring blades and a plurality of counterclockwise stirring blades. In some embodiments, a counterclockwise stirring tablet can be staggered between two clockwise stirring blades.

In some embodiments, the continuous production stirring equipment can include a cooling pipe and a cooling device. In some embodiments, the cooling pipe can have a cooling inlet and a cooling outlet at both ends, and the cooling inlet can be connected to the microwave. In some embodiments, the outlets can be connected, so that the microwaved material can be added to the inside of the cooling pipe through the cooling inlet. In some embodiments, the cooling device can have a stirring shaft pivoted in the cooling pipe, and can have a plurality of staggered stirring blades on the stirring shaft. In some embodiments, the stirring shaft can be connected to a driving device. In some embodiments, when the material enters the cooling pipe, the driving device can rotate the stirring shaft and drives each stirring blade to continuously stir the material until the material reaches the cooling outlet. In some embodiments, the material can be cooled in the cooling pipe.

In some embodiments, the stirring blade can include a plurality of clockwise blades and a plurality of counterclockwise blades, and one counterclockwise blade can be alternately arranged between two clockwise blades among the plurality of clockwise blades.

In some embodiments, the cooling inlet and the microwave outlet can be connected to each other using a connecting pipe.

In some embodiments, the microwave container can be a circular or u-shaped tube body.

In some embodiments, the tunnel furnace can be a long furnace body.

In some embodiments, the driving device can be located outside the microwave pipe.

In some embodiments, the number of the microwave devices can be plural.

In some embodiments, the material can be in powder or granular form.

In some embodiments, a tunnel-type furnace body can be combined with a thread-like structure for sustainable and uninterrupted transportation to transport and stir materials, so that the materials can be continuously transported inside the furnace body. In some embodiments, it can be sent in and out again, thereby avoiding the occurrence of replacement operations, or thereby reducing the time cost lost due to replacement operations, or substantially improving the overall operating efficiency.

In some embodiments, a continuous production stirring equipment such as a continuous production microwave stirring equipment, which can include a tunnel furnace, a conveying device and a microwave device. In some embodiments, the tunnel furnace can have a microwave container inside. In some embodiments, the microwave container can have a microwave at both ends. In some embodiments, inlet and a microwave outlet, a material to be stirred by microwave can be added to the inside of the microwave pipe through the microwave inlet. In some embodiments, the conveying device can have a rotating shaft arranged in the microwave pipe. In some embodiments, can have a plurality of discontinuous and the staggered spiral stirring blades can be connected to the rotating shaft with a driving device for driving the rotating shaft to rotate. In some embodiments, when the material can be added inside the microwave container, the rotating shaft will drive the spiral stirring blades to continuously turn. In some embodiments, the rotating shaft can stir the material evenly until it reaches the microwave outlet. In some embodiments, the microwave device can be arranged above the microwave container for irradiating microwaves to the material in the microwave container.

In some embodiments, the spiral stirring blades can include a plurality of clockwise stirring blades and a plurality of counterclockwise stirring blades, and one counterclockwise stirring tablet can be staggered between each clockwise stirring tablet.

In some embodiments, it can further include a cooling pipe and a cooling device. In some embodiments, the cooling pipe can be provided with a cooling inlet and a cooling outlet respectively at both ends. In some embodiments, the cooling inlet can be connected with the microwave outlet, so that the material that can have passed the microwave can be added to the inside of the cooling pipe through the cooling inlet. In some embodiments, the cooling device can have a cooling pipe provided or installed on the cooling pipe. In some embodiments, the stirring shaft can have a plurality of staggered stirring blades. In some embodiments, the stirring shaft can be coupled to or connected directly or indirectly to a driving device. In some embodiments, when the material enters the cooling pipe, the driving device can cause the stirring shaft to rotate, and the stirring blades can be driven to continuously stir the material until it reaches the cooling outlet, so that the material can be cooled in the cooling pipe.

In some embodiments, the stirring blades can include a plurality of clockwise blades and a plurality of counterclockwise blades, and one of the counterclockwise blades can be staggered between each of the clockwise blades.

In some embodiments, the cooling inlet and the microwave outlet can be connected to each other using a connecting pipe.

In some embodiments, the microwave container system can be a circular or u-shaped tube body.

In some embodiments, the tunnel furnace can be a long furnace body.

In some embodiments, the driving device can be located outside the microwave container.

In some embodiments, the number of microwave devices can be plural.

In some embodiments, the material can be in powder or granular form.

As disclosed herein, "clockwise stirring part" refers to the stirring part that turns the material in the clockwise direction, and the axis in the clockwise direction can be the rotating shaft of the stirring part set as the axis "counterclockwise stirring part" refers to the stirring part that turns the material in the counterclockwise direction, and the axis in the counterclockwise direction can be the rotating shaft of the stirring piece set as the axis. In some embodiments, "clockwise blade" refers to the blade that turns the material in the clockwise direction, and the axis of the clockwise direction can be the stirring shaft on which the blade can be set. In some embodiments, "counter-clockwise blade" refers to the blade that turns the material in the counterclockwise direction. In some embodiments, the blade, and the axis in the counterclockwise direction can be the stirring shaft with the blade set as the axis.

Figure 15:
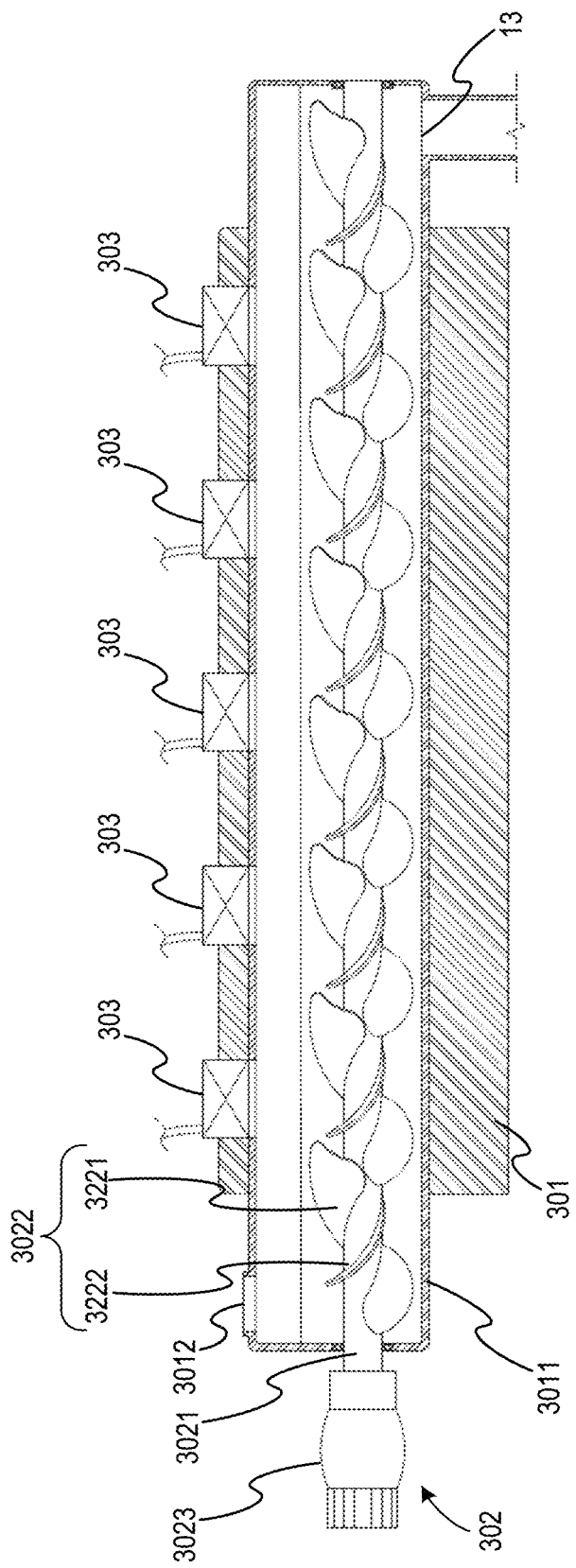
FIG. 15 illustrates a structural cross-sectional view of one of a stirring equipment for a continuous process in some embodiments.

FIG. 15 illustrates a structural cross-sectional view of one of a stirring equipment for a continuous process in some embodiments.

Figure 16:
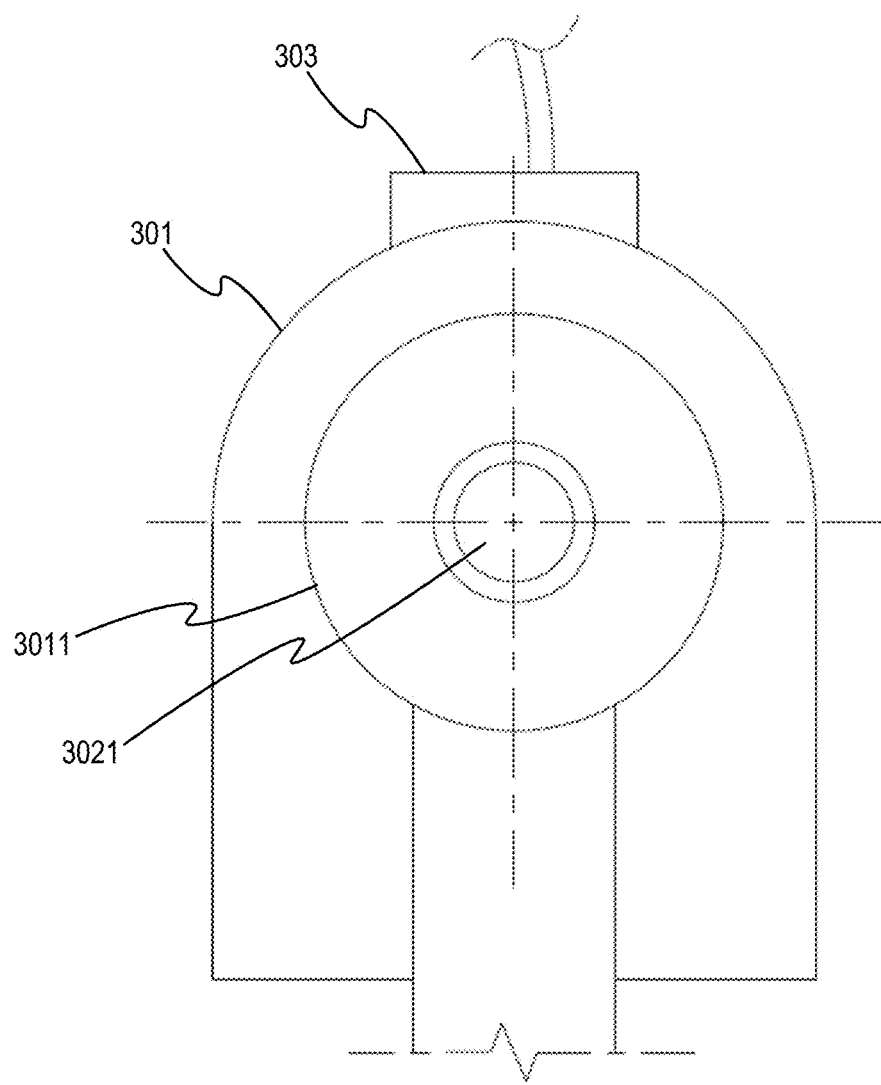
FIG. 16 illustrates a side view of a stirring equipment for a continuous process in some embodiments.

FIG. 16 illustrates a side view of a stirring equipment for a continuous process in some embodiments.

Figure 17:
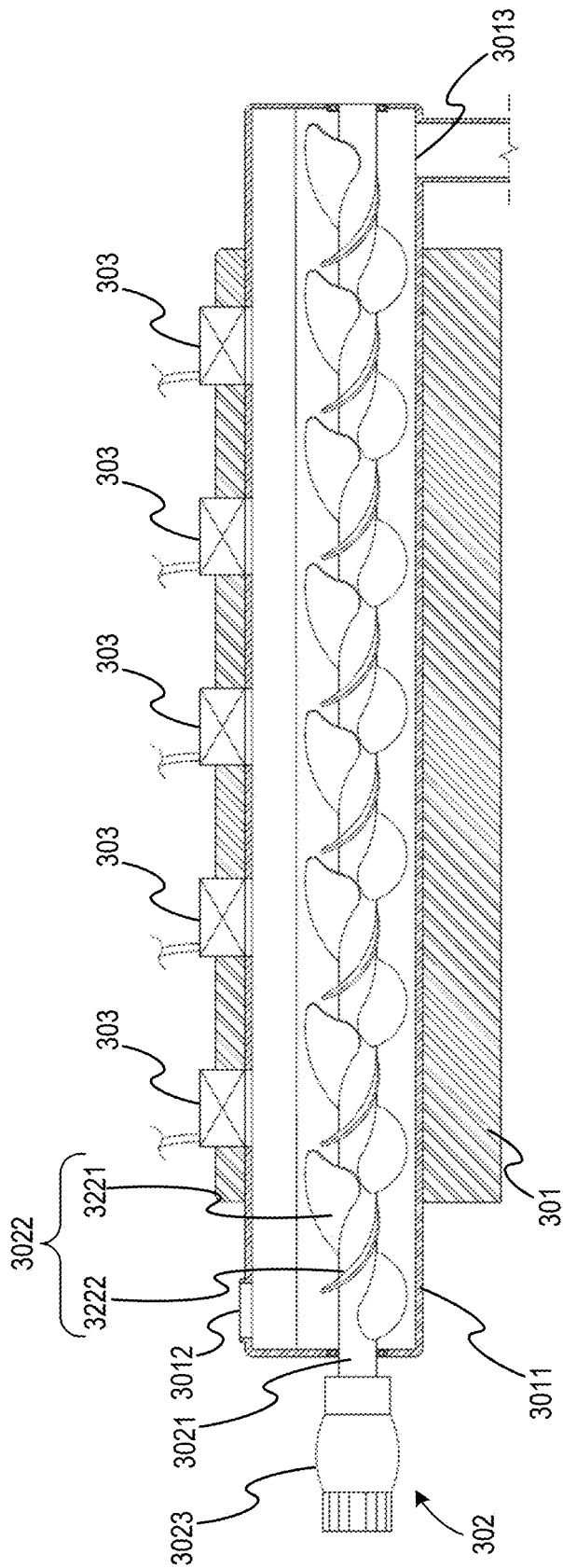
FIG. 17 illustrates a structural cross-sectional view of a stirring equipment for a continuous process in some embodiments.

FIG. 17 illustrates a structural cross-sectional view of a stirring equipment for a continuous process in some embodiments.

Figure 18:
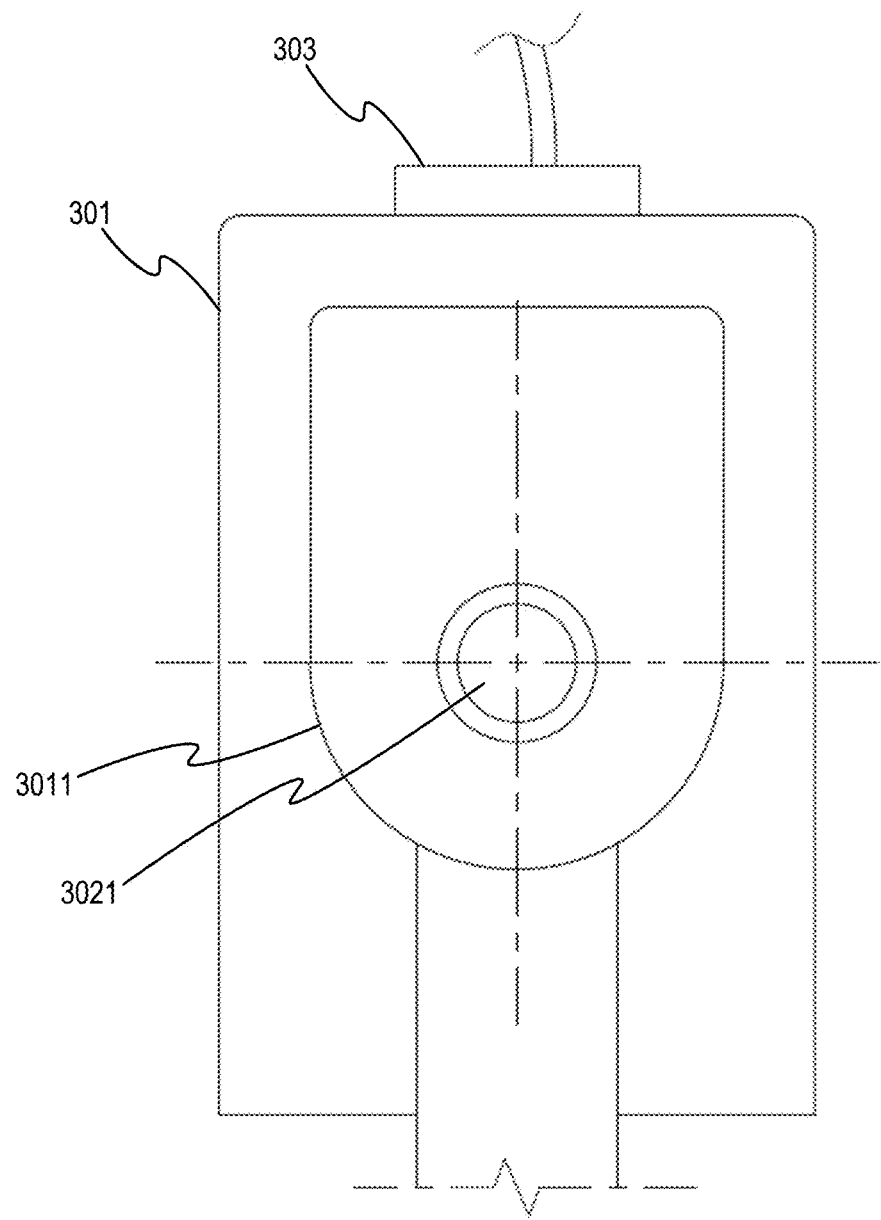
FIG. 18 illustrates a side view of a stirring equipment for a continuous process in some embodiments.

FIG. 18 illustrates a side view of a stirring equipment for a continuous process in some embodiments.

Figure 19:
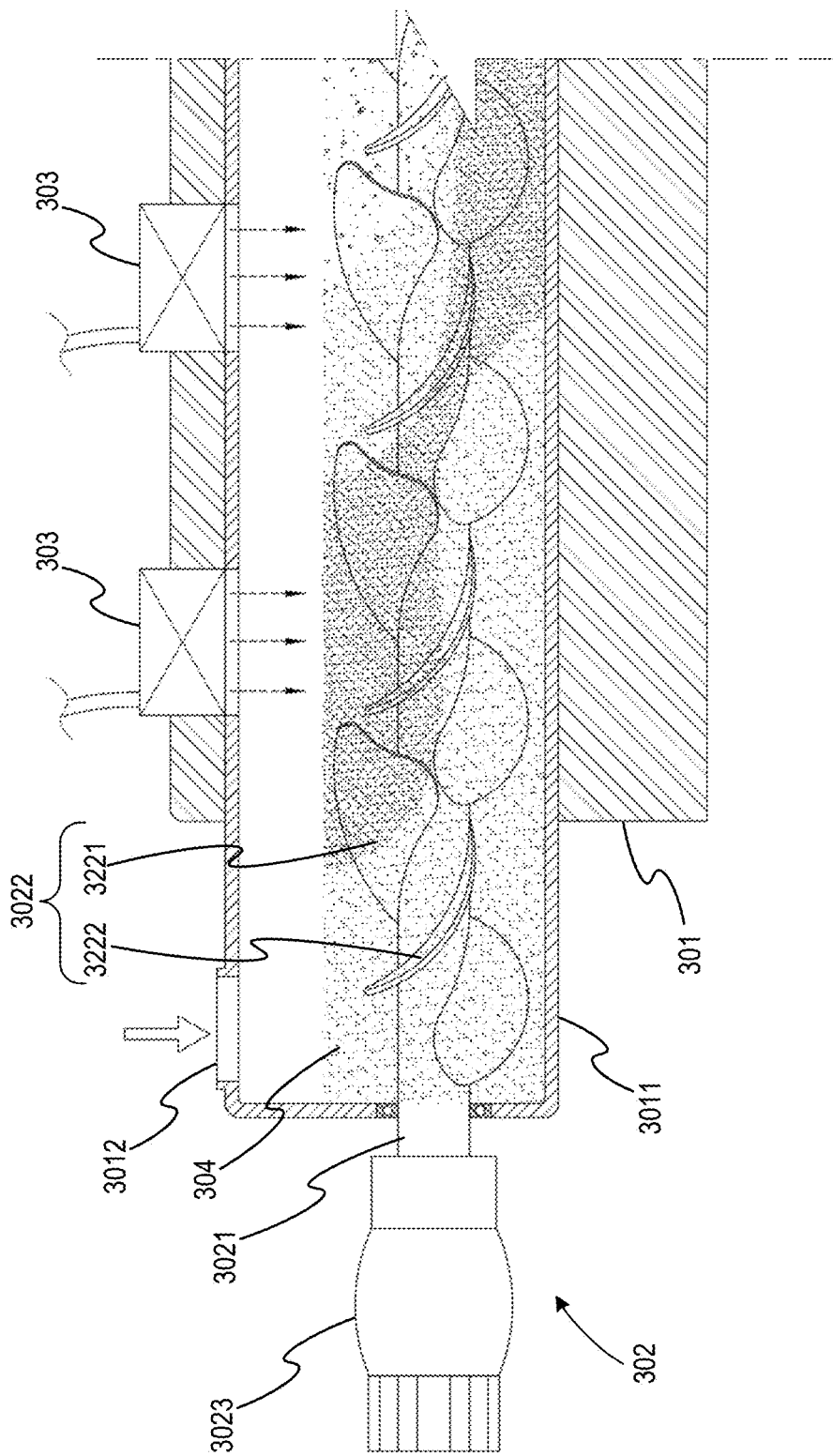
FIG. 19 illustrates partial cross-sectional view of a stirring equipment for a continuous process in some embodiments.

FIG. 19 illustrates partial cross-sectional view of a stirring equipment for a continuous process in some embodiments.

Figure 20:
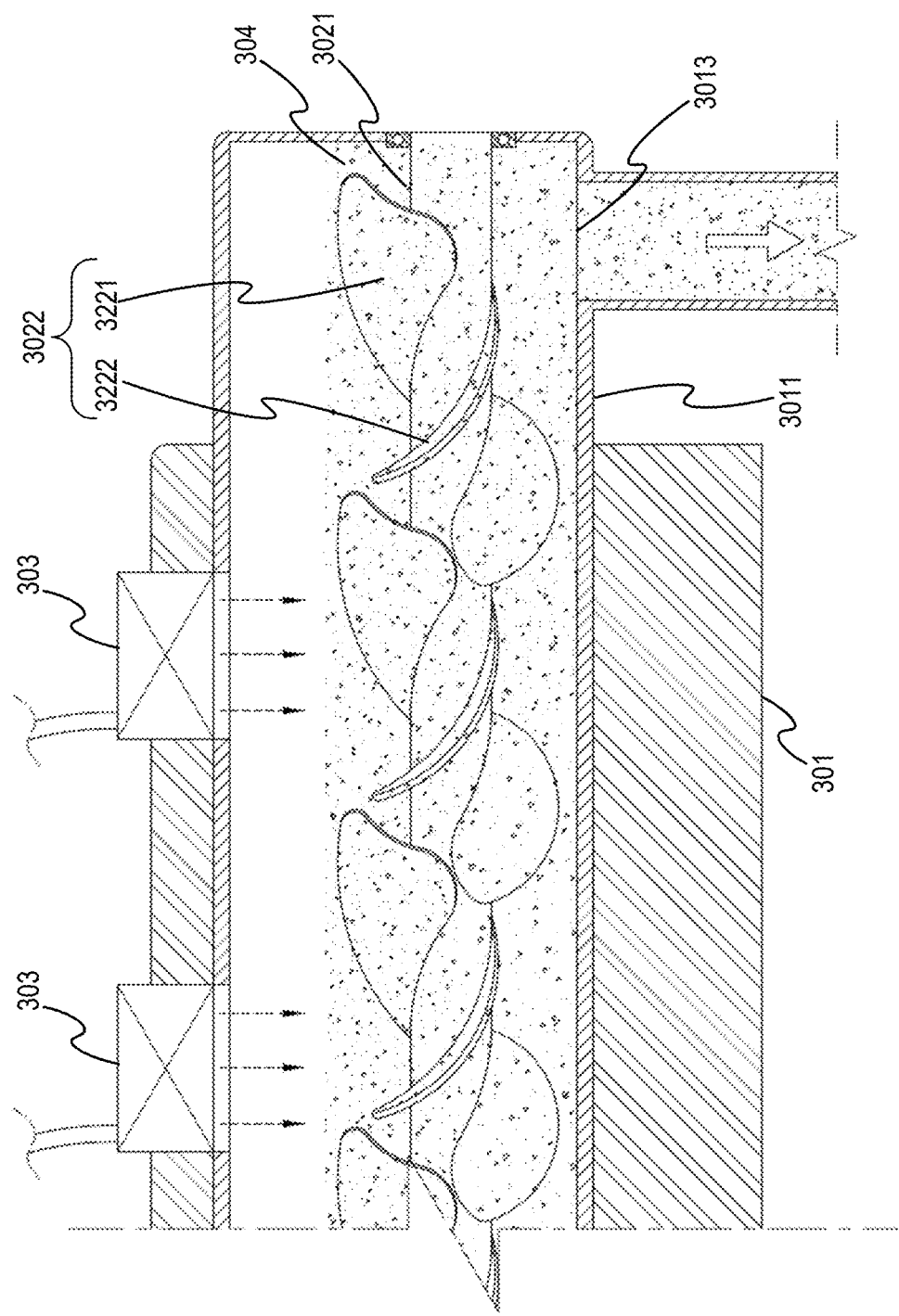
FIG. 20 illustrates the microwave stirring equipment in some embodiments.

FIG. 20 illustrates the microwave stirring equipment in some embodiments.

Figure 21:
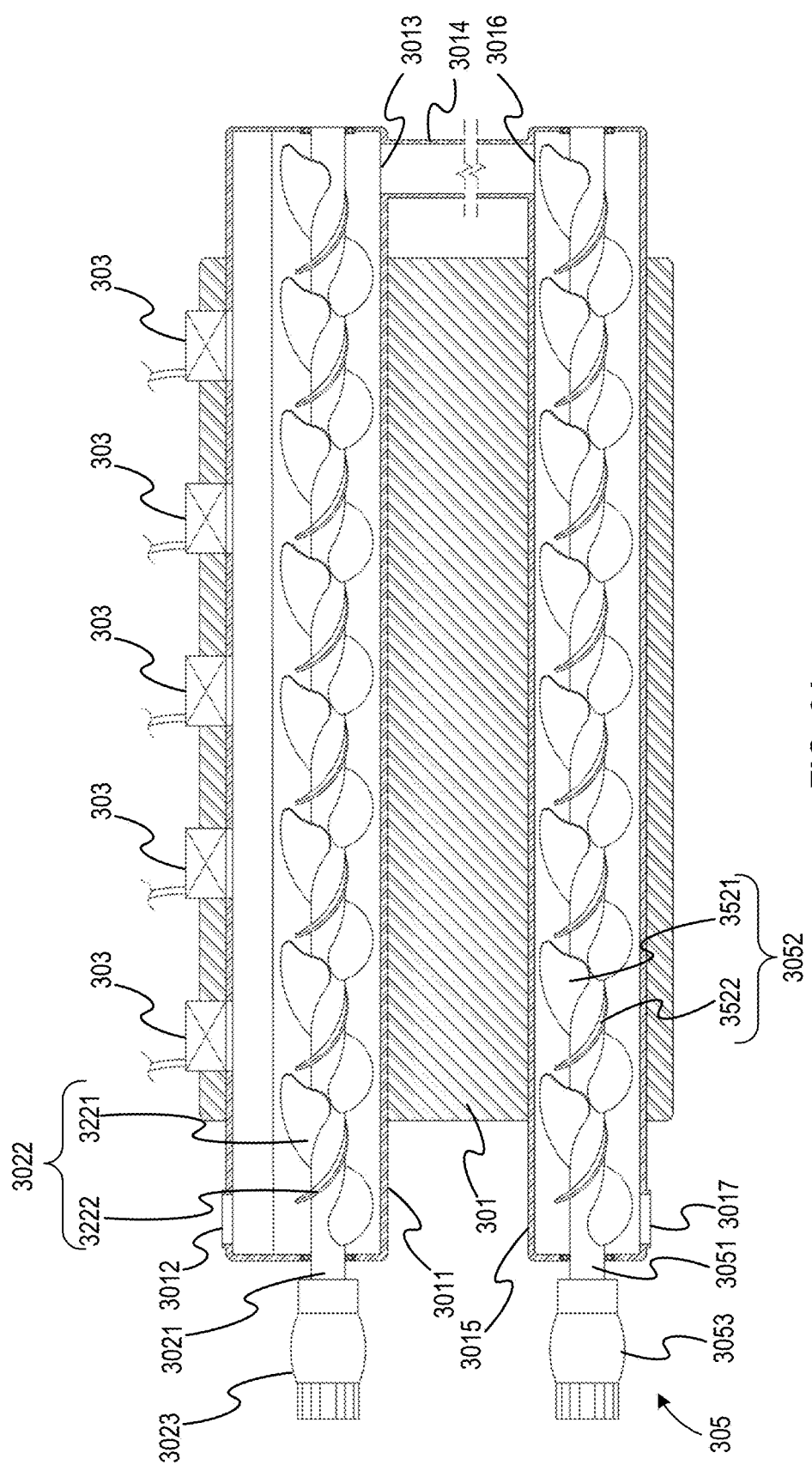
FIG. 21 illustrates a cross-sectional view of the microwave stirring equipment in some embodiments.

FIG. 21 illustrates a cross-sectional view of the microwave stirring equipment in some embodiments.

Referring to FIG. 15, in some embodiments, the continuous production stirring equipment can include a tunnel furnace 301, a conveying device 302 and a microwave device 303. In some embodiments, the conveying device 302 can be used in the tunnel furnace. In some embodiments, a material 304 can be conveyed and stirred in microwave container 3011, and the material 304 can be allowed to pass through the microwave device 303 for microwave treatment.

Referring to FIGS. 15 and 16, in some embodiments, the tunnel furnace 301 can be a long furnace body, and there can be a microwave container 3011 in the tunnel furnace 301. In some embodiments, the microwave the pipe 3011 can be in various shapes, such as a circular pipe body.

Referring to FIGS. 17 and 18, in some embodiments, the microwave pipe 3011 can provided in various shapes and structures, such as a u-shaped pipe body.

Referring to FIGS. 17 to 20, the two ends of the microwave container 3011 can have a microwave inlet 3012 and a microwave outlet 3013 respectively. In some embodiments, the material 304 can be added to the inside of the microwave container 3011 through the microwave inlet 3012. In some embodiments, the conveying device 302 can have a rotating shaft 3021 pivoted in the microwave container 3011, and can have a plurality of non-continuous and staggered spiral stirring blades 3022 on the rotating shaft 3021. In some embodiments, the non-continuously staggered spiral stirring blades 3022 can include a plurality of clockwise stirring blades 3221 and a plurality of counterclockwise stirring blades 3222, wherein a counterclockwise stirring blade 3222 can be staggered between each clockwise stirring blade 32221. In some embodiments, a driving device 3023 can be connected to the rotating shaft 3021, and the driving device 3023 can be located outside the microwave container 3011. In some embodiments, the driving device 3023 can be used to drive the rotating shaft 3021 to rotate. In some embodiments, when the material 304 can be added inside the microwave container 3011, the rotating shaft 3021 will drive each spiral stirring blade 3022 to continuously stir and stir, for example, more consistently or evenly, for example, as the material 304 reaches the microwave outlet 3013.

Referring to FIGS. 15 to 17, the microwave device 303 can be provided at or around various locations, such as above the microwave container 3011. In some embodiments, the microwave device 303 can be a device used to emit microwaves, such as but not limited to a microwave transmitter or a microwave generator. In some embodiments, a plurality of microwave devices 303 can be provided, and their number can be set according to the length of the tunnel furnace 301. In some embodiments, when the material 304 can be continuously stirred inside the microwave container 3011, from the microwave inlet 3012 to the microwave outlet 3013 microwaves can be received at various locations, for example, positions to apply microwaves substantially consistently, depending on types of operation that can be performed through the microwave device 303 (such as sterilization, heating, drying, accelerating chemical reactions, or stimulating plasma, etc.), and the old materials can be the microwave outlet 3013 can be sent out, and new materials can be continuously filled in from the microwave inlet 3012. In some embodiments, when the microwave pipe 3011 is a u-shaped tube body, the material 304. In some embodiments, the entire spiral stirring blade 3022 can be buried, so that the microwave device 303 directly irradiates microwaves to the spiral stirring blade 3022.

Referring to FIGS. 16 to 17. In some embodiments, the material 304 can be in powder form or granular form.

Referring to FIG. 16, in some embodiments, the microwave outlet 3013 can be connected to a connecting pipe 3014, and a cooling pipe 3015 and a cooling device 5 can be provided. In some embodiments, the two ends of the cooling pipe 3015 can have a cooling inlet 3016 and a cooling outlet 3017 respectively. In some embodiments, the cooling inlet 3016 can be connected with the connecting pipe 3014 so that the microwaved material 304 can be added to the inside of the cooling pipe 3015 through the cooling inlet 3016. In some embodiments, the cooling device 5 can have a stirring shaft 3051 pivoted in the cooling pipe 3015, and the stirring shaft 3051 can have a plurality of staggered stirring blades 3052. In some embodiments, in this embodiment, the non-continuously staggered stirring blades 3052 can include a plurality of clockwise blades 3021 and a plurality of counterclockwise blades 3022, wherein a counterclockwise blade 3022 can be staggered between each clockwise blade 3021. In some embodiments, the stirring shaft 3051 can be connected to a driving device 3053, and the driving device 3053 can be located outside the cooling pipe 3015. In some embodiments, the driving device 3053 can be used to drive the stirring shaft 3051 to rotate, so when the material 304 enters the cooling pipe 3015, the rotating stirring shaft 3051 will drive the stirring blades 3052 to continuously turn to stir the material 304 evenly until the material 304 reaches the cooling outlet 3017, so that the temperature of the material 304 can be cooled down in the cooling pipe 3015 (from hundreds of degrees to less than a hundred degrees). In some embodiments, through the cooling process, the material 304 that can have just been microwaved can be prevented from being directly contact causes external cold air to enter and generate negative pressure.

NON-LIMITING EMBODIMENTS

The present disclosure is also described by way of the following non-limiting embodiments. However, the use of these and other embodiments anywhere in the specification is illustrative only and in no way limits the scope and meaning of the disclosure. Likewise, the disclosure is not limited to any particular preferred embodiment or aspect described herein. Indeed, modifications and variations may be apparent to those skilled in the art upon reading this specification, and such variations can be made without departing from the disclosure in spirit or in scope.

1. A process of recycling a composite material comprising a base material composited with a polymer material, the process comprising:
  applying a non-ionizing radiation to the composite material; and
  contacting the composite material with $H_2O$ and $N_2$ while maintaining the non-ionizing radiation until the polymer material is substantially removed from the base material to produce a recycled base material.

2. The process of embodiment 1, wherein the base material comprises carbon fibers.

3. The process of embodiment 1, wherein the base material comprises glass fibers.

4. The process of embodiment 1, wherein the base material comprises carbon fibers and glass fibers.

5. The process of embodiments 1-4, wherein the polymer material is a thermoplastic material.

6. The process of embodiments 1-5, wherein at least about 80% of the polymer material is removed from the base material.

7. The process of embodiments 1-5, wherein at least about 81% of the polymer material is removed from the base material.

8. The process of embodiments 1-5, wherein at least about 82% of the polymer material is removed from the base material.

9. The process of embodiments 1-5, wherein at least about 83% of the polymer material is removed from the base material.

10. The process of embodiments 1-5, wherein at least about 84% of the polymer material is removed from the base material.

11. The process of embodiments 1-5, wherein at least about 85% of the polymer material is removed from the base material.

12. The process of embodiments 1-5, wherein at least about 86% of the polymer material is removed from the base material.

13. The process of embodiments 1-5, wherein at least about 87% of the polymer material is removed from the base material.

14. The process of embodiments 1-5, wherein at least about 88% of the polymer material is removed from the base material.

15. The process of embodiments 1-5, wherein at least about 89% of the polymer material is removed from the base material.

16. The process of embodiments 1-5, wherein at least about 90% of the polymer material is removed from the base material.

17. The process of embodiments 1-5, wherein at least about 91% of the polymer material is removed from the base material.

18. The process of embodiments 1-5, wherein at least about 92% of the polymer material is removed from the base material.

19. The process of embodiments 1-5, wherein at least about 93% of the polymer material is removed from the base material.

20. The process of embodiments 1-5, wherein at least about 94% of the polymer material is removed from the base material.

21. The process of embodiments 1-5, wherein at least about 95% of the polymer material is removed from the base material.

22. The process of embodiments 1-5, wherein at least about 96% of the polymer material is removed from the base material.

23. The process of embodiments 1-5, wherein at least about 97% of the polymer material is removed from the base material.

24. The process of embodiments 1-5, wherein at least about 98% of the polymer material is removed from the base material.

25. The process of embodiments 1-5, wherein at least about 99% of the polymer material is removed from the base material.

26 The process of embodiments 1-5, wherein at least about 99.5% of the polymer material is removed from the base material.

27 The process of embodiments 1-26, wherein the base material is at least substantially intact after the polymer material is substantially removed from the base material.

28. The process of embodiments 1-26, wherein the base material is essentially intact after the polymer material is substantially removed from the base material.

29 The process of embodiments 1-26, wherein the base material is intact after the polymer material is substantially removed from the base material.

30. The process of embodiments 1-29, wherein the base material before applying the non-ionizing radiation has tensile strength and wherein the recycled base material has at least about 80% of the tensile strength of the base material.

31. The process of embodiments 1-29, wherein the base material before applying the non-ionizing radiation has tensile strength and wherein the recycled base material has at least about 85% of the tensile strength of the base material.

32. The process of embodiments 1-29, wherein the base material before applying the non-ionizing radiation has tensile strength and wherein the recycled base material has at least about 90% of the tensile strength of the base material.

33. The process of embodiments 1-29, wherein the base material before applying the non-ionizing radiation has tensile strength and wherein the recycled base material has at least about 95% of the tensile strength of the base material.

34 The process of embodiments 1-29, wherein the base material before applying the non-ionizing radiation has tensile strength and wherein the recycled base material has at least about 97% of the tensile strength of the base material.

35. The process of embodiments 1-29, wherein the base material before applying the non-ionizing radiation has tensile strength and wherein the recycled base material has at least about 98% of the tensile strength of the base material.

36 The process of embodiments 1-29, wherein the base material before applying the non-ionizing radiation has tensile strength and wherein the recycled base material has at least about 99% of the tensile strength of the base material.

37. The process of embodiments 1-36, wherein the base material before applying the non-ionizing radiation has tensile modulus and wherein the recycled base material has at least about 80% of the tensile modulus of the base material.

38. The process of embodiments 1-36, wherein the base material before applying the non-ionizing radiation has tensile modulus and wherein the recycled base material has at least about 85% of the tensile modulus of the base material.

39. The process of embodiments 1-36, wherein the base material before applying the non-ionizing radiation has tensile modulus and wherein the recycled base material has at least about 90% of the tensile modulus of the base material.

40. The process of embodiments 1-36, wherein the base material before applying the non-ionizing radiation has tensile modulus and wherein the recycled base material has at least about 95% of the tensile modulus of the base material.

41. The process of embodiments 1-36, wherein the base material before applying the non-ionizing radiation has tensile modulus and wherein the recycled base material has at least about 97% of the tensile modulus of the base material.

42. The process of embodiments 1-36, wherein the base material before applying the non-ionizing radiation has tensile modulus and wherein the recycled base material has at least about 98% of the tensile modulus of the base material.

43 The process of embodiments 1-36, wherein the base material before applying the non-ionizing radiation has a tensile modulus and wherein the recycled base material has at least about 99% of the tensile modulus of the base material.

44. The process of embodiments 1-43, wherein the base material before applying the non-ionizing radiation has elongation and wherein the recycled base material has at least about 80% of the elongation of the base material.

45. The process of embodiments 1-43, wherein the base material before applying the non-ionizing radiation has elongation and wherein the recycled base material has at least about 81% of the elongation of the base material.

46. The process of embodiments 1-43, wherein the base material before applying the non-ionizing radiation has elongation and wherein the recycled base material has at least about 82% of the elongation of the base material.

47. The process of embodiments 1-43, wherein the base material before applying the non-ionizing radiation has elongation and wherein the recycled base material has at least about 83% of the elongation of the base material.

48. The process of embodiments 1-43, wherein the base material before applying the non-ionizing radiation has elongation and wherein the recycled base material has at least about 84% of the elongation of the base material.

49. The process of embodiments 1-43, wherein the base material before applying the non-ionizing radiation has elongation and wherein the recycled base material has at least about 85% of the elongation of the base material.

50. The process of embodiments 1-43, wherein the base material before applying the non-ionizing radiation has elongation and wherein the recycled base material has at least about 86% of the elongation of the base material.

51. The process of embodiments 1-43, wherein the base material before applying the non-ionizing radiation has elongation and wherein the recycled base material has at least about 87% of the elongation of the base material.

52. The process of embodiments 1-43, wherein the base material before applying the non-ionizing radiation has elongation and wherein the recycled base material has at least about 88% of the elongation of the base material.

53. The process of embodiments 1-43, wherein the base material before applying the non-ionizing radiation has elongation and wherein the recycled base material has at least about 89% of the elongation of the base material.

54 The process of embodiments 1-43, wherein the base material before applying the non-ionizing radiation has elongation and wherein the recycled base material has at least about 90% of the elongation of the base material.

55. The process of embodiments 1-43, wherein the base material before applying the non-ionizing radiation has elongation and wherein the recycled base material has at least about 91% of the elongation of the base material.

56. The process of embodiments 1-43, wherein the base material before applying the non-ionizing radiation has elongation and wherein the recycled base material has at least about 92% of the elongation of the base material.

57. The process of embodiments 1-43, wherein the base material before applying the non-ionizing radiation has elongation and wherein the recycled base material has at least about 93% of the elongation of the base material.

58. The process of embodiments 1-43, wherein the base material before applying the non-ionizing radiation has elongation and wherein the recycled base material has at least about 94% of the elongation of the base material.

59 The process of embodiments 1-43, wherein the base material before applying the non-ionizing radiation has elongation and wherein the recycled base material has at least about 95% of the elongation of the base material.

60. The process of embodiments 1-43, wherein the base material before applying the non-ionizing radiation has elongation and wherein the recycled base material has at least about 96% of the elongation of the base material.

61. The process of embodiments 1-43, wherein the base material before applying the non-ionizing radiation has elongation and wherein the recycled base material has at least about 97% of the elongation of the base material.

62 The process of embodiments 1-43, wherein the base material before applying the non-ionizing radiation has elongation and wherein the recycled base material has at least about 98% of the elongation of the base material.

63. The process of embodiments 1-43, wherein the base material before applying the non-ionizing radiation has elongation and wherein the recycled base material has at least about 99% of the elongation of the base material.

64 The process of embodiments 1-63, wherein the base material before applying the non-ionizing radiation has coefficients of thermal expansion and wherein the recycled base material has at least about 80% of the coefficients of thermal expansion of the base material.

65. The process of embodiments 1-63, wherein the base material before applying the non-ionizing radiation has coefficients of thermal expansion and wherein the recycled base material has at least about 81% of the coefficients of thermal expansion of the base material.

66. The process of embodiments 1-63, wherein the base material before applying the non-ionizing radiation has coefficients of thermal expansion and wherein the recycled base material has at least about 82% of the coefficients of thermal expansion of the base material.

67. The process of embodiments 1-63, wherein the base material before applying the non-ionizing radiation has coefficients of thermal expansion and wherein the recycled base material has at least about 83% of the coefficients of thermal expansion of the base material.

68. The process of embodiments 1-63, wherein the base material before applying the non-ionizing radiation has coefficients of thermal expansion and wherein the recycled base material has at least about 84% of the coefficients of thermal expansion of the base material.

69. The process of embodiments 1-63, wherein the base material before applying the non-ionizing radiation has coefficients of thermal expansion and wherein the recycled base material has at least about 85% of the coefficients of thermal expansion of the base material.

70. The process of embodiments 1-63, wherein the base material before applying the non-ionizing radiation has coefficients of thermal expansion and wherein the recycled base material has at least about 86% of the coefficients of thermal expansion of the base material.

71. The process of embodiments 1-63, wherein the base material before applying the non-ionizing radiation has coefficients of thermal expansion and wherein the recycled base material has at least about 87% of the coefficients of thermal expansion of the base material.

72. The process of embodiments 1-63, wherein the base material before applying the non-ionizing radiation has coefficients of thermal expansion and wherein the recycled base material has at least about 88% of the coefficients of thermal expansion of the base material.

73. The process of embodiments 1-63, wherein the base material before applying the non-ionizing radiation has coefficients of thermal expansion and wherein the recycled base material has at least about 89% of the coefficients of thermal expansion of the base material.

74 The process of embodiments 1-63, wherein the base material before applying the non-ionizing radiation has coefficients of thermal expansion and wherein the recycled base material has at least about 90% of the coefficients of thermal expansion of the base material.

75. The process of embodiments 1-63, wherein the base material before applying the non-ionizing radiation has coefficients of thermal expansion and wherein the recycled base material has at least about 91% of the coefficients of thermal expansion of the base material.

76. The process of embodiments 1-63, wherein the base material before applying the non-ionizing radiation has coefficients of thermal expansion and wherein the recycled base material has at least about 92% of the coefficients of thermal expansion of the base material.

77. The process of embodiments 1-63, wherein the base material before applying the non-ionizing radiation has coefficients of thermal expansion and wherein the recycled base material has at least about 93% of the coefficients of thermal expansion of the base material.

78. The process of embodiments 1-63, wherein the base material before applying the non-ionizing radiation has coefficients of thermal expansion and wherein the recycled base material has at least about 94% of the coefficients of thermal expansion of the base material.

79. The process of embodiments 1-63, wherein the base material before applying the non-ionizing radiation has coefficients of thermal expansion and wherein the recycled base material has at least about 95% of the coefficients of thermal expansion of the base material.

80. The process of embodiments 1-63, wherein the base material before applying the non-ionizing radiation has coefficients of thermal expansion and wherein the recycled base material has at least about 96% of the coefficients of thermal expansion of the base material.

81. The process of embodiments 1-63, wherein the base material before applying the non-ionizing radiation has coefficients of thermal expansion and wherein the recycled base material has at least about 97% of the coefficients of thermal expansion of the base material.

82 The process of embodiments 1-63, wherein the base material before applying the non-ionizing radiation has coefficients of thermal expansion and wherein the recycled base material has at least about 98% of the coefficients of thermal expansion of the base material.

83 The process of embodiments 1-63, wherein the base material before applying the non-ionizing radiation has coefficients of thermal expansion and wherein the recycled base material has at least about 99% of the coefficients of thermal expansion of the base material.

84. The process of embodiments 1-83, wherein the base material before applying the non-ionizing radiation has coefficients of thermal conductivity and wherein the recycled base material has at least about 80% of the coefficients of thermal conductivity of the base material.

85. The process of embodiments 1-83, wherein the base material before applying the non-ionizing radiation has coefficients of thermal conductivity and wherein the recycled base material has at least about 81% of the coefficients of thermal conductivity of the base material.

86. The process of embodiments 1-83, wherein the base material before applying the non-ionizing radiation has coefficients of thermal conductivity and wherein the recycled base material has at least about 82% of the coefficients of thermal conductivity of the base material.

87. The process of embodiments 1-83, wherein the base material before applying the non-ionizing radiation has coefficients of thermal conductivity and wherein the recycled base material has at least about 83% of the coefficients of thermal conductivity of the base material.

88. The process of embodiments 1-83, wherein the base material before applying the non-ionizing radiation has coefficients of thermal conductivity and wherein the recycled base material has at least about 84% of the coefficients of thermal conductivity of the base material.

89. The process of embodiments 1-83, wherein the base material before applying the non-ionizing radiation has coefficients of thermal conductivity and wherein the recycled base material has at least about 85% of the coefficients of thermal conductivity of the base material.

90. The process of embodiments 1-83, wherein the base material before applying the non-ionizing radiation has coefficients of thermal conductivity and wherein the recycled base material has at least about 86% of the coefficients of thermal conductivity of the base material.

91. The process of embodiments 1-83, wherein the base material before applying the non-ionizing radiation has coefficients of thermal conductivity and wherein the recycled base material has at least about 87% of the coefficients of thermal conductivity of the base material.

92. The process of embodiments 1-83, wherein the base material before applying the non-ionizing radiation has coefficients of thermal conductivity and wherein the recycled base material has at least about 88% of the coefficients of thermal conductivity of the base material.

93. The process of embodiments 1-83, wherein the base material before applying the non-ionizing radiation has coefficients of thermal conductivity and wherein the recycled base material has at least about 89% of the coefficients of thermal conductivity of the base material.

94 The process of embodiments 1-83, wherein the base material before applying the non-ionizing radiation has coefficients of thermal conductivity and wherein the recycled base material has at least about 90% of the coefficients of thermal conductivity of the base material.

95. The process of embodiments 1-83, wherein the base material before applying the non-ionizing radiation has coefficients of thermal conductivity and wherein the recycled base material has at least about 91% of the coefficients of thermal conductivity of the base material.

96. The process of embodiments 1-83, wherein the base material before applying the non-ionizing radiation has coefficients of thermal conductivity and wherein the recycled base material has at least about 92% of the coefficients of thermal conductivity of the base material.

97. The process of embodiments 1-83, wherein the base material before applying the non-ionizing radiation has coefficients of thermal conductivity and wherein the recycled base material has at least about 93% of the coefficients of thermal conductivity of the base material.

98. The process of embodiments 1-83, wherein the base material before applying the non-ionizing radiation has coefficients of thermal conductivity and wherein the recycled base material has at least about 94% of the coefficients of thermal conductivity of the base material.

99 The process of embodiments 1-83, wherein the base material before applying the non-ionizing radiation has coefficients of thermal conductivity and wherein the recycled base material has at least about 95% of the coefficients of thermal conductivity of the base material.

100. The process of embodiments 1-83, wherein the base material before applying the non-ionizing radiation has coefficients of thermal conductivity and wherein the recycled base material has at least about 96% of the coefficients of thermal conductivity of the base material.

101. The process of embodiments 1-83, wherein the base material before applying the non-ionizing radiation has coefficients of thermal conductivity and wherein the recycled base material has at least about 97% of the coefficients of thermal conductivity of the base material.

102. The process of embodiments 1-83, wherein the base material before applying the non-ionizing radiation has coefficients of thermal conductivity and wherein the recycled base material has at least about 98% of the coefficients of thermal conductivity of the base material.

103. The process of embodiments 1-83, wherein the base material before applying the non-ionizing radiation has coefficients of thermal conductivity and wherein the recycled base material has at least about 99% of the coefficients of thermal conductivity of the base material.

104. The process of embodiments 1-103, wherein the base material before applying the non-ionizing radiation has electrical conductivity and wherein the recycled base material has at least about 80% of the electrical conductivity of the base material.

105. The process of embodiments 1-103, wherein the base material before applying the non-ionizing radiation has electrical conductivity and wherein the recycled base material has at least about 81% of the electrical conductivity of the base material.

106. The process of embodiments 1-103, wherein the base material before applying the non-ionizing radiation has electrical conductivity and wherein the recycled base material has at least about 82% of the electrical conductivity of the base material.

107. The process of embodiments 1-103, wherein the base material before applying the non-ionizing radiation has electrical conductivity and wherein the recycled base material has at least about 83% of the electrical conductivity of the base material.

108. The process of embodiments 1-103, wherein the base material before applying the non-ionizing radiation has electrical conductivity and wherein the recycled base material has at least about 84% of the electrical conductivity of the base material.

109. The process of embodiments 1-103, wherein the base material before applying the non-ionizing radiation has electrical conductivity and wherein the recycled base material has at least about 85% of the electrical conductivity of the base material.

110. The process of embodiments 1-103, wherein the base material before applying the non-ionizing radiation has electrical conductivity and wherein the recycled base material has at least about 86% of the electrical conductivity of the base material.

111. The process of embodiments 1-103, wherein the base material before applying the non-ionizing radiation has electrical conductivity and wherein the recycled base material has at least about 87% of the electrical conductivity of the base material.

112. The process of embodiments 1-103, wherein the base material before applying the non-ionizing radiation has electrical conductivity and wherein the recycled base material has at least about 88% of the electrical conductivity of the base material.

113. The process of embodiments 1-103, wherein the base material before applying the non-ionizing radiation has electrical conductivity and wherein the recycled base material has at least about 89% of the electrical conductivity of the base material.

114. The process of embodiments 1-103, wherein the base material before applying the non-ionizing radiation has electrical conductivity and wherein the recycled base material has at least about 90% of the electrical conductivity of the base material.

115. The process of embodiments 1-103, wherein the base material before applying the non-ionizing radiation has electrical conductivity and wherein the recycled base material has at least about 91% of the electrical conductivity of the base material.

116. The process of embodiments 1-103, wherein the base material before applying the non-ionizing radiation has electrical conductivity and wherein the recycled base material has at least about 92% of the electrical conductivity of the base material.

117. The process of embodiments 1-103, wherein the base material before applying the non-ionizing radiation has electrical conductivity and wherein the recycled base material has at least about 93% of the electrical conductivity of the base material.

118. The process of embodiments 1-103, wherein the base material before applying the non-ionizing radiation has electrical conductivity and wherein the recycled base material has at least about 94% of the electrical conductivity of the base material.

119. The process of embodiments 1-103, wherein the base material before applying the non-ionizing radiation has electrical conductivity and wherein the recycled base material has at least about 95% of the electrical conductivity of the base material.

120. The process of embodiments 1-103, wherein the base material before applying the non-ionizing radiation has electrical conductivity and wherein the recycled base material has at least about 96% of the electrical conductivity of the base material.

121. The process of embodiments 1-103, wherein the base material before applying the non-ionizing radiation has electrical conductivity and wherein the recycled base material has at least about 97% of the electrical conductivity of the base material.

122. The process of embodiments 1-103, wherein the base material before applying the non-ionizing radiation has electrical conductivity and wherein the recycled base material has at least about 98% of the electrical conductivity of the base material.

123. The process of embodiments 1-103, wherein the base material before applying the non-ionizing radiation has electrical conductivity and wherein the recycled base material has at least about 99% of the electrical conductivity of the base material.

124. The process of embodiments 1-123, wherein the base material before applying the non-ionizing radiation has density and wherein the recycled base material has at least about 80% of the density of the base material.

125. The process of embodiments 1-123, wherein the base material before applying the non-ionizing radiation has density and wherein the recycled base material has at least about 81% of the density of the base material.

126. The process of embodiments 1-123, wherein the base material before applying the non-ionizing radiation has density and wherein the recycled base material has at least about 82% of the density of the base material.

127. The process of embodiments 1-123, wherein the base material before applying the non-ionizing radiation has density and wherein the recycled base material has at least about 83% of the density of the base material.

128. The process of embodiments 1-123, wherein the base material before applying the non-ionizing radiation has density and wherein the recycled base material has at least about 84% of the density of the base material.

129. The process of embodiments 1-123, wherein the base material before applying the non-ionizing radiation has density and wherein the recycled base material has at least about 85% of the density of the base material.

130. The process of embodiments 1-123, wherein the base material before applying the non-ionizing radiation has density and wherein the recycled base material has at least about 86% of the density of the base material.

131. The process of embodiments 1-123, wherein the base material before applying the non-ionizing radiation has density and wherein the recycled base material has at least about 87% of the density of the base material.

132. The process of embodiments 1-123, wherein the base material before applying the non-ionizing radiation has density and wherein the recycled base material has at least about 88% of the density of the base material.

133. The process of embodiments 1-123, wherein the base material before applying the non-ionizing radiation has density and wherein the recycled base material has at least about 89% of the density of the base material.

134. The process of embodiments 1-123, wherein the base material before applying the non-ionizing radiation has density and wherein the recycled base material has at least about 90% of the density of the base material.

135. The process of embodiments 1-123, wherein the base material before applying the non-ionizing radiation has density and wherein the recycled base material has at least about 91% of the density of the base material.

136. The process of embodiments 1-123, wherein the base material before applying the non-ionizing radiation has density and wherein the recycled base material has at least about 92% of the density of the base material.

137. The process of embodiments 1-123, wherein the base material before applying the non-ionizing radiation has density and wherein the recycled base material has at least about 93% of the density of the base material.

138. The process of embodiments 1-123, wherein the base material before applying the non-ionizing radiation has density and wherein the recycled base material has at least about 94% of the density of the base material.

139. The process of embodiments 1-123, wherein the base material before applying the non-ionizing radiation has density and wherein the recycled base material has at least about 95% of the density of the base material.

140. The process of embodiments 1-123, wherein the base material before applying the non-ionizing radiation has density and wherein the recycled base material has at least about 96% of the density of the base material.

141. The process of embodiments 1-123, wherein the base material before applying the non-ionizing radiation has density and wherein the recycled base material has at least about 97% of the density of the base material.

142. The process of embodiments 1-123, wherein the base material before applying the non-ionizing radiation has density and wherein the recycled base material has at least about 98% of the density of the base material.

143. The process of embodiments 1-123, wherein the base material before applying the non-ionizing radiation has density and wherein the recycled base material has at least about 99% of the density of the base material.

144. The process of embodiments 1-143, wherein at least about 70% of the base material is intact after the polymer material is substantially removed from the base material.

145. The process of embodiments 1-143, wherein at least about 71% of the base material is intact after the polymer material is substantially removed from the base material.

146. The process of embodiments 1-143, wherein at least about 72% of the base material is intact after the polymer material is substantially removed from the base material.

147. The process of embodiments 1-143, wherein at least about 73% of the base material is intact after the polymer material is substantially removed from the base material.

148. The process of embodiments 1-143, wherein at least about 74% of the base material is intact after the polymer material is substantially removed from the base material.

149. The process of embodiments 1-143, wherein at least about 75% of the base material is intact after the polymer material is substantially removed from the base material.

150. The process of embodiments 1-143, wherein at least about 76% of the base material is intact after the polymer material is substantially removed from the base material.

151. The process of embodiments 1-143, wherein at least about 77% of the base material is intact after the polymer material is substantially removed from the base material.

152. The process of embodiments 1-143, wherein at least about 78% of the base material is intact after the polymer material is substantially removed from the base material.

153. The process of embodiments 1-143, wherein at least about 79% of the base material is intact after the polymer material is substantially removed from the base material.

154. The process of embodiments 1-143, wherein at least about 80% of the base material is intact after the polymer material is substantially removed from the base material.

155. The process of embodiments 1-143, wherein at least about 81% of the base material is intact after the polymer material is substantially removed from the base material.

156. The process of embodiments 1-143, wherein at least about 82% of the base material is intact after the polymer material is substantially removed from the base material.

157. The process of embodiments 1-143, wherein at least about 83% of the base material is intact after the polymer material is substantially removed from the base material.

158. The process of embodiments 1-143, wherein at least about 84% of the base material is intact after the polymer material is substantially removed from the base material.

159. The process of embodiments 1-143, wherein at least about 85% of the base material is intact after the polymer material is substantially removed from the base material.

160. The process of embodiments 1-143, wherein at least about 86% of the base material is intact after the polymer material is substantially removed from the base material.

161. The process of embodiments 1-143, wherein at least about 87% of the base material is intact after the polymer material is substantially removed from the base material.

162. The process of embodiments 1-143, wherein at least about 88% of the base material is intact after the polymer material is substantially removed from the base material.

163. The process of embodiments 1-143, wherein at least about 89% of the base material is intact after the polymer material is substantially removed from the base material.

164. The process of embodiments 1-143, wherein at least about 90% of the base material is intact after the polymer material is substantially removed from the base material.

165. The process of embodiments 1-143, wherein at least about 91% of the base material is intact after the polymer material is substantially removed from the base material.

166. The process of embodiments 1-143, wherein at least about 92% of the base material is intact after the polymer material is substantially removed from the base material.

167. The process of embodiments 1-143, wherein at least about 93% of the base material is intact after the polymer material is substantially removed from the base material.

168. The process of embodiments 1-143, wherein at least about 94% of the base material is intact after the polymer material is substantially removed from the base material.

169. The process of embodiments 1-143, wherein at least about 95% of the base material is intact after the polymer material is substantially removed from the base material.

170. The process of embodiments 1-143, wherein at least about 96% of the base material is intact after the polymer material is substantially removed from the base material.

171. The process of embodiments 1-143, wherein at least about 97% of the base material is intact after the polymer material is substantially removed from the base material.

172. The process of embodiments 1-143, wherein at least about 98% of the base material is intact after the polymer material is substantially removed from the base material.

173. The process of embodiments 1-143, wherein at least about 99% of the base material is intact after the polymer material is substantially removed from the base material.

174. The process of embodiments 1-143, wherein at least about 99.5% of the base material is intact after the polymer material is substantially removed from the base material.

175. The process of embodiments 1-143, wherein at least about 99.7% of the base material is intact after the polymer material is substantially removed from the base material.

176. The process of embodiments 1-175, wherein the recycled base material is not substantially oxidized or degraded after the polymer material is substantially removed from the base material.

177. The process of embodiments 1-176, wherein less than about 5 weight percent of the base material is degraded after the polymer material is substantially removed from the base material.

178. The process of embodiments 1-176, wherein less than about 2 weight percent of the base material is degraded after the polymer material is substantially removed from the base material.

179. The process of embodiments 1-176, wherein less than about 1 weight percent of the base material is degraded after the polymer material is substantially removed from the base material.

180. The process of embodiments 1-176, wherein less than about 0.5 weight percent of the base material is degraded after the polymer material is substantially removed from the base material.

181. The process of embodiments 1-176, wherein less than about 0.3 weight percent of the base material is degraded after the polymer material is substantially removed from the base material.

182. The process of embodiments 1-176, wherein less than about 0.1 weight percent of the base material is degraded after the polymer material is substantially removed from the base material.

183. The process of embodiments 1-176, wherein less than about 0.01 weight percent of the base material is degraded after the polymer material is substantially removed from the base material.

184. The process of embodiments 1-176, wherein less than about 0.005 weight percent of the base material is degraded after the polymer material is substantially removed from the base material.

185. The process of embodiments 1-184, where in the non-ionizing radiation is sufficient to cause pyrolysis of the polymer material.

186. The process of embodiments 1-185, where in the non-ionizing radiation is sufficient to cause melting of the polymer material.

187. The process of embodiments 1-26, wherein the non-ionizing radiation has a frequency of from about 500 MHz to about 3000 MHz.

188. The process of embodiments 1-26, wherein the non-ionizing radiation has a frequency of from about 600 MHz to about 2900 MHz.

189. The process of embodiments 1-26, wherein the non-ionizing radiation has a frequency of from about 700 MHz to about 2800 MHz.

190. The process of embodiments 1-26, wherein the non-ionizing radiation has a frequency of from about 800 MHz to about 2700 MHz.

191. The process of embodiments 1-26, wherein the non-ionizing radiation has a frequency of from about 900 MHz to about 2900 MHz.

192. The process of embodiments 1-26, wherein the non-ionizing radiation has a frequency of from about 900 MHz to about 2800 MHz.

193. The process of embodiments 1-26, wherein the non-ionizing radiation has a frequency of from about 900 MHz to about 2700 MHz.

194. The process of embodiments 1-26, wherein the non-ionizing radiation has a frequency of from about 900 MHz to about 2600 MHz.

195. The process of embodiments 1-26, wherein the non-ionizing radiation has a frequency of from about 900 MHz to about 2500 MHz.

196. The process of embodiments 1-26, wherein the non-ionizing radiation has a frequency of from about 500 MHz to about 2900 MHz.

197. The process of embodiments 1-26, wherein the non-ionizing radiation has a frequency of from about 500 MHz to about 2700 MHz.

198. The process of embodiments 1-26, wherein the non-ionizing radiation has a frequency of from about 500 MHz to about 2600 MHz.

199. The process of embodiments 1-26, wherein the non-ionizing radiation has a frequency of from about 500 MHz to about 2500 MHz.

200. The process of embodiments 1-26, wherein the non-ionizing radiation has a frequency of from about 915 MHz to about 2450 MHz.

201. The process of embodiments 1-200, before applying the non-ionizing radiation, the $N_2$ is applied to contact the composite material.

202. The process of embodiments 1-201, after the $N_2$ is applied to contact the composite material, the $H_2O$ is applied to contact the composite material.

203. The process of embodiments 1-202, during applying the non-ionizing radiation, the $H_2O$ is applied to contact the composite material.

204. The process of embodiments 1-200, wherein at least a portion of the $N_2$ and at least a portion of the $H_2O$ is applied simultaneously to contact the composite material.

205. The process of embodiments 1-200, wherein at least a portion of the $N_2$ and at least a portion of the $H_2O$ is applied simultaneously to contact the composite material before applying the non-ionizing radiation.

206. The process of embodiments 1-200, wherein at least a portion of the $N_2$ and at least a portion of the $H_2O$ is applied simultaneously to contact the composite material during applying the non-ionizing radiation.

207. The process of embodiments 1-200, wherein at least a portion of the $N_2$ and at least a portion of the $H_2O$ is applied simultaneously to contact the composite material after applying the non-ionizing radiation.

208. The process of embodiments 1-186, wherein the gas mixture comprises from about 0.1% to about 20% by volume of $H_2O$.

209. The process of embodiments 1-199, wherein the gas mixture comprises from about 0.1% to about 15% by volume of $H_2O$.

210. The process of embodiments 1-199, wherein the gas mixture comprises from about 0.1% to about 10% by volume of $H_2O$.

211. The process of embodiments 1-199, wherein the gas mixture comprises from about 0.1% to about 8% by volume of $H_2O$.

212. The process of embodiments 1-199, wherein the gas mixture comprises from about 0.1% to about 5% by volume of $H_2O$.

213. The process of embodiments 1-199, wherein the gas mixture comprises from about 0.1% to about 3% by volume of $H_2O$.

214. The process of embodiments 1-199, wherein the gas mixture comprises from about 0.1% to about 1% by volume of $H_2O$.

215. The process of embodiments 1-214, wherein the gas mixture is essentially free of oxygen.

216. The process of embodiments 1-214, wherein the gas mixture contains no more than about 1% by volume of oxygen.

217. The process of embodiments 1-214, wherein the gas mixture contains no more than about 0.5% by volume of oxygen.

218. The process of embodiments 1-214, wherein the gas mixture contains no more than about 0.1% by volume of oxygen.

219. The process of embodiments 1-214, wherein the gas mixture contains no more than about 0.01% by volume of oxygen.

220. The process of embodiments 1-219, wherein the base material has break rate of no more than about 25% after the polymer material is removed from the base material.

221. The process of embodiments 1-219, wherein the base material has break rate of no more than about 20% after the polymer material is removed from the base material.

222. The process of embodiments 1-219, wherein the base material has break rate of no more than about 15% after the polymer material is removed from the base material.

223. The process of embodiments 1-219, wherein the base material has break rate of no more than about 10% after the polymer material is removed from the base material.

224. The process of embodiments 1-219, wherein the base material has break rate of no more than about 5% after the polymer material is removed from the base material.

225. The process of embodiments 1-219, wherein the base material has break rate of no more than about 3% after the polymer material is removed from the base material.

226. The process of embodiments 1-219, wherein the base material has break rate of no more than about 2% after the polymer material is removed from the base material.

227. The process of embodiments 1-219, wherein the base material has break rate of no more than about 1% after the polymer material is removed from the base material.

228. The process of embodiments 1-227, wherein the process is a batch process.

229. The process of embodiments 1-227, wherein the process is a continuous process.

230. The process of embodiments 1-227, wherein the recycled base material after the process has an increased electric conductivity compared to a base material recycle process without the $H_2O$ and $N_2$.

231. The process of embodiments 1-230, wherein the recycled base material after the process has a 10% increased electric conductivity compared to a base material recycle process without the $H_2O$ and $N_2$.

232. The process of embodiments 1-230, wherein the recycled base material after the process has a 20% increased electric conductivity compared to a base material recycle process without the $H_2O$ and $N_2$.

233. The process of embodiments 1-230, wherein the recycled base material after the process has a 30% increased electric conductivity compared to a base material recycle process without the $H_2O$ and $N_2$.

234. The process of embodiments 1-230, wherein the recycled base material after the process has a 50% increased electric conductivity compared to a base material recycle process without the $H_2O$ and $N_2$.

235. The process of embodiments 1-233, wherein the recycled base material after the process has an increased thermal conductivity compared to a base material recycle process without the gas mixture of $H_2O$ and $N_2$.

236. The process of embodiments 1-235, wherein the recycled base material after the process has a 10% increased thermal conductivity compared to a base material recycle process without the $H_2O$ and $N_2$.

237. The process of embodiments 1-235, wherein the recycled base material after the process has a 20% increased thermal conductivity compared to a base material recycle process without the $H_2O$ and $N_2$.

238. The process of embodiments 1-235, wherein the recycled base material after the process has a 30% increased thermal conductivity compared to a base material recycle process without the $H_2O$ and $N_2$.

239. The process of embodiments 1-235, wherein the recycled base material after the process has a 50% increased thermal conductivity compared to a base material recycle process without the $H_2O$ and $N_2$.

240. An apparatus for recycling composite material comprising base material composited with polymer material, the apparatus comprising:
a reactor to contain the composite material;
a non-ionizing radiation generator to apply a non-ionizing radiation to the composite material in the reactor; and
at least one port in fluid communication with a $N_2$ source to supply $N_2$ to the reactor and in fluid communication with a $H_2O$ source to supply $H_2O$ to the reactor, to cause contacting the composite material with a gas mixture of the $H_2O$ and the $N_2$ while maintaining the non-ionizing radiation generator to generate the non-ionizing radiation;
wherein the non-ionizing radiation generator is to maintain generating the non-ionizing radiation until the polymer material is substantially removed from the base material as recycled base material.

241. The apparatus of embodiment 240, further comprising a steam generator to supply the $H_2O$ to the reactor as a steam.

242. The apparatus of embodiments 240-241, wherein the at least one port includes a port in fluid communication with the $N_2$ source and the $H_2O$ source to supply the $N_2$ and the $H_2O$ to contact the composite material.

243. The apparatus of embodiments 240-241, wherein the at least one port includes
a first port in fluid communication with the $N_2$ source to supply the $N_2$ to contact the composite material, and
a second port in fluid communication with the $H_2O$ source to supply the $H_2O$ to contact the composite material.

244. The apparatus of embodiments 240-243, wherein the base material includes carbon fibers.

245. The apparatus of embodiments 240-243, wherein the base material includes glass fibers.

246. The apparatus of embodiments 240-243, wherein the base material includes carbon fibers and glass fibers.

247. The apparatus of embodiments 240-246, wherein the polymer material is thermoplastic material.

248. The apparatus of embodiments 240-247, wherein the apparatus is to remove at least 80% of the polymer material.

249. The apparatus of embodiments 240-247, wherein the apparatus is to remove at least 81% of the polymer material.

250. The apparatus of embodiments 240-247, wherein the apparatus is to remove at least 82% of the polymer material.

251. The apparatus of embodiments 240-247, wherein the apparatus is to remove at least 83% of the polymer material.

252. The apparatus of embodiments 240-247, wherein the apparatus is to remove at least 84% of the polymer material.

253. The apparatus of embodiments 240-247, wherein the apparatus is to remove at least 85% of the polymer material.

254. The apparatus of embodiments 240-247, wherein the apparatus is to remove at least 86% of the polymer material.

255. The apparatus of embodiments 240-247, wherein the apparatus is to remove at least 87% of the polymer material.

256. The apparatus of embodiments 240-247, wherein the apparatus is to remove at least 88% of the polymer material.

257. The apparatus of embodiments 240-247, wherein the apparatus is to remove at least 89% of the polymer material.

258. The apparatus of embodiments 240-247, wherein the apparatus is to remove at least 90% of the polymer material.

259. The apparatus of embodiments 240-247, wherein the apparatus is to remove at least 91% of the polymer material.

260. The apparatus of embodiments 240-247, wherein the apparatus is to remove at least 92% of the polymer material.

261. The apparatus of embodiments 240-247, wherein the apparatus is to remove at least 93% of the polymer material.

262. The apparatus of embodiments 240-247, wherein the apparatus is to remove at least 94% of the polymer material.

263. The apparatus of embodiments 240-247, wherein the apparatus is to remove at least 95% of the polymer material.

264. The apparatus of embodiments 240-247, wherein the apparatus is to remove at least 97% of the polymer material.

265. The apparatus of embodiments 240-247, wherein the apparatus is to remove at least 98% of the polymer material.

266. The apparatus of embodiments 240-247, wherein the apparatus is to remove at least 99% of the polymer material.

267. The apparatus of embodiments 240-247, wherein the apparatus is to remove at least 99.5% of the polymer material.

268. The apparatus of embodiments 240-267, where in the non-ionizing radiation is sufficient to cause pyrolysis of the polymer material.

269. The apparatus of embodiments 240-268, where in the non-ionizing radiation is sufficient to cause melting of the polymer material.

270. The apparatus of embodiments 240-267, wherein the non-ionizing radiation has a frequency of from about 500 MHz to about 3000 MHz.

271. The apparatus of embodiments 240-267, wherein the non-ionizing radiation has a frequency of from about 600 MHz to about 2900 MHz.

272. The apparatus of embodiments 240-267, wherein the non-ionizing radiation has a frequency of from about 700 MHz to about 2800 MHZ.

273. The apparatus of embodiments 240-267, wherein the non-ionizing radiation has a frequency of from about 800 MHz to about 2700 MHz.

274. The apparatus of embodiments 240-267, wherein the non-ionizing radiation has a frequency of from about 900 MHz to about 2900 MHz.

275. The apparatus of embodiments 240-267, wherein the non-ionizing radiation has a frequency of from about 900 MHz to about 2800 MHZ.

276. The apparatus of embodiments 240-267, wherein the non-ionizing radiation has a frequency of from about 900 MHz to about 2700 MHz.

277. The apparatus of embodiments 240-267, wherein the non-ionizing radiation has a frequency of from about 900 MHz to about 2600 MHz.

278. The apparatus of embodiments 240-267, wherein the non-ionizing radiation has a frequency of from about 900 MHz to about 2500 MHz.

279. The apparatus of embodiments 240-267, wherein the non-ionizing radiation has a frequency of from about 500 MHz to about 2900 MHz.

280. The apparatus of embodiments 240-267, wherein the non-ionizing radiation has a frequency of from about 500 MHz to about 2700 MHz.

281. The apparatus of embodiments 240-267, wherein the non-ionizing radiation has a frequency of from about 500 MHz to about 2600 MHz.

282. The apparatus of embodiments 240-267, wherein the non-ionizing radiation has a frequency of from about 500 MHz to about 2500 MHz.

283. The apparatus of embodiments 240-267, wherein the non-ionizing radiation has a frequency of from about 915 MHz to about 2450 MHz.

284. The apparatus of embodiments 240-283, before applying the non-ionizing radiation, the $N_2$ is applied through the at least one port to contact the composite material.

285. The apparatus of embodiments 240-284, after the $N_2$ is applied to contact the composite material, the $H_2O$ is applied through the at least one port to contact the composite material.

286. The apparatus of embodiments 240-285, while the non-ionizing radiation generator is applying the non-ionizing radiation, the $H_2O$ is applied through the at least one port to contact the composite material.

287. The apparatus of embodiments 240-283, wherein at least a portion of the $N_2$ and at least a portion of the $H_2O$ is applied through the at least one port simultaneously to contact the composite material.

288. The apparatus of embodiments 240-283, wherein at least a portion of the $N_2$ and at least a portion of the $H_2O$ is applied through the at least one port simultaneously to contact the composite material before applying the non-ionizing radiation.

289. The apparatus of embodiments 240-283, wherein at least a portion of the $N_2$ and at least a portion of the $H_2O$ is applied simultaneously through the at least one port to contact the composite material during applying the non-ionizing radiation.

290. The apparatus of embodiments 240-283, wherein at least a portion of the $N_2$ and at least a portion of the $H_2O$ is applied simultaneously through the at least one port to contact the composite material after applying the non-ionizing radiation.

291. The apparatus of embodiments 240-269, wherein the gas mixture comprises from about 0.1% to about 20% by volume of $H_2O$.

292. The apparatus of embodiments 240-282, wherein the gas mixture comprises from about 0.1% to about 15% by volume of $H_2O$.

293. The apparatus of embodiments 240-282, wherein the gas mixture comprises from about 0.1% to about 10% by volume of $H_2O$.

294. The apparatus of embodiments 240-282, wherein the gas mixture comprises from about 0.1% to about 8% by volume of $H_2O$.

295. The apparatus of embodiments 240-282, wherein the gas mixture comprises from about 0.1% to about 5% by volume of $H_2O$.

296. The apparatus of embodiments 240-282, wherein the gas mixture comprises from about 0.1% to about 3% by volume of $H_2O$.

297. The apparatus of embodiments 240-282, wherein the gas mixture comprises from about 0.1% to about 1% by volume of $H_2O$.

298. The apparatus of embodiments 240-297, wherein the gas mixture is essentially free of oxygen.

299. The apparatus of embodiments 240-297, wherein the gas mixture contains no more than about 1% by volume of oxygen.

300. The apparatus of embodiments 240-297, wherein the gas mixture contains no more than about 0.5% by volume of oxygen.

301. The apparatus of embodiments 240-297, wherein the gas mixture contains no more than about 0.1% by volume of oxygen.

302. The apparatus of embodiments 240-297, wherein the gas mixture contains no more than about 0.01% by volume of oxygen.

303. The apparatus of embodiments 240-302, wherein the apparatus is to perform a batch process.

304. The apparatus of embodiments 240-302, wherein the apparatus is to perform a continuous process.

NON-LIMITING EXAMPLES

The following examples can be provided to illustrate selected embodiments. They should not be considered as limiting the scope of the invention, but merely as being illustrative and representative thereof. Thus, the examples provided below, while illustrated with a particular medical device or active agent, can be applicable to the range of medical devices and active agents described herein.

Example 1—Process of Separating Carbon Fibers from CFRP Scrap

For this example, process of separating carbon fibers from composite material including carbon fibers, scrap of carbon fiber-reinforced plastic (CFRP) were collected and put into the container barrel of the microwave device. For this example, both a batch type and continuous process type microwave devices were used. The results of both types were substantially consistent as described below.

Figure 22:
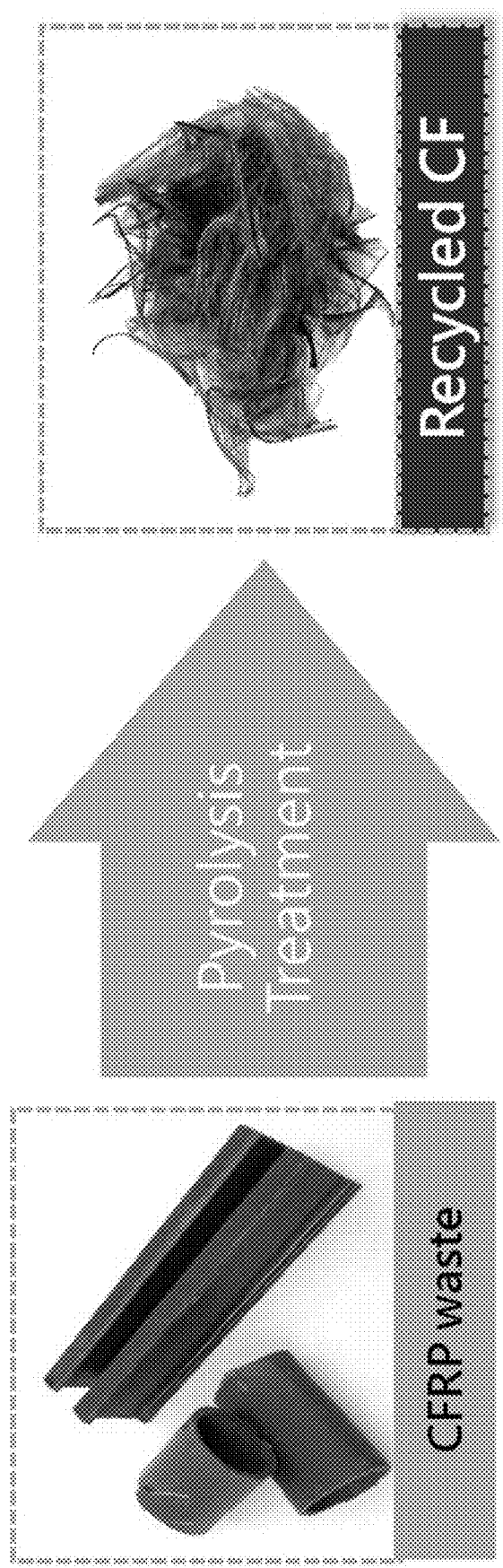
FIG. 22 illustrates a process of separating carbon fibers from the CFRP scrap waste in some embodiments.

FIG. 22 illustrates a process of separating carbon fibers from the CFRP scrap waste. Referring to FIG. 22, once the CFRP was disposed in the barrel container through a material channel, the material channel was closed and sealed. The temperature and pressure were monitored throughout the process using the thermometer and the pressure gauge. Once the material channel was closed, nitrogen was injected into the container and the air in the container were vented out to reduce the oxygen to less than about 2% in the container. After injecting nitrogen, CFRP was stirred by the stirrer on average of about 100 rpm for about 8 hours. During the stirring, microwaves with a power about 9.5 kw on average at a frequency of about 2450 MHz was applied using the microwave generator, and the carbon fibers continued to receive microwave to be heated. For the stirring, steam was also injected into the container. After the microwave heating and stirring process, the carbon fibers were then discharged out of the container and cooled down.

Example 2—Imagining of Recycled Carbon Fibers Using Scanning Electron Microscope The carbon fibers separated in EXAMPLE 1 above were imaged using a scanning electron microscope (SEM). To prepare an imaging sample of the carbon fibers, the carbon fibers were dried. The carbon fibers sample was then sputter coated to form a thin conductive layer over the fibers. The fibers samples were then placed in vacuum in the imaging chamber of the SEM and imaged by the SEM.

Example 3—Analysis of Recycled Carbon Fibers Using Scanning Electron Microscope

Figure 23:
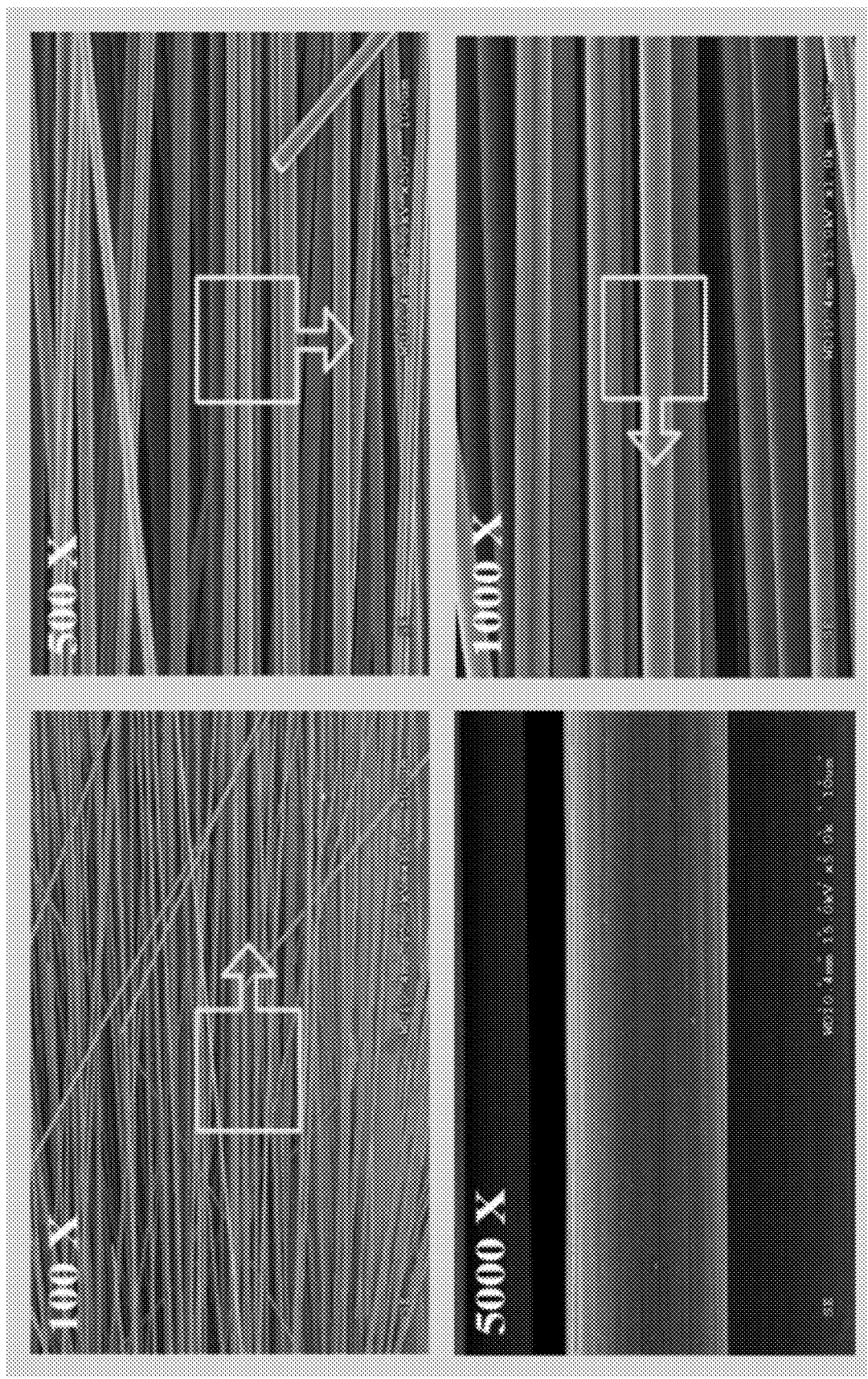
FIG. 23 shows microscopic images of recycled carbon fibers imaged by SEM in some embodiments.

The purity of the regenerated carbon fiber was ≥98%. FIG. 23 is microscopic images of the recycled carbon fibers imaged by SEM in EXAMPLE 2. Referring to FIG. 23, the image indicates carbon fibers substantially resembling its undamaged, original fiber condition. As seen in 100×, the fiber breakage in the fiber bundle was low. The surfaces of fibers appeared substantially free of defects, for example, substantially without plastic residue, rough surface, surface contaminations, damages from heat, dents, cracks, and potholes. The material properties of the original carbon fibers before the addition to the CFRP were substantially maintained.

Example 3—Analysis of Recycled Carbon Fibers

The purity of the regenerated carbon fiber was ≥98%. FIG. 23 is microscopic images of the recycled carbon fibers imaged by SEM in EXAMPLE 2. Referring to FIG. 23, the image indicates carbon fibers substantially resembling its undamaged, original fiber condition. As seen in 100×, the fiber breakage in the fiber bundle was low. The surfaces of fibers appeared substantially free of defects, for example, substantially without plastic residue, rough surface, surface contaminations, damages from heat, dents, cracks, and potholes. The material properties of the original carbon fibers before the addition to the CFRP were substantially maintained.

Example 4—Comparative Process of Separating Carbon Fibers from CFRP Scrap and Analysis of Comparative Recycled Carbon Fibers CFRP scraps in EXAMPLE 1 was also provided in this example. CFRP were chopped, and a modified pyrolysis process not involving steam during the process was used. After modified pyrolysis process, the carbon fibers were then discharged out of the container and cooled down. Cooled carbon fibers were then prepared as a sample and analyzed following the steps in EXAMPLE 2.

Figure 24:
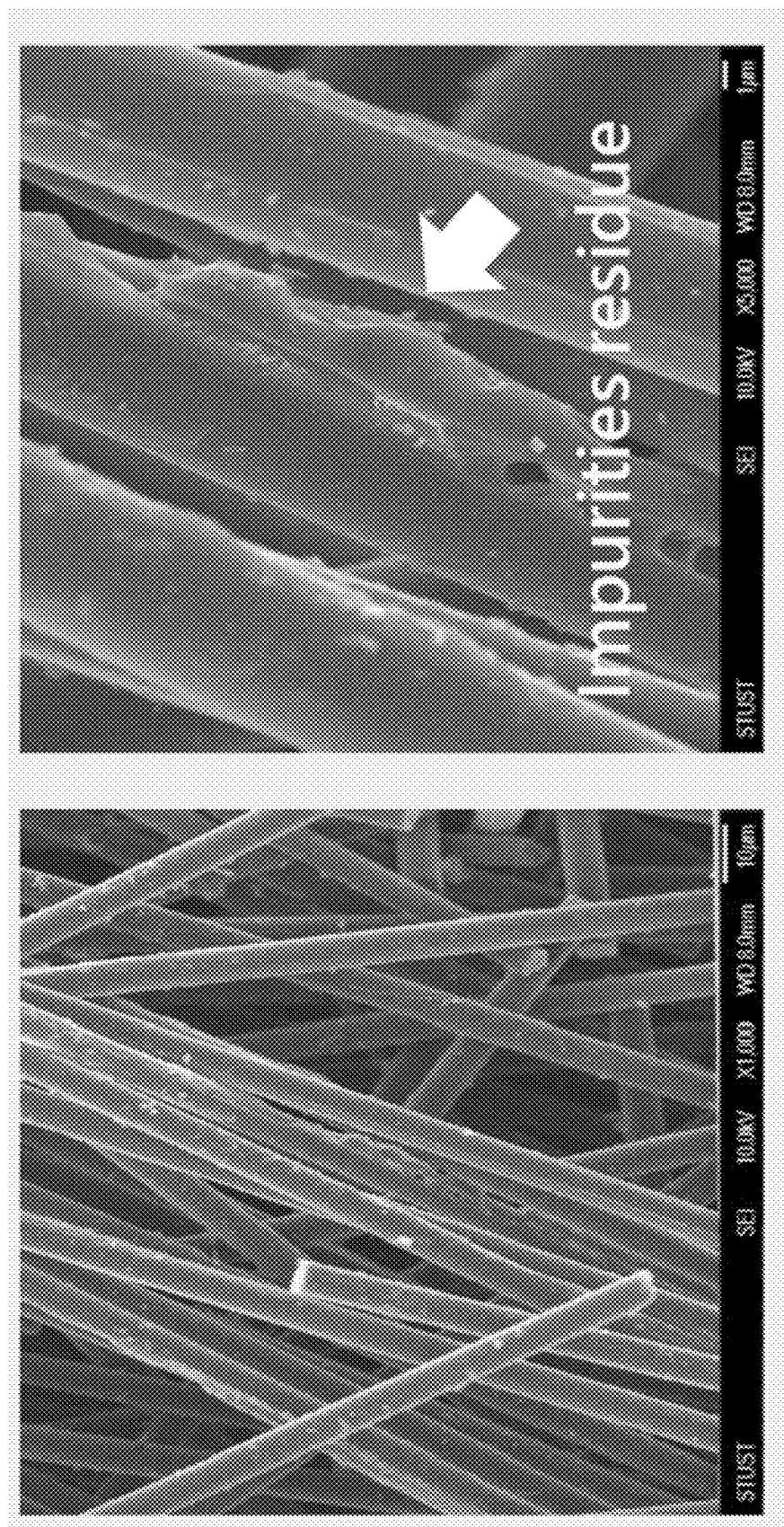
FIG. 24 shows microscopic images of the recycled carbon fibers recycled using a comparative, modified pyrolysis process and imaged by SEM in some embodiments.

The purity of the regenerated carbon fiber was substantially less than 98%. FIG. 24 is microscopic images of the recycled carbon fibers recycled using a comparative, modified pyrolysis process and imaged by SEM in EXAMPLE 4. Referring to FIG. 24, the image indicates carbon fibers that are contaminated with plastic residues and damaged. As seen in 100×, the fiber breakage in the fiber bundle was substantially higher compared to the images in FIG. 23 (EXAMPLE 3). The surfaces of fibers are contaminated with impurities and residues have physical defects, including rough surface, damages from heat, dents, and potholes. The material properties were substantially inferior to those of the original carbon fibers.

Of note, the exemplar embodiments of the disclosure described herein do not limit the scope of the invention since these embodiments can be merely examples of the embodiments of the invention. Any equivalent embodiments can be intended to be within the scope of this invention. Various modifications of the disclosure, in addition to those shown and described herein, such as alternative useful combinations of the elements described, may become apparent to those skilled in the art from the description. Such modifications and embodiments can be also intended to fall within the scope of the appended claims.

What is claimed is:

1. A process of recycling a composite material comprising a base material composited with a polymer material, the process comprising:

applying a microwave radiation having a frequency of from about 500 MHz to about 3000 MHz to the composite material in a reactor filled with $H_2O$ and $N_2$ to discharge other internal gases in the reactor from the reactor for an anaerobic reaction; and contacting the composite material with $H_2O$ and $N_2$ filled in the reactor for the anaerobic reaction without a combustion of carbon into $CO_2$ to the reactor while maintaining the non-ionizing radiation until the polymer material is substantially removed from the base material to produce a recycled base material through an anaerobic reaction without combustion, wherein the $H_2O$ comprises from about 0.1% to about 20% by volume of gas in the reactor.

2. The process of claim 1, wherein the base material comprises carbon fibers or glass fibers.

3. The process of claim 1, wherein at least about 85% of the polymer material is removed from the base material.

4. The process of claim 1, wherein the base material is at least substantially intact after the polymer material is substantially removed from the base material.

5. The process of claim 1, wherein the base material before applying the non-ionizing radiation has tensile strength and wherein the recycled base material has at least about 80% of the tensile strength of the base material.

6. The process of claim 1, wherein the base material before applying the non-ionizing radiation has tensile modulus and wherein the recycled base material has at least about 80% of the tensile modulus of the base material.

7. The process of claim 1, wherein the base material before applying the non-ionizing radiation has elongation and wherein the recycled base material has at least about 80% of the elongation of the base material.

8. The process of claim 1, wherein the base material before applying the non-ionizing radiation has coefficients of thermal conductivity and wherein the recycled base material has at least about 80% of the coefficients of thermal expansion of the base material.

9. The process of claim 1, wherein the base material before applying the non-ionizing radiation has coefficients of thermal expansion and wherein the recycled base material has at least about 80% of the coefficients of thermal expansion of the base material.

10. The process of claim 1, wherein the base material before applying the non-ionizing radiation has electrical conductivity and wherein the recycled base material has at least about 80% of the electrical conductivity of the base material.

11. The process of claim 1, wherein the base material before applying the non-ionizing radiation has tensile strength, wherein at least about 70% of the base material maintains at least about 80% of the tensile strength of the base material after the polymer material is substantially removed from the base material.

12. The process of claim 1, wherein less than about 5 weight percent of the base material is degraded after the polymer material is substantially removed from the base material.

13. The process of claim 1, wherein the non-ionizing radiation is sufficient to cause pyrolysis of the polymer material.

14. The process of claim 1, wherein, before applying the non-ionizing radiation, the $N_2$ is applied to contact the composite material.

15. The process of claim 1, wherein, during applying the non-ionizing radiation, the $H_2O$ is applied to contact the composite material.

16. The process of claim 1, wherein gas mixture contacting the composite material contains no more than about 1% by volume of oxygen.

17. The process of claim 1, wherein the base material has break rate of no more than about 25% after the polymer material is removed from the base material.

18. The process of claim 1, wherein the recycled base material after the process has 10% increased electric conductivity compared to a base material recycle process without the $H_2O$ and $N_2$.

* * * * *